(12) United States Patent
Ejima et al.

(10) Patent No.: US 6,259,469 B1
(45) Date of Patent: Jul. 10, 2001

(54) INFORMATION PROCESSING DEVICE, INFORMATION PROCESSING METHOD, AND RECORDING MEDIA

(75) Inventors: Satoshi Ejima, Tokyo; Akira Ohmura, Kawasaki, both of (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/146,043

(22) Filed: Sep. 2, 1998

(30) Foreign Application Priority Data

| Sep. 5, 1997 | (JP) | 9-240640 |
| Oct. 24, 1997 | (JP) | 9-291982 |
| Nov. 7, 1997 | (JP) | 9-305213 |
| Nov. 7, 1997 | (JP) | 9-305238 |

(51) Int. Cl.$^7$ ................................. H04N 7/14
(52) U.S. Cl. ................... 348/14.01; 348/14.03; 348/14.04
(58) Field of Search .................... 348/14, 15; 379/93.19, 379/93.21, 93.09; H04N 7/14

(56) References Cited

U.S. PATENT DOCUMENTS

| 5,612,732 | * | 3/1997 | Yuyama et al. | 348/14 Q |
| 5,825,408 | * | 10/1998 | Yuyama et al. | 348/14 |

FOREIGN PATENT DOCUMENTS

| 000753965A2 | * | 1/1997 | (DE) | H04N/7/14 |
| 407023357 | * | 1/1995 | (JP) | H04N/7/14 |
| 4-07038863A | * | 2/1995 | (JP) | H04N/7/14 |

* cited by examiner

Primary Examiner—Curtis Kuntz
Assistant Examiner—Melur Ramakrishnaiah
(74) Attorney, Agent, or Firm—Oliff & Berridge, P.L.C.

(57) ABSTRACT

An electronic camera connected through a communication line to another electronic camera records an image that was transmitted from the other camera. When the electronic camera is connected to a public line from a modular jack, when a shooting lens faces opposite to a surface where an LCD is formed, the image of the user which was input by a CCD is transmitted to the other camera through the public line and is displayed on the LCD of the other camera. Furthermore, the image of the user of the other camera which was input by the other camera is transmitted through the public line and displayed on the LCD of the first camera. At this time, when a release switch to shoot an object is operated, the image which is displayed on the LCD is recorded. Furthermore, when a rotating part containing the shooting part is rotated by either electronic camera, the image which was input by the electronic camera in which the rotating part was rotated is displayed on both electronic cameras. At this time, when the release button is pressed, the image which was input by the electronic camera is which the rotating part was rotated is recorded. Additionally, when information is transferred from the electronic camera to a telephone, facsimile machine, video telephone or a server via the communication line, such as a network, transmission of identifying information for the respective information processing device is received, and the type of information that can be handled by the other party's information receiving device is evaluated based upon this identifying information. Then, in response to the evaluation results, only the information that can be handled is transmitted to the respective information processing device.

15 Claims, 40 Drawing Sheets

CONNECTING PARTY DOES NOT HAVE VIDEO TELEPHONE CAPABILITY. THIS WILL BE A SOUND-ONLY COMMUNICATION

THERE IS NO IMAGE FROM THE CONNECTING PARTY

COMMUNICATION ERROR

INFORMATION PROCESSING DEVICE, INFORMATION PROCESSING METHOD, AND RECORDING MEDIA

INCORPORATION BY REFERENCE

The disclosure of the following priority applications are herein incorporated by reference:

Japanese Patent Application No. 9-240640 filed Sep. 5, 1997;

Japanese Patent Application No. 9-291982 filed Oct. 24, 1997;

Japanese Patent Application No. 9-305213 filed Nov. 7, 1997; and

Japanese Patent Application No. 9-305238 filed Nov. 7, 1997.

BACKGROUND OF THE INVENTION

1. Field of Invention

The present invention relates to an information processing device, information processing method, and a recording media, and particularly, to information processing devices, information processing methods, and recording media which can communicate information with another information processing device via a communication line.

2. Description of the Related Art

Through advancements in image compression technology, it is becoming possible to send images such as moving images by using a transmission media, for example, a telephone line, having a relatively small transmission capacity.

For example, in video telephone communication, after the compression processing is performed for the image which was shot by a CCD or the like based upon a standard such as MPEG (Moving Picture Experts Group), the image is sent to a receiving party through a telephone line. At the receiving side, the information is decompressed and the original image is displayed on an LCD or the like.

SUMMARY OF THE INVENTION

In an electronic camera, after an image is compressed, it is recorded to a recording medium such as a memory. However, if, instead of recording the image to the recording medium the image is sent to a receiving party side through a public line, it is possible to realize a video telephone system.

However, when a video telephone system is realized by using an electronic camera, there are two information input sources: the operator and the other side (receiving party). Therefore, for example, when the release button is operated, it is necessary to rule which of the two information sources should be the recording object. However, the conventional electronic camera was not structured to send and receive information by communication, so there was a problem such that, for example, the image which was sent by the other side cannot be shot.

The present invention was made to overcome the above problem. For example, when the electronic camera is connected through a communication line and the information such as an image is received, the present invention easily records the image which was sent by the other side.

The present invention also relates to electronic cameras that can handle not only ordinary image information obtained by imaging an object, but also line drawing information input by a pen and sound information taken in via a microphone. When information is sent and received via a communication line between this type of information processing device that can handle a plurality of information and another information processing device, depending on the capabilities of the information processing devices of the communicating parties, there are cases in which only specified ones of the plurality of information can be handled.

Normally, a user cannot know what types of information the other information processing device can handle. Therefore, in these cases, it is necessary for the user to find out in advance, for example by telephone, what types of information the other party's information processing device can handle, and then to set the various modes matching the information processing device. Therefore, the operations involved become complex, which is inconvenient.

The present invention overcomes such problems and simply and reliably enables communication of specified information among a plurality of information with another information processing device.

When the video telephone system is realized by using a portable information processing device, as described earlier, a display device which is installed in this type of device is small so that there is a problem that resolution of each image deteriorates when a plurality of images are simultaneously displayed, and the images cannot be easily seen as a result.

It has been considered that a plurality of these images could be appropriately selected and displayed, but there was a problem such that conventionally, an appropriate selection method was not proposed.

The present invention renders it possible to appropriately select a plurality of images and display them on a display device when a video telephone system with a small display device, for example, a portable information processing device, is used.

BRIEF DESCRIPTION OF THE DRAWINGS

The invention is described in detail with reference to the following figures wherein like reference numerals designate similar items, and wherein.

DETAILED DESCRIPTION OF PREFERRED EMBODIMENTS

Figure 1:
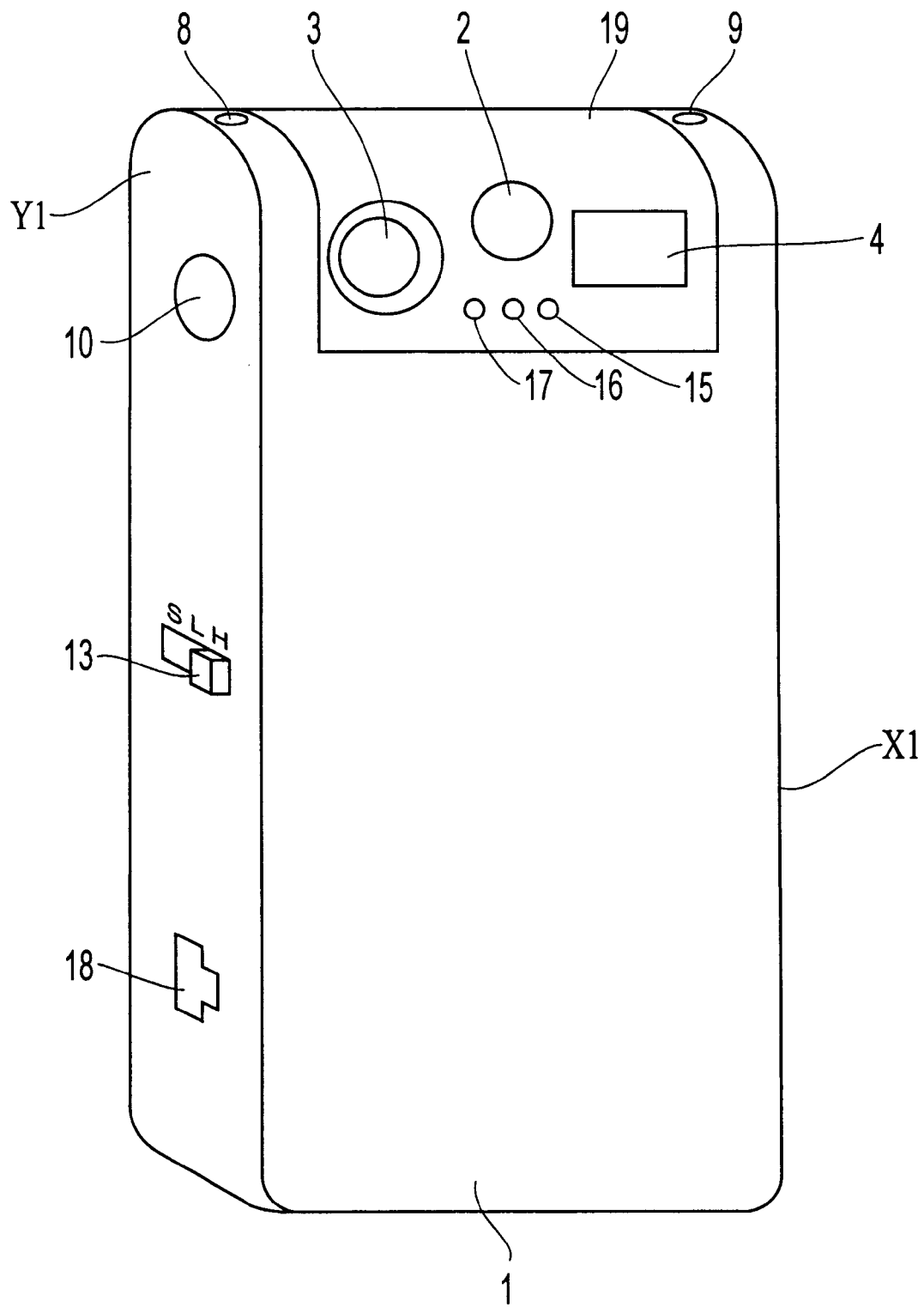
FIG. 1 is a front perspective view of an electronic camera according to one embodiment of the present invention.

The following explains the embodiments of the present invention by referring to the drawings.

Figure 2:
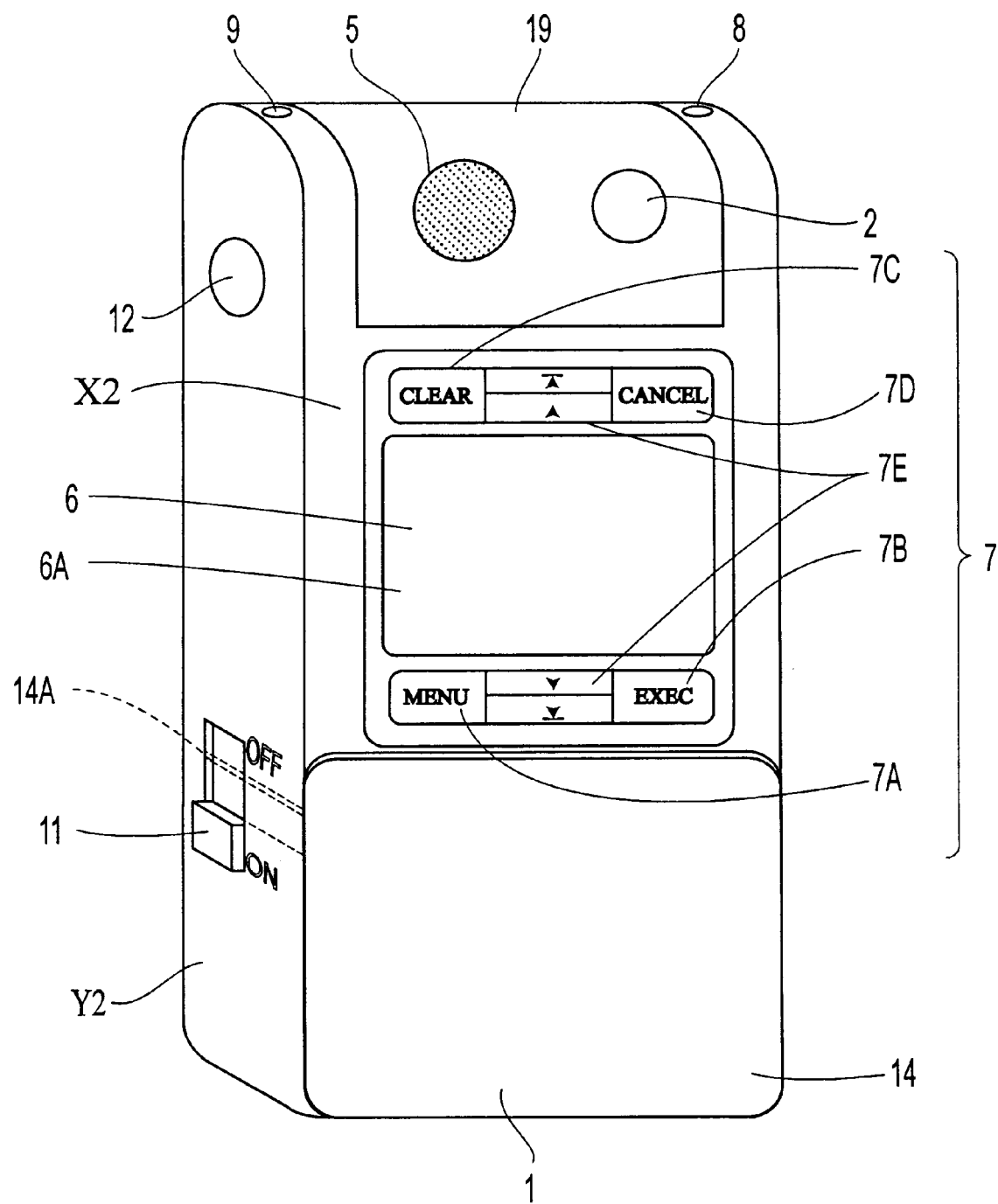
FIG. 2 is a rear perspective view of the electronic camera as shown in FIG. 1.

FIGS. 1 and 2 are perspective front views of an electronic camera according to an embodiment of the present invention. In the electronic camera of the present embodiment, the surface facing toward an object when the object is shot is defined as surface X1, and the surface facing toward the user is defined as surface X2. At the top portion of the surface X1, a rotating part 19 is arranged on which a finder 2, a shooting lens 3, a light emitting part 4, a red eye reduction lamp 15, a photometric element 16, and a colorimetric element 17 are disposed. The rotating part 19 is rotatable. Thus, it is possible to rotate the surface where the shooting lens 3 is disposed from the direction of the surface X1 to the direction of the surface X2, and to fix it in an arbitrary position therebetween. Furthermore, the finder 2 is used to confirm an object shooting area, the shooting lens 3 takes in the light image of the object, and the light emitting part (strobe) 4 emits light that illuminates the object.

When shooting is performed by causing the emitting the strobe 4 to emit light, before the strobe 4 emits light, the red eye reduction lamp 15 reduces the red eye phenomenon. The photometric element 16 performs photometry when the operation of a CCD 20 (FIG. 4: image inputting device) is stopped. Likewise, the calorimetric element 17 performs colorimetry when the operation of CCD 20 is stopped.

Meanwhile, in a rear surface (opposite shooting lens), a speaker 5, which outputs sound recorded in the electronic camera 1, and an eye piece of finder 2 are arranged. In addition, an LCD 6 and an operating key 7 formed on the surface X2 are provided below the finder 2, the shooting lens 3, the emitting part 4, and the speaker 5. A touch tablet 6A is provided on the surface of LCD 6. The touch tablet 6A, by a contacting operation of a pen type indicating device which will be described later, outputs position data corresponding to the position of the pen.

The touch tablet 6A is structured by transparent materials such as glass and resin. The user can observe the image, which is displayed on LCD 6 which is formed behind the touch tablet 6A, through the touch tablet 6A.

The operating keys 7 are keys that are operated when recording data is reproduced and is displayed on LCD 6. Operating keys 7 detect the operations (inputting) by the user and provide input to CPU 39 FIG. 6: detection device).

A menu key 7A among the operating keys 7 is a key which is operated when a menu screen is to be displayed on LCD 6. An executing key 7B (operating mechanism) is a key that is operated when the recorded information which is selected by the user is to be reproduced.

A clear key 7C is a key that is operated when the recorded information is deleted. A cancel key 7D is a key that is operated when the reproducing processing of the recorded information is interrupted. A scroll key 7E is a key that is operated when the screen is scrolled in the upper and lower directions when the list of the recorded information is displayed on LCD 6.

Figure 3:
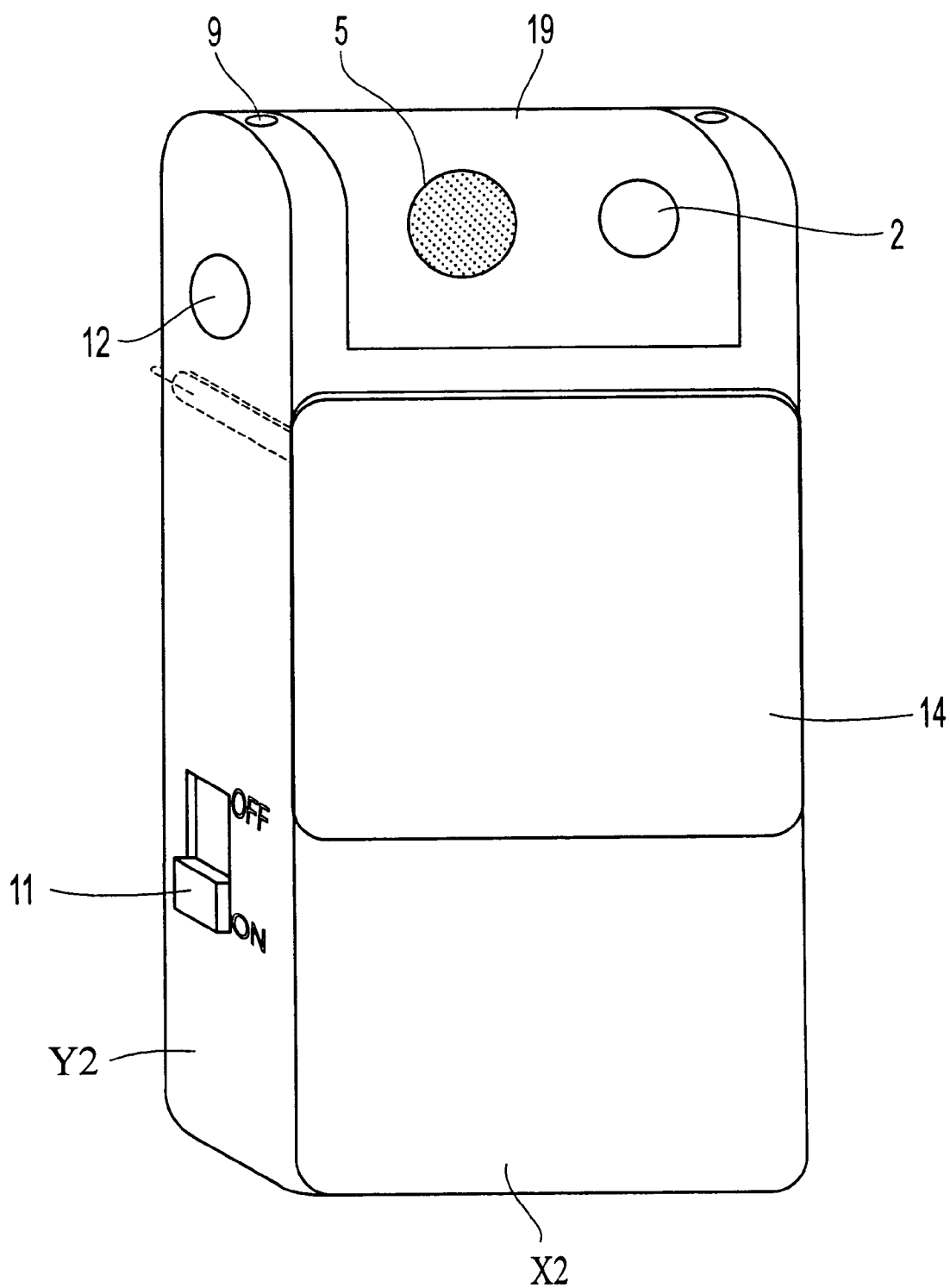
FIG. 3 is a rear perspective view of the electronic camera with its LCD cover closed.

On the surface X2 is disposed an LCD cover 14, which protects LCD 6 when it is not used and which is slidable. As shown in FIG. 3, when the LCD cover 14 is moved in the vertically upward direction, the LCD 6 and the touch tablet 6A are covered. Furthermore, when the LCD cover 14 is moved in the vertically downward direction, the LCD 6 and the touch tablet 6A appear, and a power switch 11 arranged in surface Y2 can be switched to the "ON" state by an arm part 14A of the LCD cover 14.

On the top surface of the electronic camera 1, an earphone jack 9 is disposed that is connected to a microphone 8, which collects sound, and an undepicted earphone.

A left surface Y1 includes a release switch 10 (operating means) operated when an object is shot, a continuous mode changing switch 13 is operated when a continuous mode is changed during shooting, and a modular jack 18 used to connect to a telephone line. The release switch 10, the continuous mode changing switch 13 and the modular jack 18 are arranged vertically lower than the finder 2, the shooting lens 3, and the light emitting part 4, which are arranged on the rotating part 19.

Meanwhile, in the right surface Y2 opposite the left surface Y1, a recording switch 12 operated when sound is recorded and the power switch 11 are arranged. The recording switch 12 and the power switch 11 are arranged vertically lower than the finder 2, the shooting lens 3, and the light emitting part 4, which are arranged on the rotating part 19, just like the release switch 10 and the continuous mode changing switch 13. Furthermore, the recording switch 12 is formed approximately at the same height as the release switch 10 of the surface Y1 and is structured so as not to give a strange feel to the user, no matter which hand is used to hold the recording switch 12.

However, it is acceptable to make the recording switch 12 and the release switch 10 at different heights so that when one of the switches is pressed, a side surface of the opposite side can be held by a finger in order to negate the moment caused by the pressure. By doing so, a switch will not be pressed by mistake while the switch arranged on the opposite side surface is pressed.

The continuous mode changing switch 13 is used to set whether the object will be shot for one frame or a specified plurality of frames when the user shoots an object by pressing the release switch 10. For example, when the pointer of the continuous mode changing switch 13 is switched to the "S" position (S mode), shooting is performed only for one frame when the release switch 10 is pressed.

Further, when the pointer of the continuous mode changing switch 13 is switched to the "L" position (L mode) eight frames of shooting are performed every second (a low speed continuous mode) during the time when the release switch 10 is pressed.

Moreover, when the pointer of the continuous mode changing switch 13 is changed to the "H" position (H mode), 30 frames of shooting are performed every second (high speed continuous mode) during the time when the release switch 10 is pressed.

Figure 4:
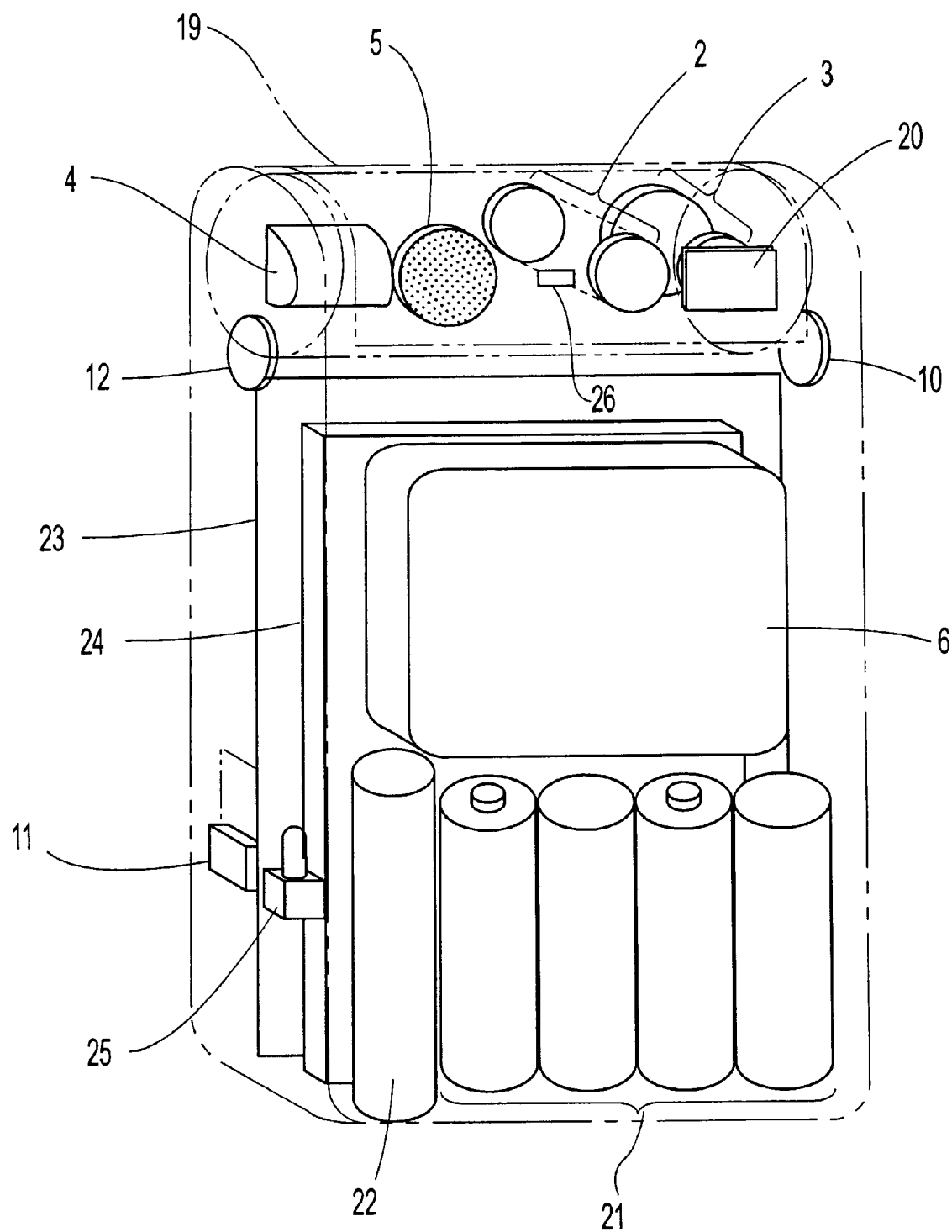
FIG. 4 is a rear perspective view showing some of the inside components of the electronic camera as shown in FIGS. 1 and 2.

Next, the internal structure of the electronic camera 1 is explained. FIG. 4 is a perspective figure showing a structural example of the internal part of the electronic camera shown in FIGS. 1 and 2. CCD 20 is disposed in the rear step (surface X2 side) of the shooting lens 3, and photoelectrically converts the light image of the object which is shot through the shooting lens 3 to an electric signal.

The inside finder display element 26 is arranged in the visual field of the finder 2. For the user who is watching the object through the finder 2, the setting state of various functions or the like can be displayed. In addition, the finder 2, the shooting lens 3, the light emitting part 4, the speaker 5, CCD 20, and the inside finder light emitting element 26 are disposed inside of the cylindrical rotating part 19.

At the vertical lower side of LCD 6, four slender batteries (AAA dry cells) 21 are vertically arrayed, and the power which is stored in the batteries 21 is provided to each part. In addition, at the vertical lower side of LCD 6, along with the batteries 21, a condensor 22 is arranged in which the charge to emit the light to the emitting part 4 is stored.

On the circuit substrate 23, various control circuits which control each part of the electronic camera 1 are formed.

Furthermore, between the circuit substrate 23 and LCD 6 and batteries 21, an insertable/retractable memory card 24 (recording means) is disposed, and various information to be input to the electronic camera 1 is respectively recorded to areas of the memory card 24 which are set in advance.

Figure 5A:
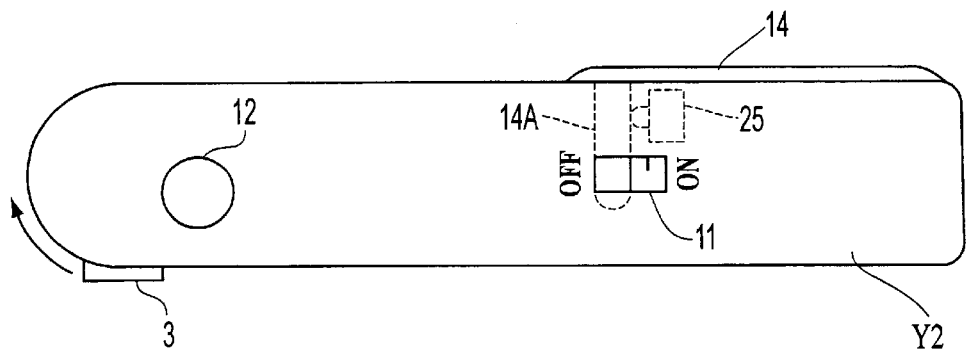
FIGS. 5(a), 5(b) and 5(c) are diagrams explaining the relationship between the position of the LCD cover and the state of a power switch and an LCD switch.

An LCD switch 25 disposed adjacent to the power switch 11 is placed in the "ON" state only during the time when the protruding part thereof is pressed. When the LCD cover 14 is moved in a vertically downward direction by the arm part 14A of the LCD cover 14, as shown in FIG. 5(a), LCD Switch 25 can be changed to the "ON" state along with the power switch 11.

Figure 5B:
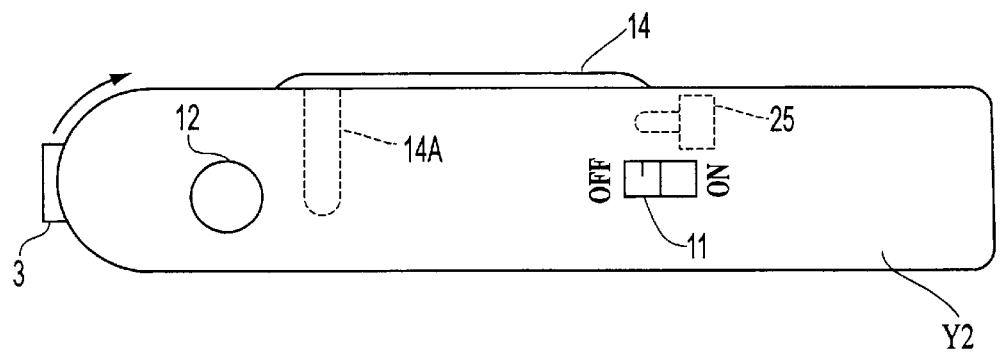
Figure 5C:
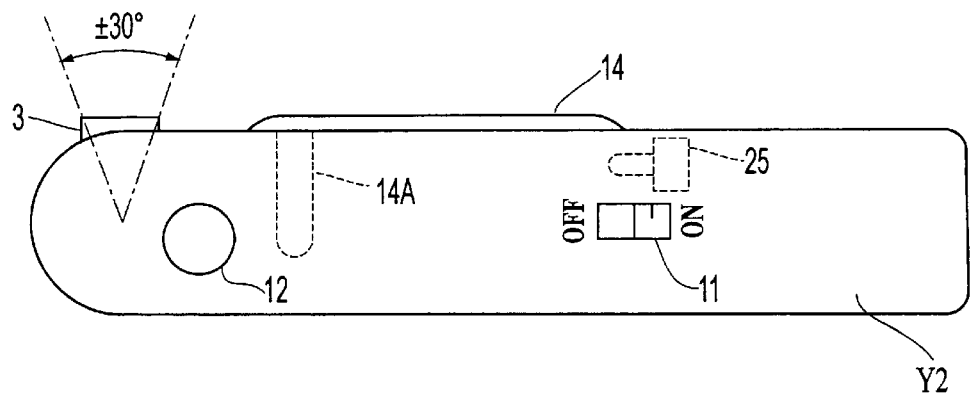

Furthermore, when LCD cover 14 is positioned in the upper position, the power switch 11 is operated by the user independent of the LCD switch 25. For example, when the LCD cover 14 is closed and the electronic camera 1 is not used, as shown in FIG. 5(b), the power switch 11 and the LCD switch 25 are in the "OFF" state. In this state, as shown in FIG. 5(c), when the user switches the power switch 11 to the "ON" state, the power switch 11 is placed in the "ON" state, but the LCD switch 25 still remains in the "OFF" state. Meanwhile, as shown in FIG. 5(b), when the power switch 11 and the LCD switch 25 are in the "OFF" state, if the LCD cover 14 opens, as shown in FIG. 5(a), the power switch 11 and the LCD switch 25 are placed in the "ON" state. Moreover, after this, when the LCD cover 14 is closed, as shown in FIG. 5(c), only the LCD switch 25 is placed in the "OFF" state.

Furthermore, as shown in FIG. 5, the rotating part 19 can be set at an arbitrary angle between the subnormal direction of the surface X1 and the subnormal direction of the surface X2.

In the present embodiment, the memory card 24 can be inserted, but it is also acceptable to provide a memory on the circuit substrate 23 and record various information to the memory. In addition, it is also acceptable to output various information which is recorded in the memory (memory card 24) to an external personal computer through an interface, which is not depicted.

Figure 6:
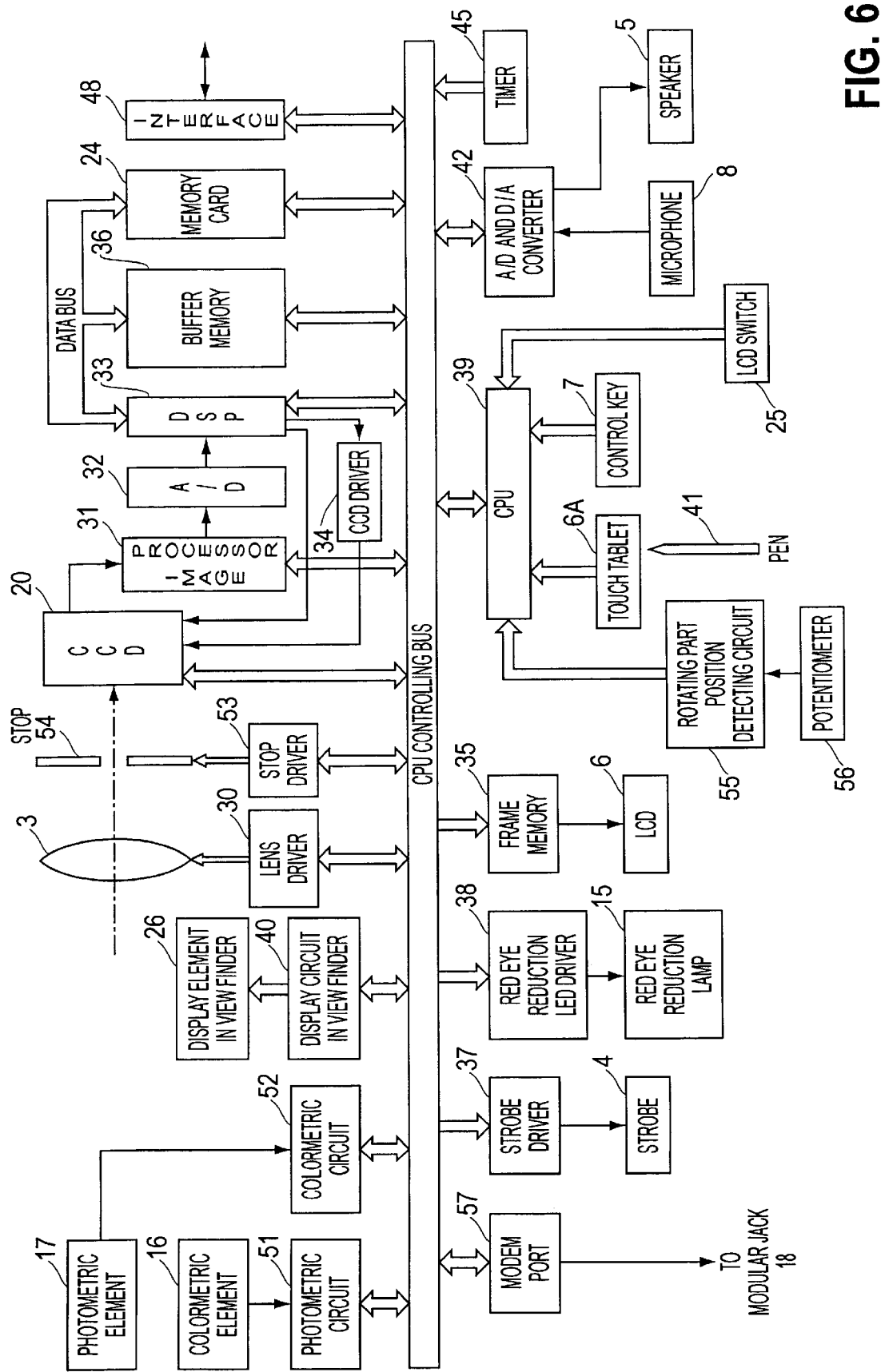
FIG. 6 is a block diagram showing the electrical structure of the internal part of the electronic camera shown in FIGS. 1 and 2.

Next, the electrical structure of the internal part of the electronic camera 1 of the present embodiment is explained by referring to the block diagram of FIG. 6. In CCD 20, which has a plurality of pixels, the light image which is formed on each pixel is photoelectrically converted to an image signal (electrical signal). A digital signal processor (hereafter referred as to DSP) 33 (recording means) supplies a CCD horizontal driving pulse to CCD 20, controls the CCD driving circuit 34, and supplies a CCD vertical driving pulse to the CCD 20.

An image processor 31 is controlled by CPU 39. The image signal which is photoelectrically converted by CCD 20 is sampled at a certain timing, and the sampled signal is amplified to a specified level. Analog/digital (A/D) converting circuit 32 digitizes the image signal, which was sampled by the image processor 31, and supplies it to the DSP 33.

DSP 33 controls a data bus which is connected to the buffer memory 36 and the memory card 24. After the image data which was supplied by the A/D converting circuit 32 is temporarily stored in the buffer memory 36, the image data stored in the buffer memory 36 is read, and the image data is stored on the memory card 24.

Furthermore, in DSP 33, the image data which was supplied by the A/D converting circuit 32 is stored in a frame memory 35 (outputting means) and is displayed on LCD 6, and the shot image data is read from the memory card 24. After decompressing the shot image data, the decompressed image data is stored in the frame memory 35 and is displayed on LCD 6.

Furthermore, in DSP 33, during the activation of the electronic camera 1, the CCD 20 is repeatedly operated while adjusting the exposing time (exposure value) until the exposing level of CCD 20 reaches an appropriate value. At this time, it is also acceptable to calculate an initial value of the exposing time of CCD 20 in response to a received light level, which was detected by the photometric element 16 when the DSP 33 first operates the photometric circuit 51. By so doing, it is possible to adjust the exposing time of CCD 20 in a short period of time.

Other than the above, the DSP 33 performs the timing management of data input/output in recording the image to the memory card 24, storing the decompressed image data in the buffer memory 36, and so forth.

The buffer memory 36 is used to smooth out the difference between the speed of the input/output of data for the memory card 24 and the processing speed in CPU 39, DSP 33, and the like.

The microphone 8 collects sound information, which is supplied to the A/D and D/A converting circuit 42.

The A/D and D/A converting circuit 42 converts an analog signal corresponding to sound, which is detected by the microphone 8, to a digital signal and outputs the digital signal to CPU 39. Circuit 42 also converts sound data supplied by the CPU 39 to an analog signal and outputs the analog sound signal to the speaker 5.

The photometric element 16 measures the light amount of the object and its surroundings, and the measurement result is output to the photometric circuit 51.

After the photometric circuit 51 performs a specified processing on the analog signal, which is the photometry result which was supplied by the photometric element 16, that analog signal is converted to a digital signal and the digital signal is output to the CPU 39.

The calorimetric element 17 measures the color intensity of the object and its surroundings and the measurement result is output to the colorimetric circuit 52.

After the colorimetric circuit 52 performs a specified processing to the analog signal, which is the photometry result which was supplied by the colorimetric element 17, it is converted to a digital signal and the digital signal is output to the CPU 39.

A timer 45 houses a clock circuit, and data corresponding to the current time is output to CPU 39.

A stop driver 53 sets the opening diameter of an aperture stop 54 at a specified value.

The aperture stop is disposed between the shooting lens 3 and the CCD 20 and changes the opening of the light incident from the shooting lens 3 to the CCD 20.

A rotating part position detecting circuit 55 receives output from a potentiometer 56, which is moved simultaneously with the rotating part 19, to detect the direction where the rotating part 19 faces at that time.

When a modem 57 (sending means, receiving means) receives and sends information between other electronic camera 1 connected through a public line, conversion of the data format is performed.

In response to the signal from the LCD switch 25, the CPU 39 stops the operation of the photometric circuit 51 and colorimetric circuit 52 when the LCD cover 14 is opened. When the LCD cover 14 is closed, it begins the operation of the photometric circuit 51 and the calorimetric circuit 52. Additionally, it stops the operation (e.g., electronic shutter operation) of the CCD 20 until the release switch 10 is placed in a half-pressed state.

When the CPU 39 stops the operation of the CCD 20, it controls the photometric circuit 51 and the colorimetric circuit 52 to receive the photometry result of the photometric element 16, and the colorimetry result of the calorimetric element 17.

Also, by referring to a specified table, the CPU 39 calculates the white balance adjusting value corresponding to the color intensity which was supplied by the calorimetric circuit 52, and the white balance adjusting value is supplied to the image processor 31.

That is, when the LCD cover 14 is closed, the LCD 6 is not used as an electronic viewfinder, so the operation of the CCD 20 is stopped. Because the CCD 20 consumes much power, it is possible to save power of the battery 21 by thus stopping the operation of the CCD 20.

Furthermore, when the LCD cover 14 is closed, the CPU 39 controls the image processor 31 so that the image processor 31 does not perform various processing until the release switch 10 is operated (until the release switch 10 in placed in a half-pressed state).

Moreover, when LCD cover 14 is closed, the CPU 39 controls a stop driver 53 so that the stop driver 53 does not perform an operation to change the opening diameter of the stop 54 or the like until the release switch 10 is operated (until the release switch 10 is placed in a half-depressed state).

The CPU 39 controls a strobe drive 37, and the strobe 4 appropriately emits light. In addition, a red eye reduction LED (light emitting diode) driver 38 is controlled, and the red eye reduction lamp 15 appropriately emits light prior to the light emission of the strobe 4.

Furthermore, when the LCD cover 14 is opened (that is, the electronic viewfinder is used), the CPU 39 does not cause the strobe 4 to emit light. By so doing, an object can be shot in the form of an image which is displayed in the electronic viewfinder.

According to the date and time data which is supplied by the timer 45, the CPU 39 records the shot date and time information to the shot image recording area of the memory card 24 as header information of the image data.

Furthermore, the CPU 39 compresses the sound information that was digitized and records it to a specified sound recording area of the memory card 24 after temporarily storing it in the buffer memory 36. Moreover, at this time, in the sound recording area of the memory card 24, the recording date and time data is recorded as header information of the sound data.

The CPU 39 controls the lens driver 30, moves the shooting lens 3, and performs an autofocus operation. In addition, it controls the stop driver 53 and changes the opening diameter of the stop 54 disposed between the shooting lens 3 and the CCD 20.

Furthermore, the CPU 39 controls an in-viewfinder display circuit 40, and the settings in various operations or the like are displayed on the in-viewfinder display element 26.

The CPU 39 sends/receives data through an interface (I/F) 48 to/from a specified external device (undepicted).

Moreover, the CPU 39 receives signals from the operating keys 7 and appropriately performs the processing.

When a specified position of the touch tablet 6A is pressed by a pen type indicating member 41 operated by the user, the CPU 39 reads the X-Y coordinates of the position that was pressed on the touch tablet 6A, and the coordinate data (line drawing information which will be discussed later) is stored in the buffer memory 36. Furthermore, the CPU 39 records the line drawing information stored in the buffer memory 36 in the line drawing information recording area of the memory card 24 along with the date and time header information of the line drawing information.

Next, various operations of the electronic camera 1 of the present embodiment are explained. First of all, the electronic viewfinder operation in the LCD 6 of the present device is explained.

The DSP 33 is supplied a signal by the CPU 39 when the user creates a half-pressed state of the release switch 10. It determines whether the LCD cover 14 is open by the value of the signal corresponding to the state of the LCD switch 25. When it is determined that the LCD cover 14 is closed, the electronic viewfinder operation is not performed. In this case, the DSP 33 stops processing until the release switch 10 is operated.

Moreover, when the LCD cover 14 is closed, the electronic viewfinder operation is not to be performed, so the CPU 39 stops the operations of the CCD 20, the image processor 31, and the stop driver 53. Also, instead of operating the CCD 20, the CPU 39 operates the photometric circuit 51 and calorimetric circuit 52, and the measurement result is supplied to the image processor 31. The image processor 31 uses the value of the measurement result when performing white balance control and the control of the brightness value.

Furthermore, when the release switch 10 is operated, the CPU 39 causes the CCD 20 and the stop driver 53 to operate.

Meanwhile, when the LCD cover 14 is opened, the CCD 20 performs the electronic shutter operation in a specified exposing time each time a specified time elapses, photoelectrically converts the light image of the object which was collected by the shooting lens 3, and outputs the image signal which is obtained by the operation to the image processor 31.

After the image processor 31 performs the white balance control and the control of the brightness value and after specified processing is performed on the image signal, the image signal is output to the A/D converting circuit 32. Moreover, when the CCD 20 is operated, the image processor 31 uses the adjusted value which is used for the white balance control and the control of the brightness value which were calculated by the CPU 39 using the output of the CCD 20.

Also, the A/D converting circuit 32 converts the analog image signal to image data which is a digital signal, and the obtained image data is output to the DSP 33.

The DSP 33 outputs the image data to the frame memory 35, and the image corresponding to the image data is displayed on the LCD 6.

Thus, in the electronic camera 1, when the LCD cover 14 is opened, the CCD 20 performs the electronic shutter operation at a specified time interval. Every time this is performed, the signal which is output by the CCD 20 is converted to image data, the image data is output to the frame memory 35, and the image of the object is continuously displayed on LCD 6 so that the electronic viewfinder operation is performed.

Furthermore, as described above, when the LCD cover 14 is closed, the electronic viewfinder operation is not performed, and by stopping the operation of the CCD 20, the image processor 31, and the stop driver 53, the consumed power is saved.

Next, the shooting of an object by the present device is explained.

First of all, the case when the continuous mode changing switch 13 disposed in the surface Y1 is changed to the S mode (one frame only) is explained. First, by switching the power switch 11 shown in FIG. 1 to the side at which "ON" is printed, the power is input to the electronic camera 1. The object is confirmed by the finder 2, and a shooting processing of the object begins by pressing the release switch 10 disposed in surface Y1.

Furthermore, when the LCD cover 14 is closed and when the release switch 10 becomes a half-pressed state, the operation of the CCD 20, the image processor 31, and the stop driver 53 begin again by CPU 39. When the release switch 10 becomes a full-pressed state, the shooting processing of the object begins.

The light image of the object which is observed by the finder 2 is collected by the shooting lens 3 and is image-formed on the CCD 20 with the plurality of pixels. The light image of the object which is imaged-formed on the CCD 20 is photoelectrically converted to an image signal in each pixel and is sampled by the image processor 31. The image signals which are sampled by the image processor 31 are supplied to the A/D converting circuit 32, digitized, and output to the DSP 33.

The DSP 33 temporarily outputs the image data to the buffer memory 36, then reads out the image data from the buffer memory 36 and compresses it according to the JPEG (Joint Photographic Experts Group) method, which combines dispersed cosine conversion, quantization, and Hoffman encoding, and records it to the shot image recording area of the memory card 24. At this time, the shooting time and date data is recorded to the shot image recording area of the memory card 24 as the header information of the shot image data.

Furthermore, when the continuous mode changing switch 13 is changed to the S mode, the shooting of only one frame is performed, and no shooting after this is performed even if the release switch 10 is continuously pressed. Moreover, when the release switch 10 is continuously pressed, if the LCD cover 14 is open, the image which was shot is displayed on LCD 6.

Secondly, the case when the continuous mode changing switch 13 is changed to the L mode (eight frames every second) is explained. When the power is input to the electronic camera 1 by changing the power switch 11 to the side where "ON" is printed and the release switch 10 disposed in the surface Y1 is pressed, the shooting processing of the object begins.

Furthermore, when the LCD cover 14 is closed, the CPU 39 restarts the operation of the CCD 20, the image processor 31 and the stop driver 53 when the release switch 10 is placed in a half-pressed state, and the shooting processing of the object begins when the release switch 10 is placed in a full-pressed state.

The light image of the object which is observed by the finder 2 is collected by the shooting lens 2 and is image-formed on the CCD 20 with the plurality of pixels. The light image of the object which is image-formed on the CCD 20 is photoelectrically converted into an image signal in each pixel and is sampled at the ratio of eight times every second by the image processor 31. Moreover, at this time, the image processor 31 thins out ¾ of the pixels among the image electric signal of all the pixels of the CCD 20.

Figure 7:
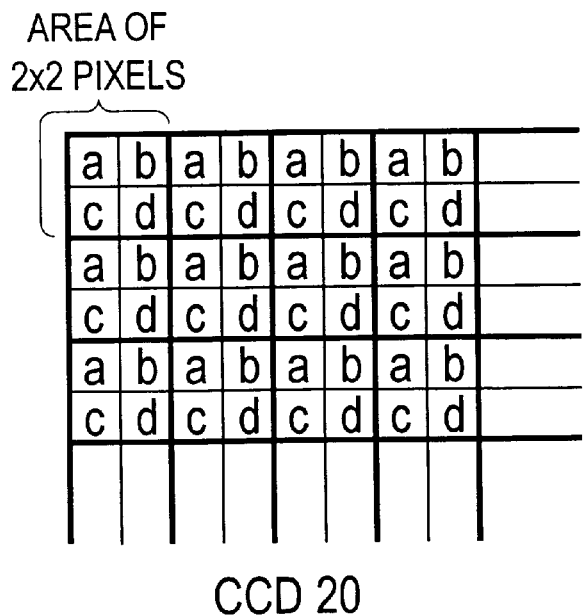
FIG. 7 is a diagram explaining the processing of thinning out the pixels during the L mode.

That is, as shown in FIG. 7, the image processor 31 divides the image of the CCD 20 which is arrayed in a matrix of areas each having 2×2 pixels (four pixels), samples the image signal of one pixel arranged in a specified position in one area, and thins out the remaining three pixels.

For example, during the first sampling (first frame), the pixel a at the upper left of each area is sampled and the other pixels b, c, d are thinned out. During the second sampling (second frame), the pixel b at the upper right of each area is sampled and the other pixels a, c, d are thinned out. Hereafter, during the third and fourth sampling, the pixel c at the lower left and the pixel d at the lower right are sampled, respectively, and the other pixels are thinned out. That is, each pixel is sampled every four frames.

The image signals (the image signals of ¼ of all the pixels of the CCD 20) which were sampled by the image processor 31 are supplied to the A/D converting circuit 32, are digitized there, and are output to the DSP 33.

The DSP 33 temporarily outputs the digitized signals to the buffer memory 36, then reads out the image signals, compresses them according to the JPEG method, and records the digitized, compressed shot image data to the shot image recording area of the memory card 24. At this time, the shooting time and date data is recorded to the shot image recording area of the memory card 24 as the header information of the shot image data.

Third, the case when the continuous mode changing switch 13 is changed to the H mode (30 frames every second) is explained. By changing the power switch 11 to the side where "ON" is printed, the power is input to the electronic camera 1, the release switch 10 is disposed in surface Y1 is pressed, so the process of shooting the object begins.

In addition, when the LCD cover 14 is closed, the CPU 39 restarts the operation of CCD 20, the image processor 31, and the stop driver 53 when the release switch 10 is placed in a half-pressed state and the processing of shooting the object begins when the release switch 10 is placed in a full-pressed state.

The light image of the object which is observed by the finder 2 is collected by the shooting lens 3 and is image-formed on the CCD 20. The light image of the object which is image-formed on the CCD 20, which has a plurality of pixels, is photoelectrically converted into an image signal in each pixel and is sampled at the rate of 30 times every one second by the image processor 31. In addition, at this time, the image processor 31 thins out ⅛ of the pixels among the image electrical signals of all the pixels of the CCD 20.

Figure 8:
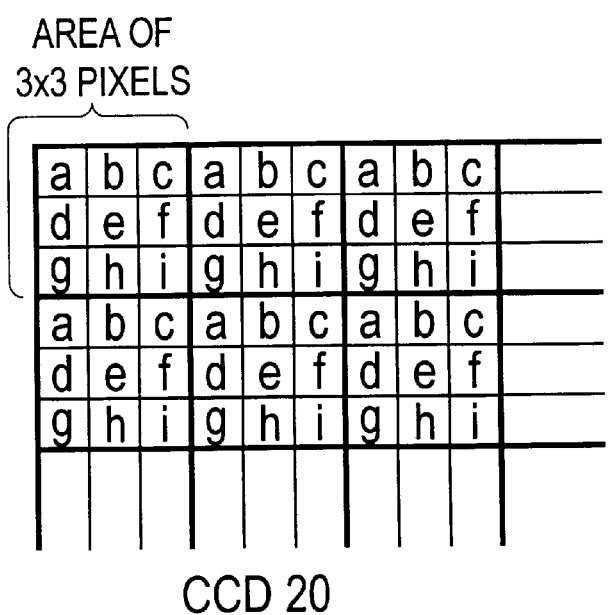
FIG. 8 is a diagram explaining the processing of thinning out the pixels during the H mode.

That is, the image processor 31 divides the pixels of the CCD 20, which are arrayed in a matrix into areas of 3×3 pixels, as shown in FIG. 8. The image electrical signal of one pixel which is disposed in a specified position from the area as sampled at the rate of 30 times per second, and the remaining eight pixels are thinned out.

For example, during the first sample (first frame), the pixel at the upper left of each area is sampled, and the other pixels b, c, d . . . i are thinned out. During the second sampling (second frame), the pixel b at the right of pixel a is sampled, and the other pixels a, c, d . . . i are thinned out. Hereafter, during the third and fourth sampling, the pixel c and pixel d are sampled, respectively, and the other pixels are thinned out. That is, each pixel is sampled every nine frames.

The image signals which were sampled by the image processor 31 (the image signal of ⅑ of all the pixels of the CCD 20) are supplied to the A/D converting circuit 32, are digitized there, and are output to the DSP 33.

After the image signals which were digitized are temporarily output to the buffer memory 36, DSP 33 reads the image signal. After compression is performed according to the JPEG method, the header information of the shooting date and time is added to the shot image data which was digitized and compressed, and is recorded to the shot image recording area of the memory card 24.

It is also possible to irradiate light to the object by operating the strobe 4 as needed. However, if the LCD cover 14 is opened, that is, when the LCD 6 performs the electronic viewfinder operation, the CPU 39 is controlled so as not to emit light.

Next, the operation to input two-dimensional information (pen inputting information) from the touch tablet 6A is explained.

When the touch tablet 6A is pressed by the tip of the pen 41, the X-Y coordinates of the place that was contacted are input to the CPU 39. These X-Y coordinates are recorded to the buffer memory 36. Furthermore, the data is written into the part of the frame memory 35 corresponding to each point of the above-mentioned X-Y coordinates, and a line drawing corresponding to the contact of the pen 41 can be displayed on LCD 6 at the above-mentioned X-Y coordinates.

As described above, the touch tablet 6A is structured by a transparent member, so it is possible for the user to observe the point (the point at the position which was pressed by the tip of the pen 41) which is displayed on LCD 6, and he/she feels as if a direct pen inputting were being performed on LCD 6. In addition, when the pen 41 is moved on the touch tablet 6A, a line is displayed on LCD 6 in response to the movement of the pen 41. Furthermore, when the pen 41 is intermittently moved on the touch tablet 6A, a dotted line is displayed on LCD 6 in response to the movement of the pen 41. Thus, the user can input desired drawing information such as characters and figures to the touch tablet 6A (LCD 6).

Furthermore, when the shot image is displayed on LCD 6, if line drawing information is input by the pen 41, the drawing information is combined with the shot image information by the frame memory 35 and is simultaneously displayed on LCD 6.

In addition, by operating a color selecting switch, which is undepicted, it is possible to select the color of drawing which is displayed on LCD 6, from among black, white, red, blue, or the like.

After inputting the line drawing information to the touch tablet 6A by the pen 41, when the executing key 7B or the operation key 7 is pressed, the line drawing information which is stored in the buffer memory 36 is supplied to the memory card 24 along with the input date and time header information and is recorded to the line drawing information recording area of the memory card 24.

Furthermore, the line drawing information which is recorded to the memory card 24 is information which has been compressed. The line drawing information which was input to the touch tablet 6A contains information with a high spatial frequency component, so it requires more time for both compression and decompression due to the inefficiency of compression if the compression processing is performed by the JPEG method, which is used for the compression of the above-mentioned shot image. In addition, compression by the JPEG method is nonreversible, so it is not appropriate for the compression of line drawing information with a small amount of information (when it is displayed on LCD 6 after decompression, the dithering and bleeding look obvious due to the failure of information).

Therefore, in the present embodiment, the line drawing information is compressed, by the run-length method which is used for a facsimile or the like. The run-length method is a method which compresses the line drawing information by scanning the drawing screen in the horizontal direction and encoding the length in which the information (point) of each color such as black, white, red, and blue continues, and the length which non-information (the part without pen inputting) continues.

By using this run-length method, it is possible to compress the line drawing information most desirably and to control the failure of the information even when the compressed line drawing information is decompressed. In addition, the line drawing information cannot be compressed if the information amount is relatively small.

Furthermore, as described above, when the shot image is displayed on LCD 6, when the pen inputting is performed, the shot image data and the line drawing information of the pen inputting are combined in the frame memory 35 and the combined image of the shot image and the line drawing is displayed on LCD 6. Meanwhile, in the memory card 24, the shot image data is recorded onto the shot image recording area and the line drawing information is recorded onto the line drawing information recording area. Thus, two pieces of information are recorded into different areas, respectively, so that the user can delete one of images (e.g., line drawing) from the combined image and compress each image information by an individual compression method.

Figure 9:
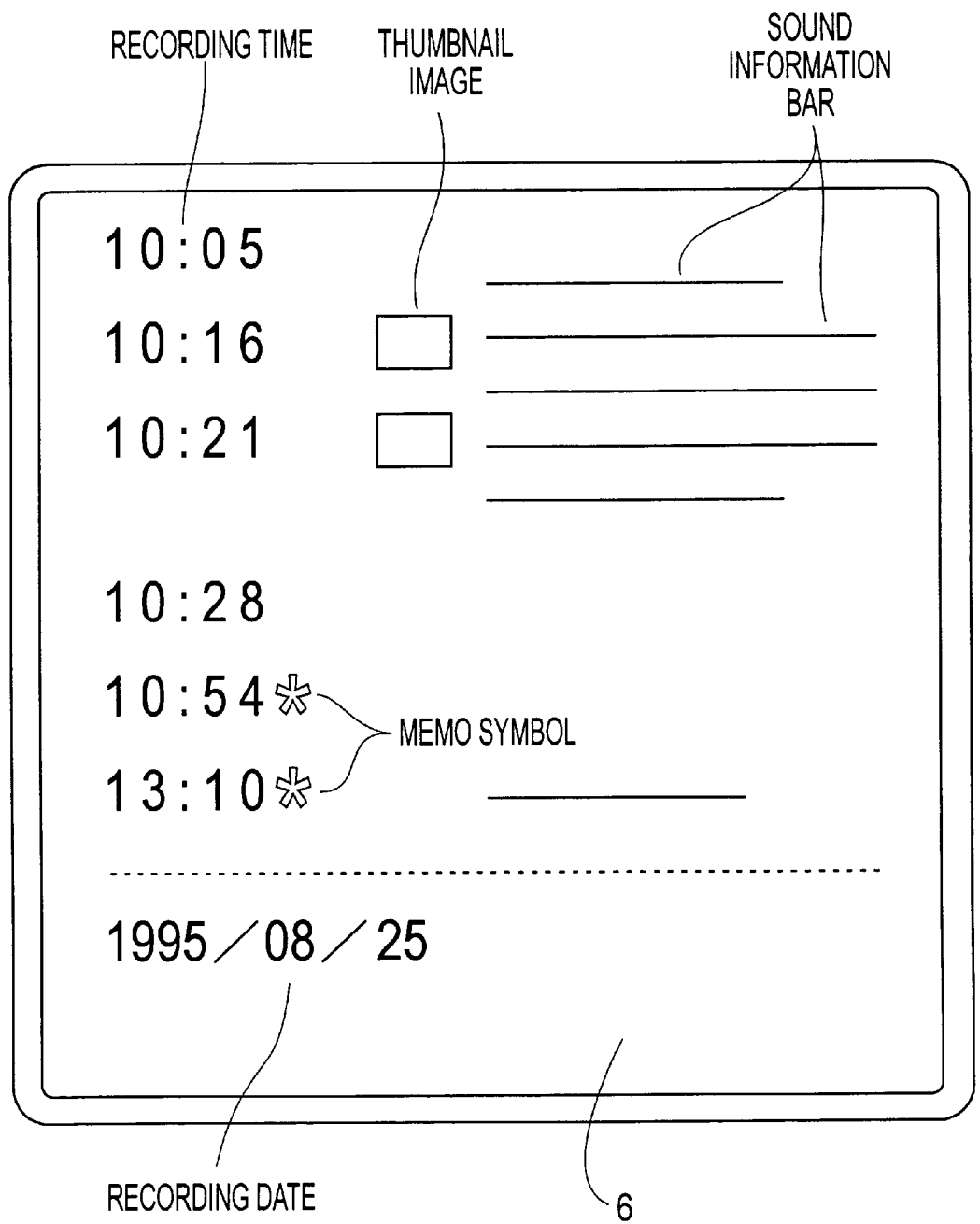
FIG. 9 is a diagram showing an example of the display screen of the electronic camera shown in FIGS. 1 and 2.

When data is recorded to the sound recording area, the shot image recording area, or the line drawing information recording area of the memory card 24, as shown in FIG. 9, a specified display is performed on LCD 6.

On the display screen LCD 6, shown in FIG. 9, year/month/date (recording date) of the time when the information was recorded (in this case, August 25, 1995) is displayed on the lower edge of the screen and the recording time of the information which was recorded on that recording date is displayed on the left side of the screen.

On the right side of the recording time, a thumbnail image is displayed. This thumbnail image is created by thinning out (reducing) bit map data of each image data of the shot image data which was recorded in the memory card 24. The information which is displayed is the information including the shot image information. That is, the shot image information is included in the information which was recorded (input) into "10:16" and "10:21", and the image information is not included in the information which was recorded in "10:05", "10:28", "10:54", and "13:10".

In addition, a "*" shows that a specified memo is recorded as line drawing information.

On the right side of the display area of the thumbnail image, a sound information bar is displayed and a bar (line) corresponding to the length of the recording time is displayed (when sound information is not input, it is not displayed).]

The user selects and designates information to be reproduced by pressing a part of any desired information display line of LCD 6 shown in FIG. 9 with the tip of the pen 41, and the selected information is reproduced as the executing key 7B shown in FIG. 2 is pressed by the tip of the pen 41.

For example, when the line which is displayed by "10:05" shown in FIG. 9 is pressed by the pen 41, CPU 39 reads the sound data corresponding to the selected recording time (10:05) from the memory card 24 and is supplied to the A/D and D/A converting circuit 42 after the decompression of the sound data. The A/D and D/A converting circuit 42 analogs the sound data which was supplied and reproduces it through the speaker 5.

When the shot image data which was recorded on the memory card 24 is reproduced, the user selects the information by pressing a desired thumbnail image by the tip of the pen 41 and reproduces the selected information by pressing the executing key 7B.

The CPU 39 instructs the DSP 33 to read the shot image date corresponding to the selected shot time and date from the memory card 24. The DSP 33 decompresses the shot image data (the shot image data which is compressed) which was read from the memory card 24, and the shot image data is stored into the frame memory 35 as bit map data and is displayed on LCD 6.

An image which was shot in the S mode is displayed on LCD 6 as a still image. Needless to say, the still image is an image which reproduces the image signal of the entire pixels of CCD 20.

An image which was shot in the L mode is continuously displayed at the rate of eight frames every second on LCD 6. At this time, the number of pixels which are displayed for each frame is ¼ of all the pixels of CCD 20.

Usually, human eyes sensitively respond to the deterioration of the resolution of the still image so that the user may think that thinning out of the pixels of the still image is a deterioration of the image quality. However, when the speed of the continuous shooting increases, eight frames are shot every second in the L mode, and when these images are reproduced at a speed of eight frames every second, the number of pixels of each frame becomes ¼ of the number of pixels of the CCD 20, but the human eye observes the image of 8 frames for one second, so the information amount which enters into human eyes for one second becomes double compared to the case of the still image.

That is, if the number of pixels of one frame of the image which was shot by the S mode is defined as 1, the number of pixels of one frame of the image which was shot in the L mode is ¼. When the image (still image) which was shot in the S mode is displayed on LCD 6, the information amount which enters into human eyes in one second is 1(=(number of pixels 1)×(number of frames 1)). Meanwhile, when an image which was shot in the L mode is displayed on LCD 6, the information amount which enters into human eyes for one second is 2(=(number of pixels ¼)×(number of frames 8)) (that is, twice the information of the still image enters into human eyes). Therefore, even though the number of pixels in one frame is ¼, the user can observe the reproduction image during the reproduction without noticing much deterioration.

In addition, in the present embodiment, various pixels for each frame are sampled and the sampled pixels are displayed on LCD 6, so a residual image effect occurs in human eyes, and the user can observe the image which was shot in the L mode on LCD 6 without noticing much deterioration, even if ¾ of the pixels are thinned out.

Moreover, an image which was shot in the H mode is continuously displayed at the rate of 30 frames every second on LCD 6. At this time, the number of pixels which are displayed for each frame is ⅙ of all the pixels of CCD, but the user can observe the image which was shot in the H mode on LCD 6 without noticing much deterioration due to the same reason as for the L mode.

In the present embodiment, when an object is shot in the L and H modes, the image processor 31 thins out the image of CCD 20 to the degree where the user does not notice much deterioration of the image quality during the reproduction, so it is possible to reduce the burden of the DSP 33 and to operate DSP 33 at low speed and with low power. Furthermore, by so doing, it is possible to reduce the cost of the device and save power.

Figure 10:
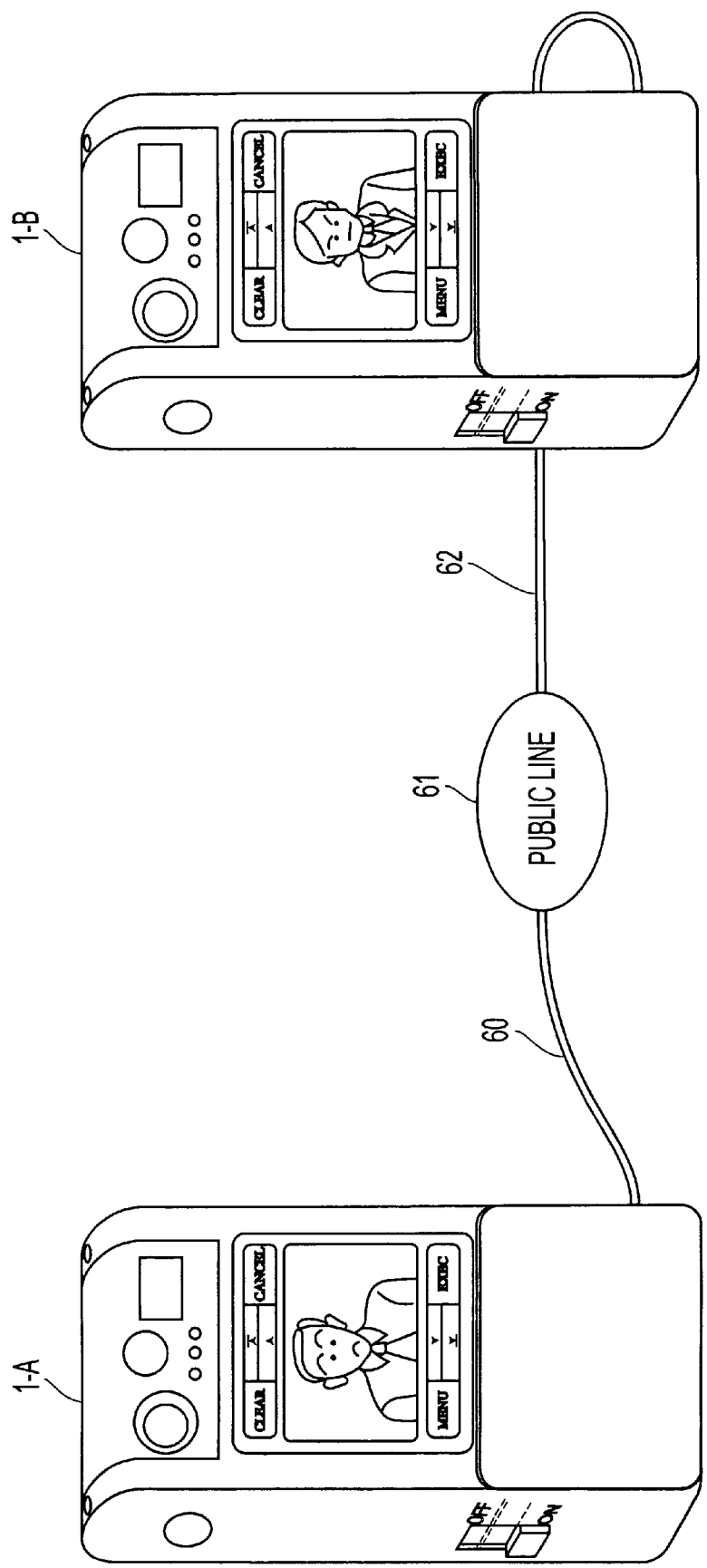
FIG. 10 is a diagram showing the connecting relationship when the electronic camera is connected through a public line as shown in FIG. 1.

Incidentally, in the present embodiment, as shown in FIG. 10, two electronic cameras 1-A and 1-B are connected through the public line 61 and can mutually communicate. Furthermore, hereafter, the operating mode in which two electronic cameras are mutually connected through the communication line such as a public line and communication is performed between these two is called a video telephone mode.

In the example shown in FIG. 10, the electronic camera 1-A is connected to the public line 61 through the connecting line 60 and the electronic camera 1-B is connected to the public line 61 through the connecting line 62. At this time, respective shooting lenses 3 face toward the subnormal direction of surface X2 (the direction where the users exist), and the light image of the respective users which are converted into an image signal by CCD 20 are mutually transmitted through the public line 61 and displayed on the respective LCDs 6. Therefore, the image of the user on the other side can be displayed on each respective LCD 6 of the electronic cameras 1-A and A-B.

Figure 11:
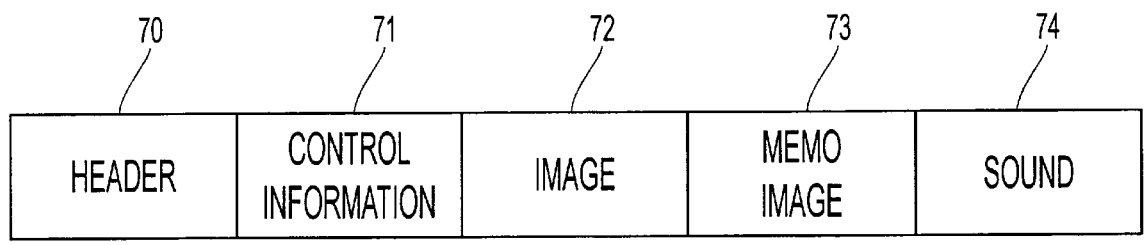
FIG. 11 is a diagram showing one example of the format of the information which is mutually transmitted between electronic cameras through the public line as shown in FIG. 10.

FIG. 11 shows one example of the information format which is transmitted through the public line 61 between the electronic cameras 1-A and 1-B. As shown in this figure, the information which is transmitted through the public line 61 is formed by a header 70 in which the information showing the types of information transmitted before and after is stored, control information 71 to control the electronic camera 1 of the other side, image information 72, memo information 73 comprising line drawing or the like, and sound information 74. Moreover, depending on the types of information to be transmitted, there are cases that one or more of control information 71, the image information 72, the memo image information 73, or sound information 74 are not included.

Figure 12:
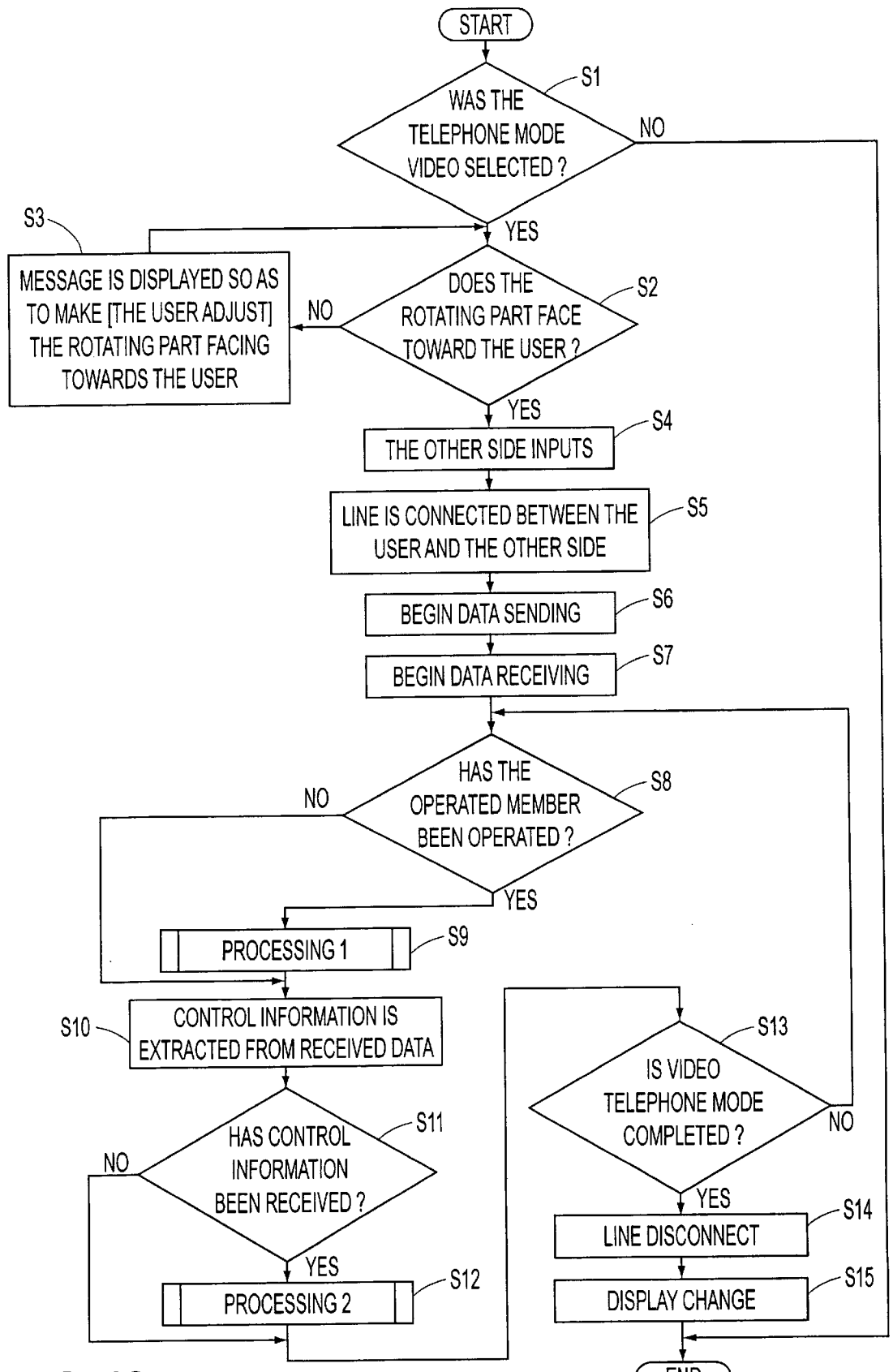
FIG. 12 is a flow chart explaining one example of the processing which is executed in the electronic camera as shown in FIG. 10.

FIG. 12 is a flowchart explaining one example of processing which is executed in the electronic cameras 1-A and 1-B. The program shown in the flowchart is stored in the memory card 24. The present program can be supplied to the user in a state where it is recorded onto the memory card 24, or where it is recorded on a CD/ROM which can be copied onto the memory card 24.

This processing is performed when the menu key 7A is operated and the menu screen is displayed. In the following explanation, the electronic camera 1-A is the sender and the electronic camera 1-B is the receiver.

When the processing shown in FIG. 12 is performed, CPU 39 determines whether the video telephone mode was selected among the selection items of the menu screen in step S1. As a result, when it is determined that an item other than the video telephone mode was selected (NO), the processing is completed (END). When it is determined that the video telephone mode was selected (YES), the program proceeds to step S2.

In step S2, CPU 39 refers to the output of potentiometer 56 (see FIG. 6) and determines whether the rotating part 19 faces toward the user (whether the shooting lens 3 faces toward the subnormal direction of the surface X2). As a determination standard of this case, as shown in FIG. 5 (C), when the optical axis of the shooting lens 3 is within the area of ±30° of the subnormal direction of the surface X2, it is determined that the rotating part 19 faces the user (YES), and the rotating part 19 does not face toward the user in cases other than the above.

In step S2, when it is determined that the rotating part 19 does not face toward the user (NO), the program proceeds to step S3, and a message encouraging the user to face the rotating part 19 toward the user. For example, "please face the rotating part toward yourself" is displayed on LCD 6, and the program returns to step S2 and the same processing is repeated until the rotating part 19 faces toward the user. Furthermore, in step S2, when it is determined that the rotating part 19 faces toward the user (YES) the program proceeds to step S4.

Figure 13:
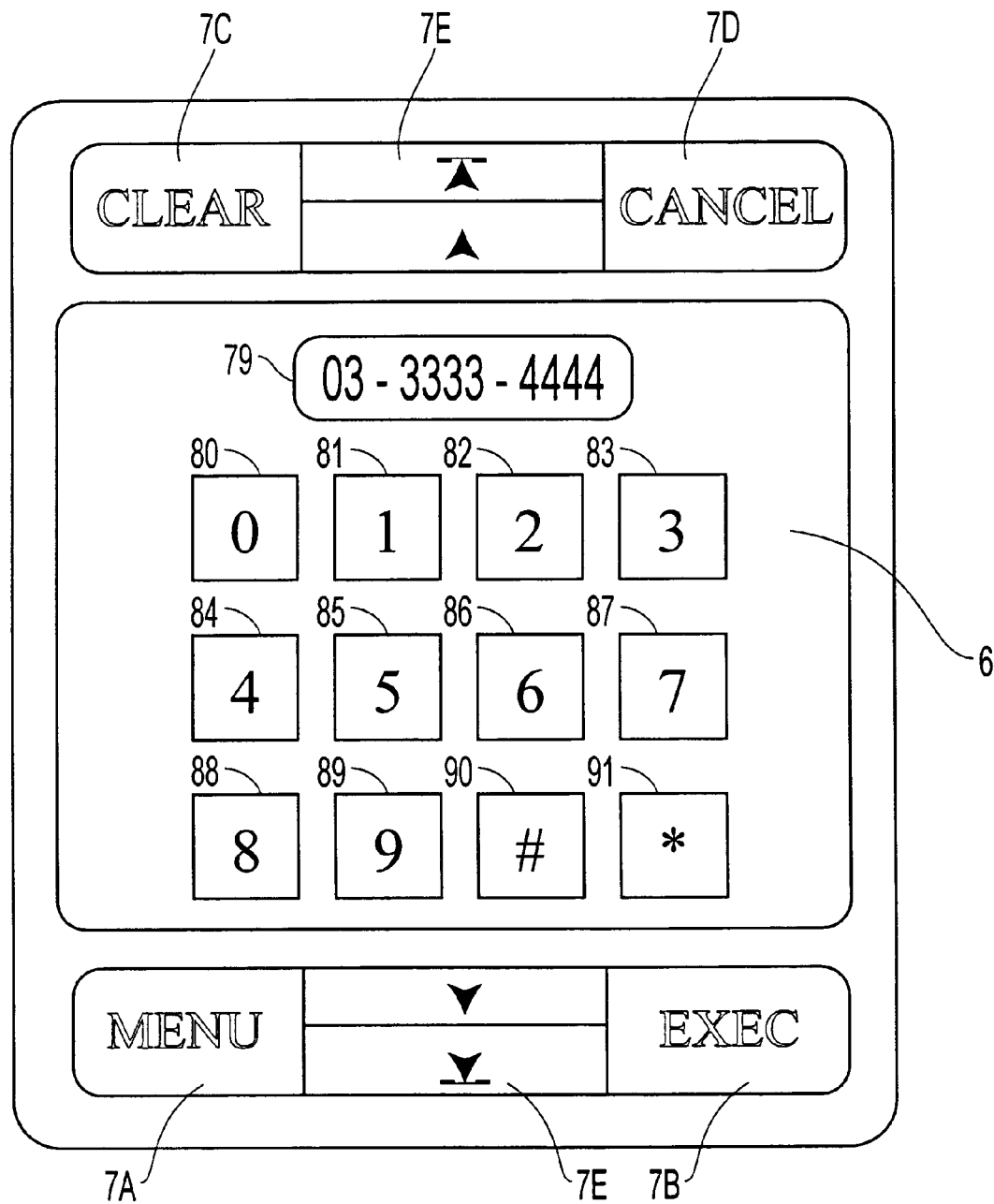
FIG. 13 is a display example of the screen which is displayed on the LCD in step S4 as shown in FIG. 12.

In step 4, the CPU 39 displays the numerical keys 80–91 on LCD 6, as shown in FIG. 13, and the telephone number of the other side is input by the user. Furthermore, in this display example, a window display 79 displaying the telephone number which was input by the numerical keys 80–91 is displayed at the top of the screen and the input telephone number can be confirmed. When the telephone number is input and the executing key 7B is pressed, the program proceeds to step S5.

Figure 14:
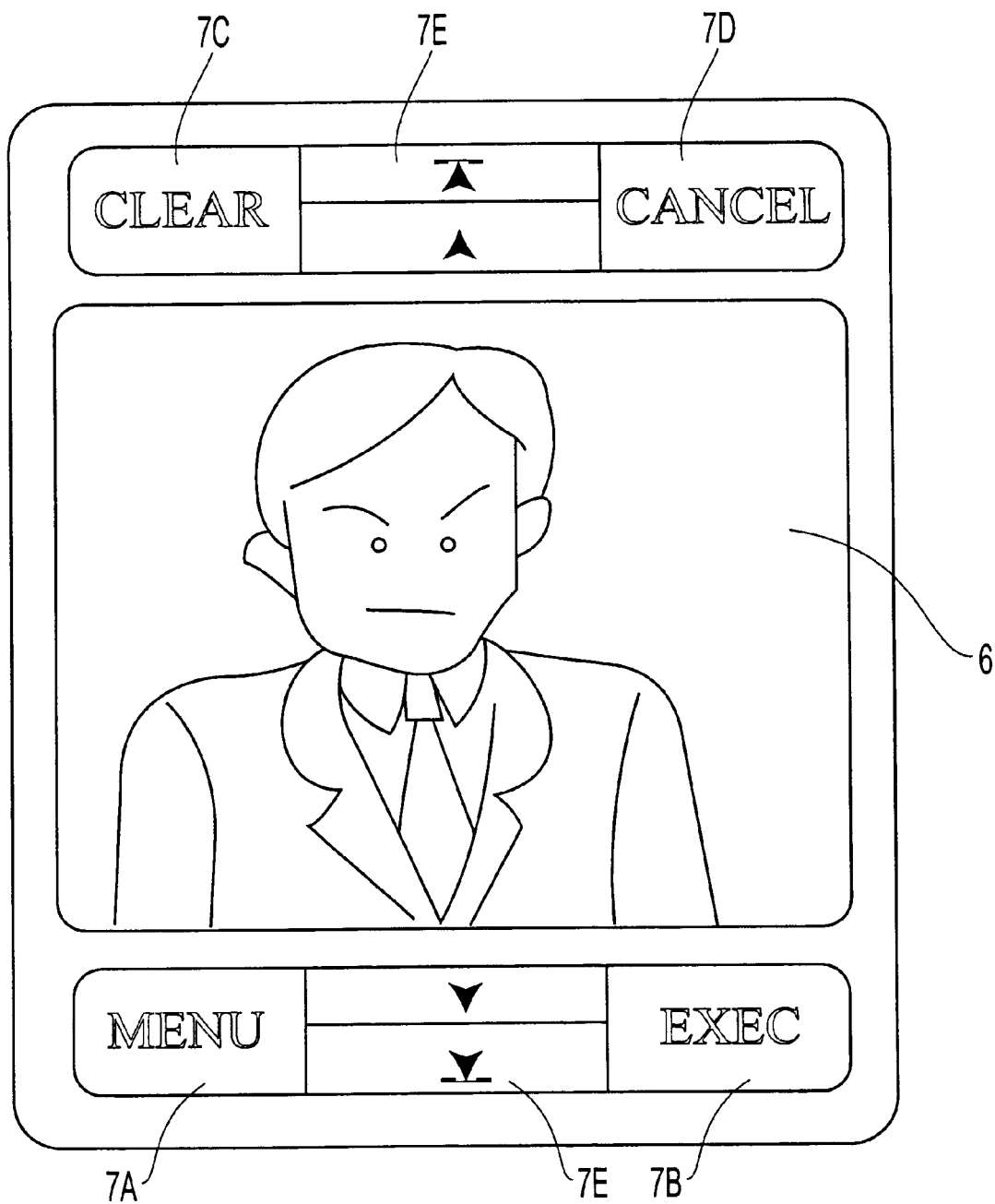
FIG. 14 is a diagram showing a display example of an image which is displayed on the electronic camera by the processing which is shown in FIG. 12.

In step S5, the CPU 39 outputs, for example, a tone signal corresponding to an input telephone number to the public line 61 by controlling the modem 57. As a result, a communication line is connected between the other side (receiver) and the sender. In the following step S6, the CPU 39 begins the transmission of data between the other side and the sender. That is, the image of the user A which was shot by the electronic camera 1-A as shown in FIG. 10 is transmitted through the public line 61 and is displayed on the LCD 6 of the electronic camera 1-B. As a result, on the electronic camera 1-B, the image is displayed as shown in FIG. 14.

Figure 15:
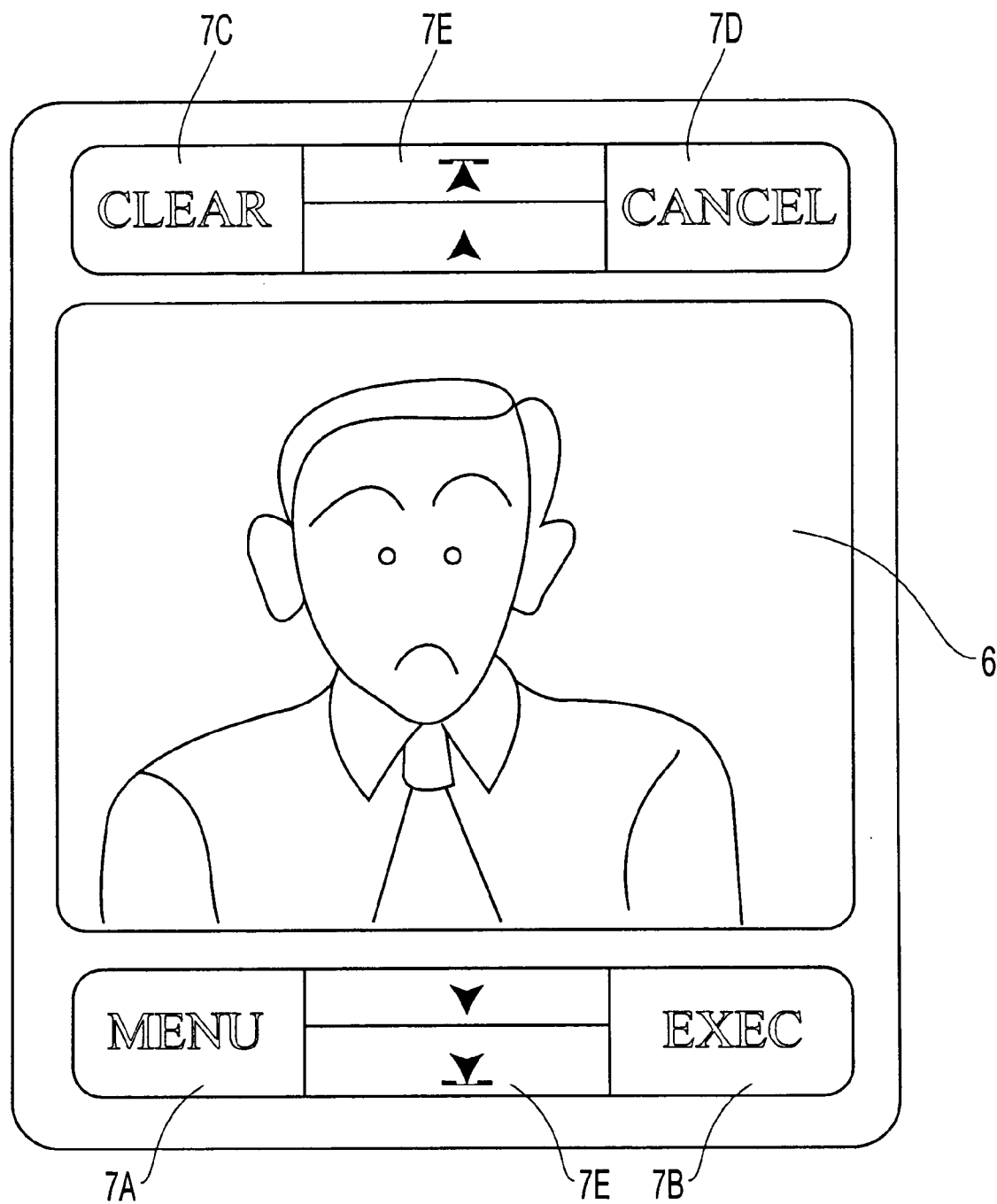
FIG. 15 is a diagram showing a display example of the image which is displayed on the electronic camera by the processing which is shown in FIG. 12.

In the following step S7, CPU 39 receives the data which was sent by the other side by controlling the modem 57. As a result, the image of the user B which was shot by the electronic 1-B is transmitted through the public line 61 and is displayed by LCD 6 of the electronic camera 1-A. FIG. 15 shows a display example of the image (the image of user B) which is displayed on LCD 6 of the electronic camera 1-A.

Furthermore, the resolution of the image of the objects which are mutually transmitted at this time is, for example, approximately 280×220 pixels, and is set lower than the resolution of CCD 20 (for example, 640×480 pixels). The image data like this is compressed and transmitted based upon, for example, the MPEG method.

In step S8, CPU 39 determines whether any of the touch tablet 6A, the control keys 7, the release switch 10 or the recording switch 12, which are the controlling members, is operated. As a result, if it is determined that any of these were operated (YES), the program proceeds to step S9. Furthermore, if it is determined that none of them is operated (NO), the program skips step S9 and proceeds to step S10.

In step S9, the processing 1 is performed. Furthermore, this processing 1 is a subroutine processing, and the details are discussed later with reference to FIG. 16.

In step S10, when the control information 71 is included in the data (the data which was transmitted by the other side) which was received by the modem 57, the CPU 39 extracts it.

In step S11, the CPU 39 determines whether the control information 71 is obtained from the data which was received. As a result, when it is determined that the control information 71 is obtained from the received data (YES), the program proceeds to step S12. Furthermore, if it is determined that the control information 71 is not obtained (NO), the program skips step S12 and proceeds to step S13. Furthermore, the processing of step S12 is a subroutine, and details will be discussed later with reference to FIG. 18.

In step S13, the CPU 39 determines whether an operation to complete the video telephone mode was operated. For example, when the cancel 7D is pressed, the CPU 39 determines that the operation to complete the video telephone mode was operated (YES), and the program proceeds to step S14. In addition, when it is determined that the cancel 7D is not pressed (NO), the program returns to step S8, and the same processing is repeated as described earlier.

In step S14, the CPU 39 performs processing to disconnect a communication line and the program proceeds to step S15. In step S15, the CPU 39 begins the electronic viewfinder operation in which the image which was input from the CCD 20 is displayed on the LCD 6, and the processing is completed (END).

According to the above processing, on the menu screen, when the video telephone mode is selected, it is determined whether the rotating part 19 faces toward the user. When the rotating part faces toward the user, the communication line between the user and the sender is connected and the data communication begins. When the data communication begins, it determines whether an operating member is operated, and whether control information is transmitted by the other side. As a result, when it is determined that an operating member is operated, a responsive processing is performed, and when it is determined that control information is transmitted by the other side, processing is performed responsive to the control information.

Figure 16A:
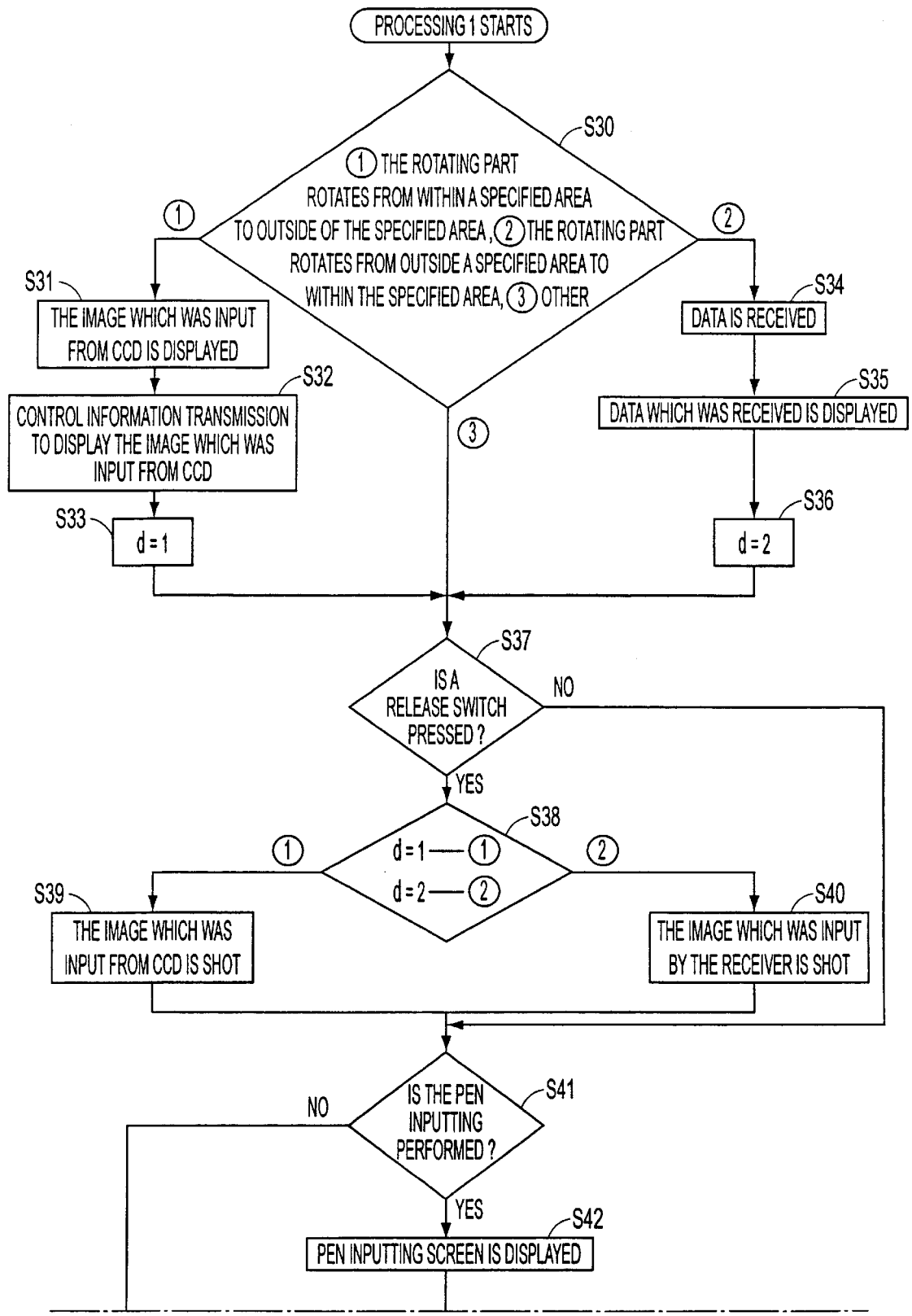
FIG. 16 is a flow chart explaining the processing which is shown in step S9 of FIG. 12 in detail.
Figure 16B:
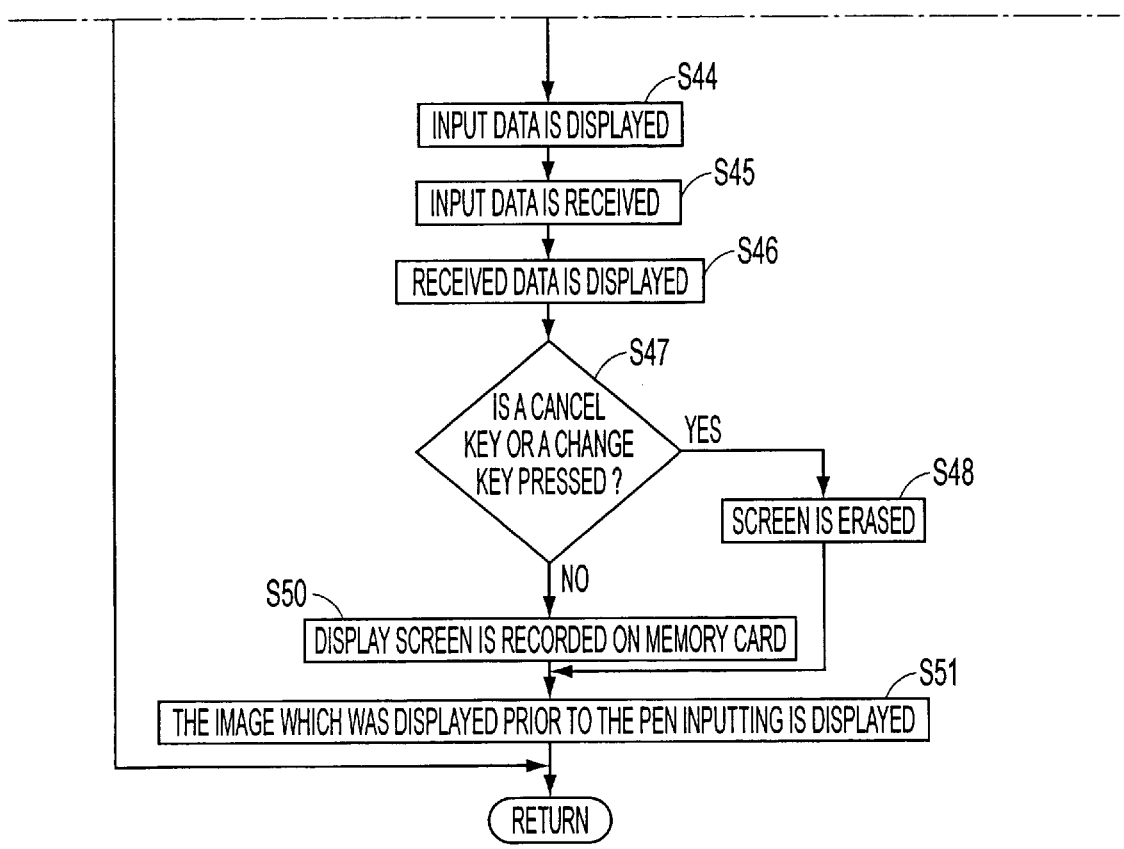

Next, by referring to the flow chart shown in FIG. 16, the details of the processing 1 as shown in FIG. 12 are explained. When this processing is performed (called), in step S30, the CPU 39 determines whether the rotating part 19 was rotated outside of a specified area from within the specified area (for example, within the area where the optical axis of the shooting lens 3 is within ±30° of the subnormal direction of the surface X2), rotated in the specified area from outside of the specified area, or any other cases (for example, the case when the rotating part is not rotated). As a result, if it is determined that the rotating part 19 is rotated outside of the specified area from within the specified area (1), the program proceeds to step S31. Furthermore, if it is determined that the rotating part 19 was moved to within the specified area from outside of the specified area (2), the program proceeds to step S34. In addition, if it is determined that it is none of the above (3), the program proceeds to step S37.

In step S30, if it is determined that the rotating part 19 was rotated to outside of the specified area from within the specified area (1), the program proceeds to step S31, and the CPU 39 begins the operation in which the image which was input from the CCD 20 is displayed on LCD 6. Then, the program proceeds to step S32, and the CPU 39 transmits the image information which was input from the CCD 20 of the sender's side (self) to the receiving side through the modem 57, and control information is transmitted so as to instruct the receiving side to display the image information which was transmitted. Furthermore, in step S33, the value 1 is substituted for the variable d showing the state of the rotating part 19, and the program proceeds to step S37.

In addition, in step S30, if it is determined that the rotating part 19 was rotated to within the specified area from outside of the specified area (2), the program proceeds to step S34, and the CPU 39 receives an image that was input in the CCD 20 of the sending side and transmitted through the public line 61 via the modem 57. Furthermore, the program proceeds to step S35, and after the operation of displaying the transmitted image on the LCD 6 begins, the program proceeds to step S36, and the value 2 is substituted for the variable d showing the state of the rotating part 19, and the program proceeds to step S37.

Furthermore, if the processing 1 is called first, the value 1 is substituted for the variable d as an initial value (as a result of the processing of step S2 of FIG. 12, the rotating part 19 always faces toward the user).

In addition, in step S30, when it is determined that this is any other case (for example, the rotating part 19 is not rotated), the program proceeds to step S37.

In step S37, the CPU 39 determines whether the release switch 10 was pressed. As a result, if it is determined that release switch 10 was not pressed (NO), the program proceeds to step S41. Furthermore, if it is determined that the release switch 10 was pressed (YES), the program proceeds to step S38.

In step S38, the CPU 39 determines whether the value of the variable d is 1 or 2. As a result, if it is determined that the value of the variable d is 1 (1), the program proceeds to step S39. Moreover, if it is determined that the value of the variable d is 2 (2), the program proceeds to step S40.

In step S39, the image which was input from the CCD 20 is shot (recorded). That is, the light image of the object which was input from the CCD 20 is sampled by the image processor 31 and is converted to digital signals by the A/D converting circuit 32. Furthermore, after the compression processing is performed by DSP 33 based upon the JPEG method, it is stored in the shot image storage area of the memory card 24. Furthermore, the resolution of the image which is recorded at this time is, for example, 640×480 pixels and is the same resolution as the case when ordinary shooting is performed.

Meanwhile, in step S40, the image which was input from the CCD 20 of the receiving side is received and recorded. That is, after it is input from the CCD 20 of the receiving side and a specified image processing is performed, the image which was transmitted through the public line 61 is received by the modem 57 and is recorded to the shot image recording area of the memory card 24. Furthermore, the resolution of the image which is recorded at this time is 640×480 pixels, just like the previous case, and is the same resolution as the case when ordinary shooting is performed.

For example, if the rotating part 19 faces toward the opposite direction from the user (outside of the specified area), in step S30, it branches into step S31, and the image which was input from the CCD 20 of the sender (self) is displayed on the LCD 6 of the sender, and the image input from the CCD 20 is transmitted to the receiver in step S32. As a result, the same image as the sender (the image which was input from the CCD 20 of the sender) is displayed on the LCD 6 of the receiver, and the value 1 is substituted for the variable d. The program proceeds to step S37.

In step S37, if it is determined that the release switch 10 was pressed (YES), because d=1 is established, it branches into step S39 from the following step S38, and the image which was input from the CCD 20 of the sender is recorded into the shot image recording area of the memory card 24.

After that, when the rotating part 19 faces toward the user (within the specified area), in step S30, it branches into step S34, and the image which was transmitted from the receiver is received and is displayed on LCD 6, and the value 2 is stored into the variable d.

In this state, when the release switch 10 is operated, YES is determined in step S37, the program proceeds to step S38, and it branches into step S40 because d=2 is established. Furthermore, in step S40, the image which was transmitted by being input from the CCD 20 of the receiver is recorded into the shot image recording area of the memory card 24.

Thus, regardless of whether the image is from the sender or receiver, when the release switch 10 is pressed, the image which is displayed on the LCD 6 is recorded onto the memory card 24. Furthermore, as described earlier, the resolution of the image which is mutually transmitted in the video telephone mode is controlled to approximately 280× 220 pixels, but if the release switch 10 is operated, an image which is formed by 640×480 pixels is transmitted and recorded.

In addition, if shooting is performed by either the sender or receiver, the image which was shot is displayed on the LCD 6 of both the sender and receiver, and a memo image (line drawing) can be written onto the shot image which is displayed by a method which will be discussed later.

That is, in step S41, the CPU 39 determines whether the pen inputting was performed by referring to the output of the touch tablet 6A. As a result, if it is determined that pen inputting was not performed (NO), the program returns to step S10 of FIG. 12. Furthermore, if it is determined that pen inputting was performed (YES), the program proceeds to step S42.

In step S42, the CPU 39 displays the pen inputting screen (for example, a screen with a blue background) on LCD 6. Furthermore, the program proceeds to step S43, and the CPU 39 transmits control information which displays the pen inputting screen to the receiver. As a result, the same pen inputting screen can be displayed on the receiver.

Figure 17:
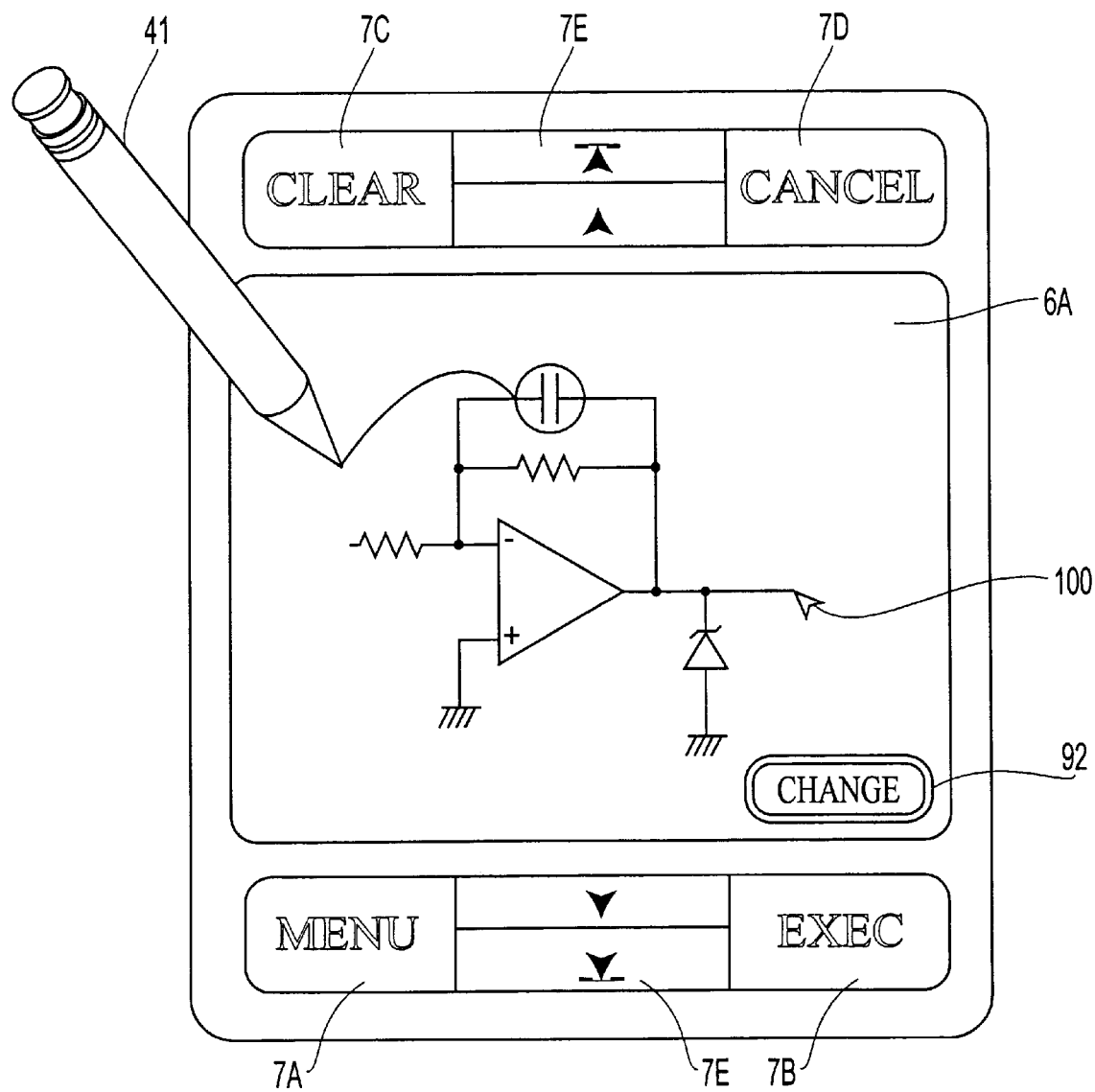
FIG. 17 is a diagram showing a display example of the image which is displayed when the pen input is performed.

In step S44, CPU 39 displays the memo information which was input by the pen 41 by the sender on the LCD 6. FIG. 17 is a figure showing the display of a memo image (line drawing) which was input by the pen 41 on LCD 6, as a result of the processing of step S44 (or step S46). In this display example, a circuit using a calculation amplifier is input as a drawing, and if the pen 41 moves on the touch tablet 6A, a corresponding line or curve is displayed on LCD 6. At that time, the information which was input by the touch tablet 6A is stored in the buffer memory 36 as coordinate information, and in response to this coordinate information, CPU 39 writes corresponding bit map data corresponding to the frame memory 35. Thus, the coordinate information which was stored in the buffer memory 36 can be deleted when the cancel key 7D is pressed as discussed later.

When the processing of step S44 is completed, the program proceeds to step S45. The CPU 39 transmits the memo image which was input to the receiver through the modem 57.

In step S46, the CPU 39 makes the modem 57 receive the memo information which was input by the pen 41 from the receiver, makes the image which was received superposed upon the data which was stored in the frame memory 35, converts it into the coordinate information and stores it in the buffer memory 36. As a result, the memo image which was input by the sender and the memo image which was input by the receiver will be superposed and displayed on the LCD 6. That is, as shown in FIG. 17, if inputting is performed by the pen 41 on the touch tablet 6A of the receiver, a cursor 100 is displayed at the position corresponding to LCD 6 of the sender, and a locus of the cursor 100 is displayed by a line or curve. Furthermore, a position of the pen 41 on the sender is displayed by the cursor in the receiver, and a line or curve corresponding to the locus of the pen 41 of the receiver is drawn.

In step S47, the CPU 39 determines whether the cancel key 7D or the change key 92 as shown in FIG. 17 is operated by either the sender or receiver. As a result, if it is determined that both the cancel key 7D and the change key 92 are not operated, the program returns to step S44 and the same processing is repeated as described earlier. Furthermore, if it is determined that the cancel key 7D or the change key 92 is operated (YES), the program proceeds to step S48.

Therefore, if the cancel key 7D or the change key 92 is operated by either the sender or receiver, proceed to the processing of step S48.

In step S48, the CPU 39 erases the image which is displayed on LCD 6 by clearing the bit map information which is written in the frame memory 35, and clears the coordinate information which is written in the buffer memory 36. Therefore, if the cancel key 7D or the change key 92 is operated by either the sender or the receiver, both memo images of the electronic camera 1 will be erased. Then, the program proceeds to step S51.

Furthermore, as described earlier, when the pen inputting screen is displayed, if the cancel key 7D or the change key 92 is operated, both the frame memory 35 and the buffer memory 36 are cleared, and the memo information which was input by the pen 41 is all deleted. However, for example, during the memo inputting screen display, if the menu key 7A is operated and the menu screen is displayed, the bit map information of the frame memory 35 is updated, but the coordinate information which is stored in the buffer memory 36 is not cleared so that the memo image which was previously input is displayed again if the memo inputting screen is displayed.

Moreover, after a specified drawing is input in the pen inputting screen, if the screen display is changed (for example, when the menu screen is displayed as discussed earlier), it is also acceptable to provide two modes, a mode that clears the content of the buffer memory 36 and a mode that does not clear the content, and to appropriately select one of them.

Meanwhile, in step S47, if it is determined that the cancel key 7D and the change key 92 are not operated (NO), the program proceeds to step S49, and it determines whether the executing key 7B was operated by either the sender or the receiver. As a result, if it is determined that the executing key 7B was not operated (NO), the program returns to step S44 and the same processing is repeated as discussed earlier. In addition, if it is determined that the executed key 7B was operated (YES), the program proceeds to step S50.

In step S50, after adding specified header information to the coordinate information (the coordinate information corresponding to the memo image which is displayed on LCD 6) which is stored in the buffer memory 35, it is stored in the line drawing information recording area of the memory card, and the program proceeds to step S51.

In step S51, the image which was displayed prior to the pen inputting is displayed on LCD 6 again, and the program returns to the processing of step S10 of FIG. 12.

Incidentally, in order to confirm what is displayed on LCD 6 of the other side, a small window may be displayed on part of the screen, and the same image may be displayed as is displayed on the LCD 6 of the other side. Furthermore, it is also acceptable to erase this window when the images which are displayed on the LCDs 6 are the same.

In addition, it is also acceptable to reduce the image which is displayed on the LCD 6 of the other side, display this reduced image on the screen, and then, by pressing this reduced image (hereafter referred to as the reduction image) by the pen 41, to display the reduction image by enlarging it as much as possible on the screen, and to display the image which is displayed on the LCD 6 at that time as a reduction image. In that case, in order to distinguish the window between the other side and self, for example, it is also acceptable to display a message such as "the screen which is displayed to the other side" on the window of the other side. By setting a structure like that, for example, when a window showing the image of the other side which is displayed by reduction is enlarged and displayed, it is possible to prevent mistaking the window between the other side and self.

According to the above processing, when the rotating part 19 faces toward the user, that is, when the image of the other side is displayed on LCD 6, if the release button 10 is pressed, an image (the image of 640×480 pixels) with high accuracy corresponding to the image of the other side which is displayed on the LCD 6 of the other side is transmitted and recorded onto the memory card 24. Furthermore, if one rotating part 19 faces toward the side opposite to the user, for example, if the rotating part 19 of the sender faces the side opposite to the user and the image which was input by the CCD 20 of the sender is displayed on the LCDs 6 of both the sender and receiver, when the release button 10 is operated, an image with high accuracy corresponding to the image which was input by the CCD 20 of the sender, which is displayed on the LCD 6, is recorded onto the memory card 24 of the side where the release button 10 was operated.

Furthermore, if the pen inputting is performed by either the sender or the receiver, the pen inputting screen is displayed on both LCDs 6. Furthermore, the memo images which are input, by the sender and receiver, are superposed and displayed so the users feel as if they were writing on one sheet of a memo image.

In addition, the memo image which was thus created can be recorded into the line drawing information recording area of the memory card 24 by operating the executing key 7B. Furthermore, the memo image which is stored this time is the image which was created by superposing the images which were input by both and the receiver.

Figure 18:
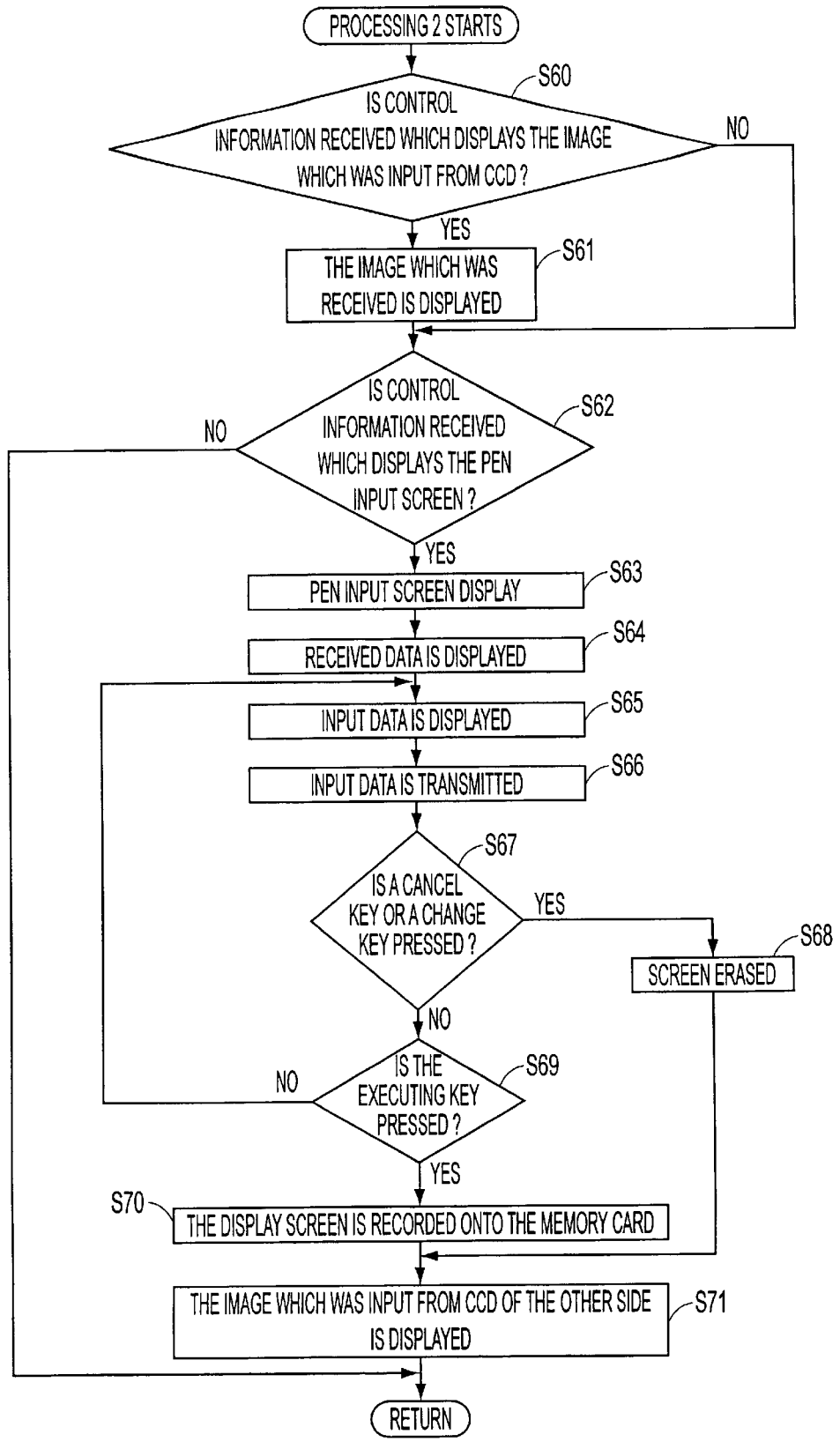
FIG. 18 is a flow chart explaining the detailed processing which is shown in step S12 of FIG. 12.

Next, by referring to FIG. 18, details of the processing 2 are explained.

When the processing is performed, in step S60, the CPU 39 determines whether the modem 57 received the control information (the information which was transmitted in the processing of the step S32 by the electronic camera 1-B of the receiver) that causes the image which was input from the CCD 20 to be displayed. As a result, if it is determined that the above-mentioned control information was not received (NO), the program proceeds to step S62. If it is determined that the above-mentioned control information was received (YES), the program proceeds to step S61.

In step S61, CPU 39 displays the image which was transmitted by the receiver and received by the modem on LCD 6, and the program proceeds to step S62.

In step S62, the CPU 39 determines whether the control information (the information which was transmitted in the processing of step S43 by the electronic camera 1-B of the receiver) which causes the pen inputting screen to be displayed was received. As a result, if it is determined that the above-mentioned control information was not received (NO), the program returns to step S13 of FIG. 12. If it is determined that the above-mentioned control information was received (YES), the program proceeds to step S63.

In step S63, the pen inputting screen is displayed on LCD 6. That is, the CPU 39 displays the pen inputting screen with a blue background on LCD 6. Furthermore, in the following step S64, the CPU 39 receives the memo image which was input by the receiver and displays it on LCD 6.

In the following step S65, the CPU 39 receives the memo image which was input by the sender (self) by referring to the output of the touch tablet 6A, and this is displayed on LCD 6. In step S66, the memo image which was obtained in step S65 is transmitted to the receiver through the modem 57.

In step S67, the CPU 39 determines whether the cancel key 7D or the change key 92 was operated by either the sender or the receiver. As a result, if it is determined that the cancel key 7D or the change key 92 was operated (YES), the program proceeds to step S68, the data which is stored in the frame memory 35 and the buffer memory 36 is cleared, the image which is displayed on the LCD 6 is erased, a control signal is sent to the receiver, and the content of the frame memory 35 and buffer memory 36 of the receiver is cleared. Then, the program proceeds to step S71. In addition, if it is determined that neither of the cancel key 7D and the change key 92 were operated (NO), the program proceeds to step S69.

In step S69, the CPU 39 determines whether the executing key 7B was operated. As a result, if it is determined that the executing key 7B was not operated (NO), the program returns to step S65 and the same processing is repeated as described earlier. Moreover, if it is determined that the executing key 7B was operated (YES), the program proceeds to step S70.

In step S70, after the CPU 39 adds the coordinate information (the coordinate information corresponding to the image where the memo images which were input by both sender and receiver was superposed) which is stored in the buffer memory 36 to the header, it is recorded to the line drawing information recording area of the memory card 24. Furthermore, the program proceeds to step S71, the CPU 39 begins the operation of displaying the image which was input by the CCD 20 of the other side (in this case, the receiver) on LCD 6, and the processing is completed (END).

According to the above processing, in response to a control signal which is transmitted by the receiver, it is possible to move to the video telephone mode and the pen inputting mode.

Figure 19:
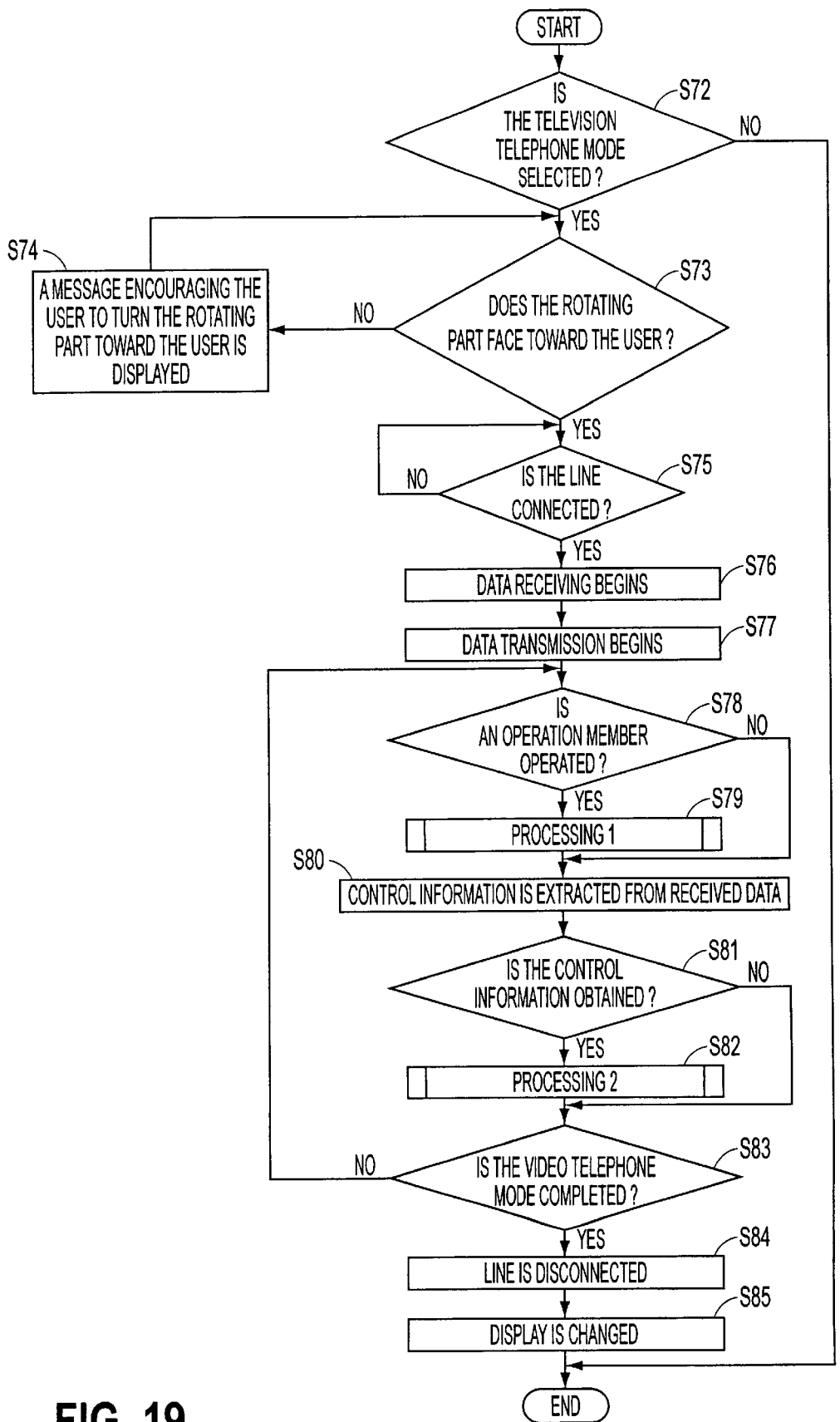
FIG. 19 is a flow chart explaining one example of the processing which is executed in the electronic camera as shown in FIG. 10.

Next, by referring to FIG. 19, one example of processing which is performed in the receiver side electronic camera 1-B is explained. The program shown in this flow chart is stored on the memory card 24 just like the previous case. Moreover, it is acceptable to supply this program to the user in a state where it is stored in the memory card 24 on a CD-ROM (compact disk-ROM) or the like and it is also acceptable to supply it in a state where it is stored and can be copied to the memory card 24.

When this processing is performed, the CPU 39 in step S72 determines whether the video telephone mode was selected on the display menu screen by operating the menu key 7A. As a result, if it is determined that the video telephone mode was not selected (NO), the processing is completed (END). In addition, if it is determined that the video telephone mode was selected (YES), the program proceeds to step S73.

In step S73, CPU 39 determines whether the rotating part 19 faces toward the user. As a result, if it is determined that the rotating part 19 does not face toward the user (NO), the program proceeds to step S74. For example, a message stating "please face the rotating part toward yourself" is displayed on LCD 6, the program returns to step S73, and the same processing is repeated until the rotating part 19 faces toward the user. Furthermore, if it is determined that the rotating part 19 faces toward the user (YES), the program proceeds to step S75.

In step S75, it is determined whether a communication line is connected between the user and the other side. That is, CPU 93 determines whether a calling is performed by the sender and the communication line is connected. As a result, if it is determined that the line is not connected (NO), the program returns to step S75, and the same processing is repeated until the communication line is connected. Furthermore, if it is determined that the communication line is connected (YES), the program proceeds to step S76.

In step S76, the CPU 39 controls the modem 57 and begins a process of receiving data. As a result, the image which was input from the CCD 20 of the sender is received by the modem 57 of the receiver and the operation of displaying it on LCD 6 begins. In the following step S77, the data sending processing by the modem 57 of the receiver begins. As a result, the image which was input by the CCD 20 of the receiver is transmitted by the modem 57 and is displayed on the LCD 6 of the sender.

In step S78, the CPU 39 determines whether an operating member was operated (the touch tablet 6A, the operating key 7, the release switch 10, or the recording switch 12). As a result, if it is determined that an operating member is not operated (NO), the program proceeds to step S80. Furthermore, if it is determined that an operating member is not operated (YES), the program proceeds to step S79.

In step S79, the processing 1 is performed. This processing is the same as the processing shown in FIG. 16, so the explanation is omitted.

In the following step S80, if control information is included in the receiving data, CPU 39 extracts this information. Then, the program proceeds to step S81, and it is determined whether CPU 39 received the control information. As a result, if it is determined that the control information is not obtained, the program proceeds to step S83. Furthermore, if it is determined that the control information was received (YES), the program proceeds to step S82.

In step S82, the processing 2 is performed. The processing 2 is the same processing as shown in FIG. 18, so the explanation is omitted. When the processing of step S100 is completed, the program proceeds to step S83.

In step S83, CPU 39 determines whether a specified operation which completes the video telephone mode is performed. For example, if it is determined that the cancel key 7D is not pressed (NO), the program returns to step S78, and the same processing is repeated as described earlier. Furthermore, if the cancel key 7D is pressed, the CPU 39 determines that the operation which completes the video telephone mode was performed (YES), and the program proceeds to step S84.

In step S84, a line cutting processing is performed, and the communication line between the sender and receiver is cut off. Moreover, in step S85, the image which was input by the CCD 20 is selected as the image to be displayed on LCD 6 (the electronic viewfinder operation begins). Then, the processing is completed (END).

According to the above processing, it is possible to connect a communication line between the sender and the receiver and communicate between the sender and the receiver.

In addition, the present invention is not limited to the electronic camera of the above embodiment. Needless to say, it is also applicable, for example, to a portable telephone or the like.

Moreover, in the above embodiment, an image input by the CCD 20 is compressed based upon the JPEG standard, and transmitted through the communication line 61. Needless to say, for example, it is also acceptable to compress, based upon the MPEG standard, transmit, and perform corresponding decompression processing by the sender.

According to the information processing device and information processing method, if it is detected that a communication line is connected between another information processing device, an image that is input in the other information processing device and transmitted through the communication line is received and is output to the display device. If it is not detected that a communication line is connected between another information processing device, since a control program is recorded that outputs the image created in the information processing device to the display device, it is possible to automatically move to the video telephone mode when the line is connected.

Figure 20:
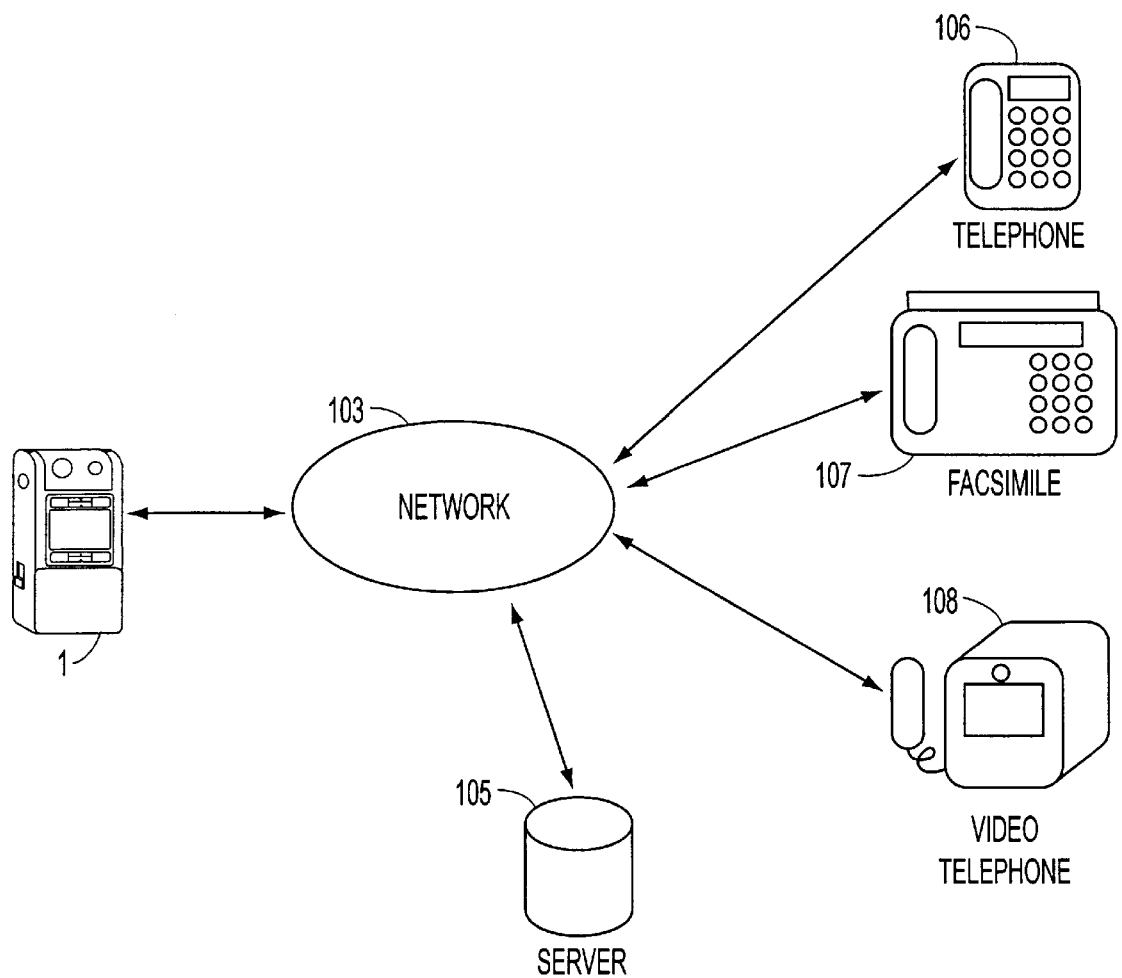
FIG. 20 is a drawing showing connection of the electronic camera shown in FIG. 1 via a network to various information processing devices.

FIG. 20 shows an exemplary representation of an electronic camera connected to other information processing devices via a network. In this example, the electronic camera 1 is connected to network 103. A server 105, a telephone 106, a facsimile 107, and a video telephone 108 are also connected to the network 103.

Figure 21:
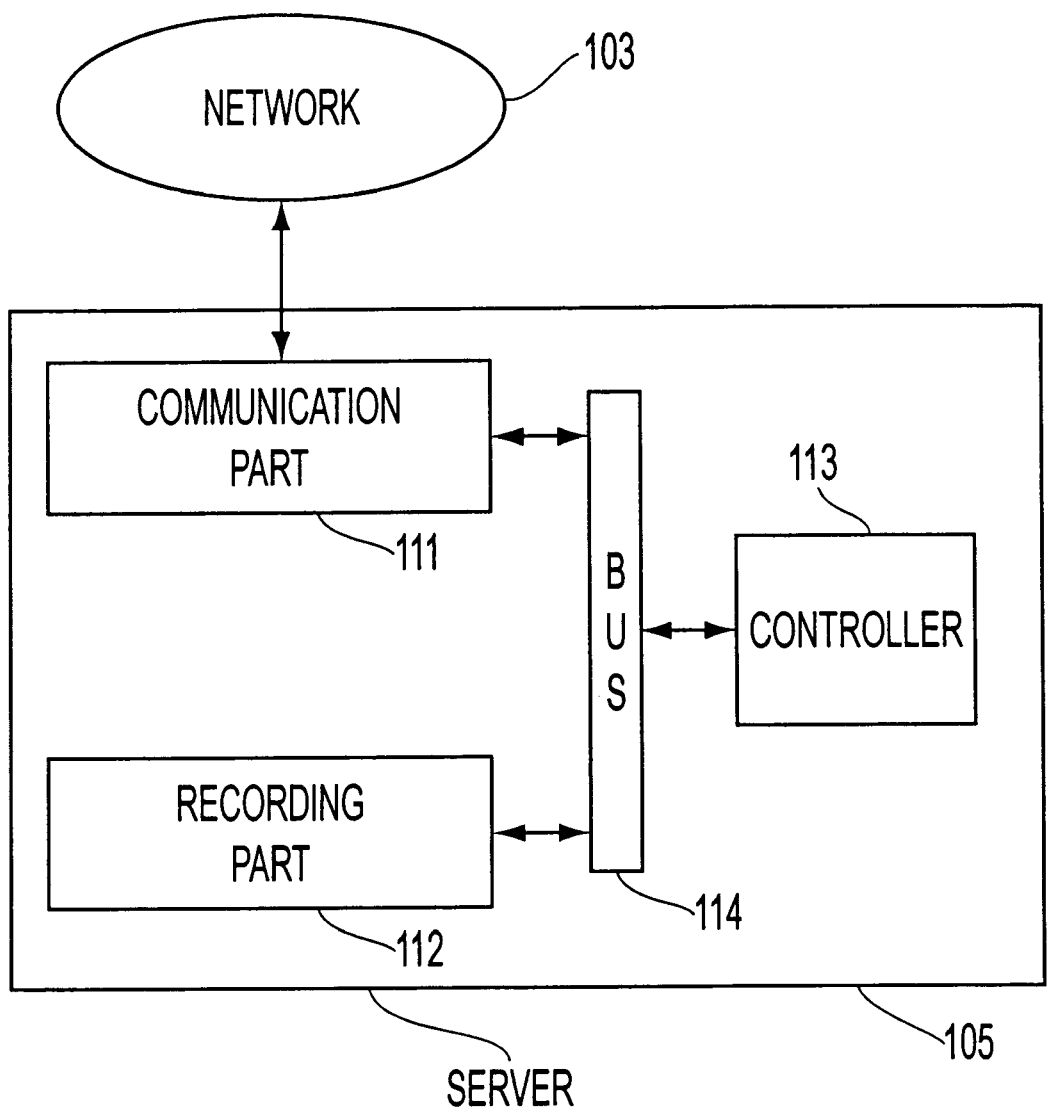
FIG. 21 is a block diagram showing an example of the composition of a server.

The server 105, as shown in FIG. 21, for example, records information that is supplied to the various information processing devices via the network 103 in a recording part 112 thereof. A communication part 111 carries out communication with other information processing devices via the network 103. A controller 113 is connected to the communication part 111 and the recording part 112 via a bus 114, and controls each part.

Figure 22:
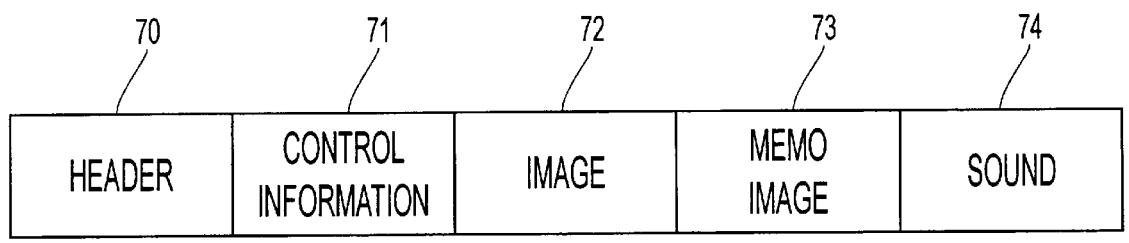
FIG. 22 is a drawing that describes the format of signals transmitted from the electronic camera of FIG. 20.

FIG. 22 shows one example of a format of information transmitted by the electronic camera 1 via the network (communication line) 103. As shown in this figure, the information that is to be transmitted via the network 103 is a header 70 that stores information showing the type of information that will be transmitted directly thereafter and identifying information whether the information processing device, which created the information, is an electronic camera, a video telephone, a facsimile machine, a server or the like. The transmitted information also includes control information 71 for controlling the information processing device of the communicating parties, image information 72, memo image information including a line drawing or the like, and sound information 74. Moreover, depending on the type of the transmitted information, the control information 71, the image information 72, the memo image information 73 and/or the sound information 74 may not be included.

Next, with reference to the flow charts of FIGS. 23–26, a process will be described in which the electronic camera 1 connects with the server 105, the telephone 106, the facsimile machine 107, and/or the video telephone 108 via the network 103 and sends and receives information.

First, in step S101, the CPU 39 determines whether a receiving mode is currently set. When the receiving mode is not set, the program proceeds to step S102, where it is determined whether the transmitting mode is set. If the transmitting mode is not set, the program returns to step S101, and thereafter repeats the processing of steps S102 and S101.

In step S102, when it is determined that the transmitting mode is set, the program proceeds to step S103, where the user calls the information processing device of the party with whom information will be sent and/or received. In the instant case, the user inputs the telephone number of the information processing device of the party to be connected from the touch tablet 6A by operating the pen 41 (FIGS. 13,17). In other words, the user inputs the telephone number of the server 105, the telephone 106, the facsimile machine 107, or the video telephone 108. The CPU 39 controls the modem 57 and calls the input telephone number.

Next, in step S104, the connection with the other party is awaited. When the connection with the other party is made, the program proceeds to step S105, where it is determined whether or not identifying information has been received form the information processing device of the other party. In other words, when, instead of the ordinary telephone 106 in FIG. 20, a server 105, facsimile machine 107, or video telephone 108 is connected to another information processing device, identifying information is transmitted for identifying itself to the other information processing device. In step S105, it is determined whether this identifying information has been received.

Figure 27:
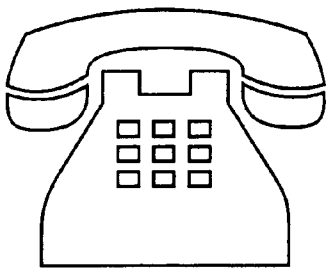
FIG. 27 is a drawing that shows an example of the display in step S116 of FIG. 23.

In step S105, if it is determined that identifying information has not been received from the other party, it is determined that the information processing device connected in step S104 is an ordinary telephone 106. In this case, the program proceeds to step S106, and the CPU 39 carries out a telephone mark display process. In other words, at this point the CPU 39 displays an image of a telephone mark, such as shown in FIG. 27, along with a message such as "connecting party does not have video telephone capability. This will be a sound-only communication." Therefore, the user can know that the information processing device of the connected party cannot transmit image information or line drawing information. Next, the program proceeds to step S107, and the CPU 39 turns off the LCD 6. Furthermore, in step S108, sound signal transmission processing is carried out. In other words, the user can use the microphone 8 and speaker 5 and carry on a conversation with the telephone 106 of the other party.

In step S109, it is determined whether or not the conversation has ended. If the conversation has not ended, the program returns to step S108 and repeats the processing of step S108. Thereafter, if it is determined in step S109 that the conversation has ended, the program proceeds to step S110, where a communication end procedure is carried out.

On the other hand, if it is determined in step S105 that identifying information has been received from the information processing device of the other party, the program jumps to step S111. The CPU 39 reads out identifying information that is pre-stored in a ROM, which is not shown, and transmits this identifying information to the other party via the modem 57. Therefore, it becomes possible to perform the same processing in the information processing device of the other party as in the electronic camera 1. For example, when an electronic camera with the same functions as the electronic camera 1 is connected to the network 103, the same processing can be performed in that electronic camera as well.

Next, the program proceeds to step S112, where it is determined whether the identifying information received from the other party indicates that the information processing device of the other party is a video telephone. If the information processing device of the other party is the video telephone 108, the program proceeds to step S113, and the CPU 39 determines whether the device of the other party can pen input line drawing information. If the other party's video telephone 108 does not have a line drawing information inputting function, the program proceeds to step S114, and the CPU 39 sets the superimposing mode that superimposes image information input from the CCD 20 with line drawing information input from the touch tablet 6A. When it is determined that the other party's video telephone 108 has a line drawing information inputting function, the processing of step S114 is skipped. In other words, the superimposing mode is not set.

Figure 28:
FIG. 28 is a drawing that shows an example of the display in step S117 of FIG. 23.

Next, the program proceeds to step S115, and image information, sound information or line drawing information is received from the other party's video telephone 108. Then, in step S116, it is determined whether image information has been received. If image information has been received, the program proceeds to step S117 and carries out a process that displays the received image information. In other words, in this case, the image information that has been transmitted from the video telephone 108 is displayed on the LCD 6 via the frame memory 35. Thus, an image of the user who is using the video telephone 108, such as the image shown in FIG. 28, is displayed on the LCD 6.

Figures 29, 30:
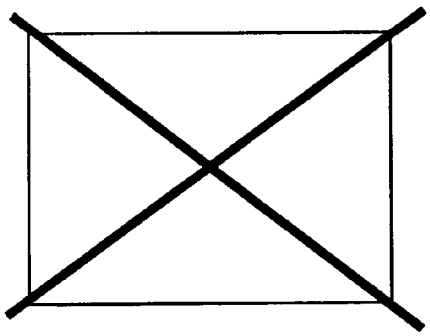
FIG. 29 is a drawing that shows an example of the display in step S118 of FIG. 23.
FIG. 30 is a drawing that shows an example of the display in step S133 of FIG. 23.

In contrast, if it is determined in step S116 that image information has not been received, the program proceeds to step S118, and the CPU 39 carries out a display, such as shown in FIG. 29, for enabling the user to know that there is no image of the other party. In the display example of FIG. 29, a symbol with an X over a square that represents an image, and the message "there is no image from the connecting party" are displayed. Thus, the user will not mistakenly think that the device is broken because there is no image displayed on the LCD 6.

Next, the program proceeds to step S119, where it is determined whether the superimposed mode is set. As described above, when the video telephone 108 of the other party does not have a line image input function, the superimposed mode is set in step S114. In this case, the program proceeds to step S121, and the CPU 39 causes line drawing information from the touch tablet of 6A input by the pen 41 to be superimposed by the DSP 33 on the image of the user input from the CCD 20. Then, in step S122, the image information superimposed in step S121 and sound information input in through the microphone 8 are transmitted to the video telephone 108 of the other party. In contrast, if it is determined in step S119 that the superimposing mode is not set, the program proceeds to step S120, and the CPU 39 executes processing to separately transmit the image information, line drawing information and sound information. In other words, when the video telephone 108 has a line drawing information input function, the video telephone 108 essentially has the same functions as the electronic camera 1. Therefore, in this case, these three types of information are transmitted separately.

Next, in step S123, it is determined whether the conversation has ended. If the conversation has not ended, the program returns to step S115 and repeats the processing of step S115. Thereafter, if it is determined in step S123 that the conversation has ended, the program proceeds to step S124 and carries out a communication end procedure.

In step S112, when it is determined that the information processing device of the other party is the video telephone 108, the above processing is executed. However, if it is determined in step S112 that the information processing device of the other party is not a video telephone 108, the program jumps to step S125 and determines whether the information processing device of the other party is a facsimile machine. This determination is also based on the identifying information. If it is determined that the information processing device of the other party is the facsimile machine 107, the program proceeds to step S126, and the CPU 39 controls the DSP 33 to read out information that has been pre-loaded and stored on the memory card 24, and causes this information to be displayed on the LCD 6. Then, in step S127, it is determined whether the image that is now displayed on the LCD 6 is a line drawing. If image is not a line drawing (i.e., if it is an ordinary image), the program proceeds to step S128 and causes the DSP 33 to perform dither processing in order to make it into an image that shows the density by the number of pixel points. When it is determined in step S127 that the image displayed on the LCD 6 (the transmitted information) is line drawing information, the program skips the processing of step S128.

Next, in step S129 the CPU 39 controls the DSP 33, and when a line drawing exists, superimposes this line drawing on the image. Then, in step S130, the CPU 39 causes the image information (when line drawing information exists, it is superimposed) to be transmitted to the facsimile machine 107 via the modem 57. Then, in step S131, the communication end procedure is executed.

Thus, the information that is transmitted to the facsimile machine 107 is the information that is pre-stored on the memory card 24.

In step S125, if it is determined that the information processing device of the other party is not a facsimile machine, the program jumps to step S132, and it is determined whether the information processing device of the other party is a network server. If the information processing device of the other party is not a network server, the program proceeds to step S133, and the CPU 29 causes characters to be displayed on the LCD 6, such as "communication error" as shown in FIG. 30. In other words, in the case of this processing example, since it is assumed that the information processing device of the other party will be one of the telephone 106, the facsimile machine 107, the video telephone 108, and the server 105, it is assumed that there is an error when none of these are present. Then, in step S134, the communication end processing is carried out.

Figure 31:
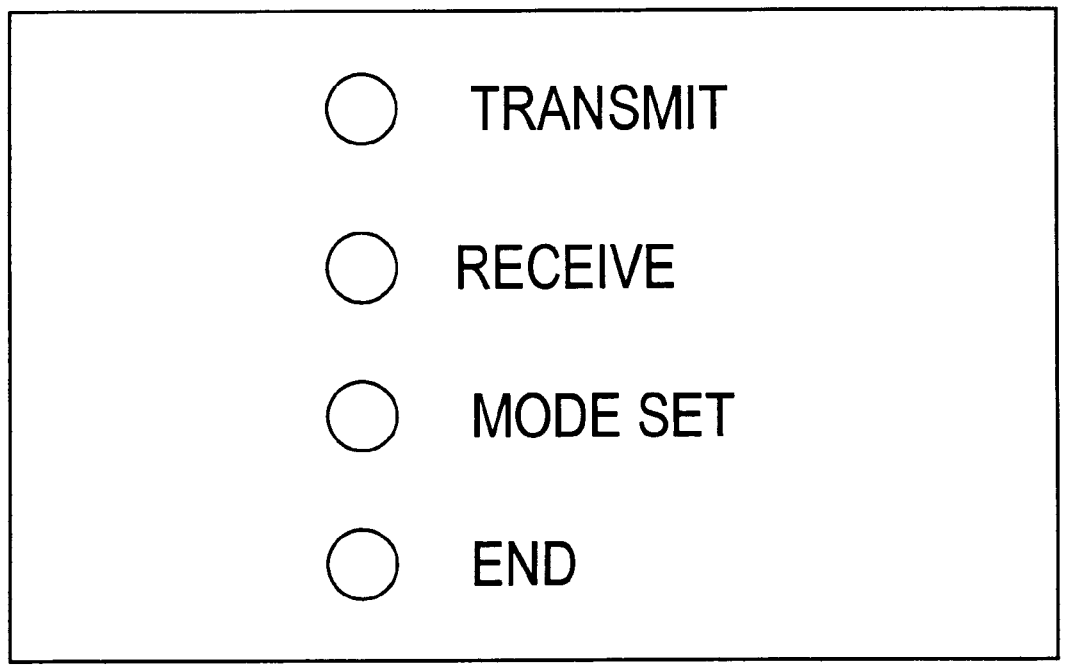
FIG. 31 is a drawing that shows an example of the display of the menu in step S135 of FIG. 24.

In step S132, if it is determined that the information processing of the other party is the server 105, the program proceeds to step S135, and the CPU 39 causes a menu, such as is shown in FIG. 31, to be displayed on the LCD 6. In this menu, characters are displayed such that "transmit", "receive", "mode set", or "end" can be selected. In step S136 through step S139, the program waits until one of the headings "transmit", "receive", "mode set", or "end" has been selected. In step S139, if it is determined that "end" has been selected by the pen 41, the program proceeds to step S140, and communication end processing is performed.

In contrast, if it is determined in step S136 that the characters "transmit" have been selected by the pen 41, the program proceeds to step S141. The CPU 39 controls the DSP 33, and causes images stored on the memory card 24 to be read out, and causes thumbnail images to be generated and displayed on the LCD 6. At this time, the user indicates which of the images among the displayed thumbnails are to be transmitted by using the pen 41. When the selection has been carried out, the CPU 39 reads out the original image data corresponding to the indicated thumbnails and stored on the memory card 24 in step S143. In step S144, this image data is transmitted to the server 105.

The server 105 records the image data that has been thus transmitted from the electronic camera 1 in the recording part 112. Thereafter, when the user finishes photographing with the electronic camera 1 and returns home, for example, he or she accesses the server 105 from a personal computer and can receive the transmission of the image data recorded in the server 105.

On the other hand, if it is determined in step S137 that the "receive" characters have been selected, the program proceeds to step S145, and the CPU 39 receives a menu of the server 105 from the server 105 and displays it on the LCD 6. At this point, in step S146, the user selects the information to be received from the server 105. When this selection has been performed, since the server 105 transmits the selected information, the CPU 39 receives the selected information in step S147. This receipt information is displayed on the LCD 6, and is also stored on the memory card 24 as needed.

In step S138, if it is determined that the "mode set" characters have been selected, the program proceeds to step S148, and a CPU 39 causes the mode set menu to be displayed. At this point, in step S149, the user selects the heading to be set from the displayed menu. When this selection has been performed, in step S150, the CPU 39 carries out processing to set the mode. Thus, for example, electronic mail transmission processing can be set on or off.

Figure 23A:
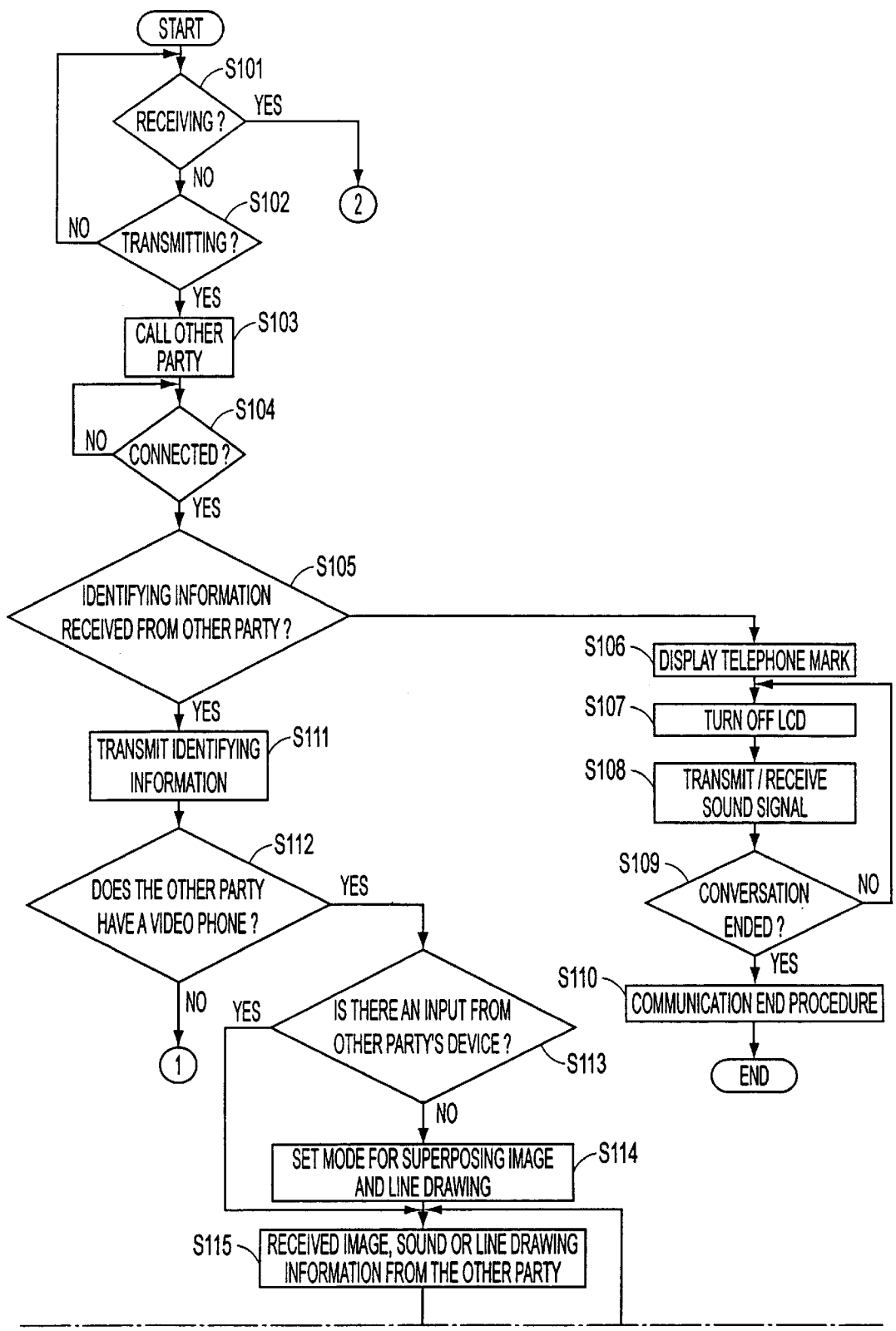
FIG. 23 is a flow chart that describes the processing of the electronic camera of FIG. 20.
Figure 23B:
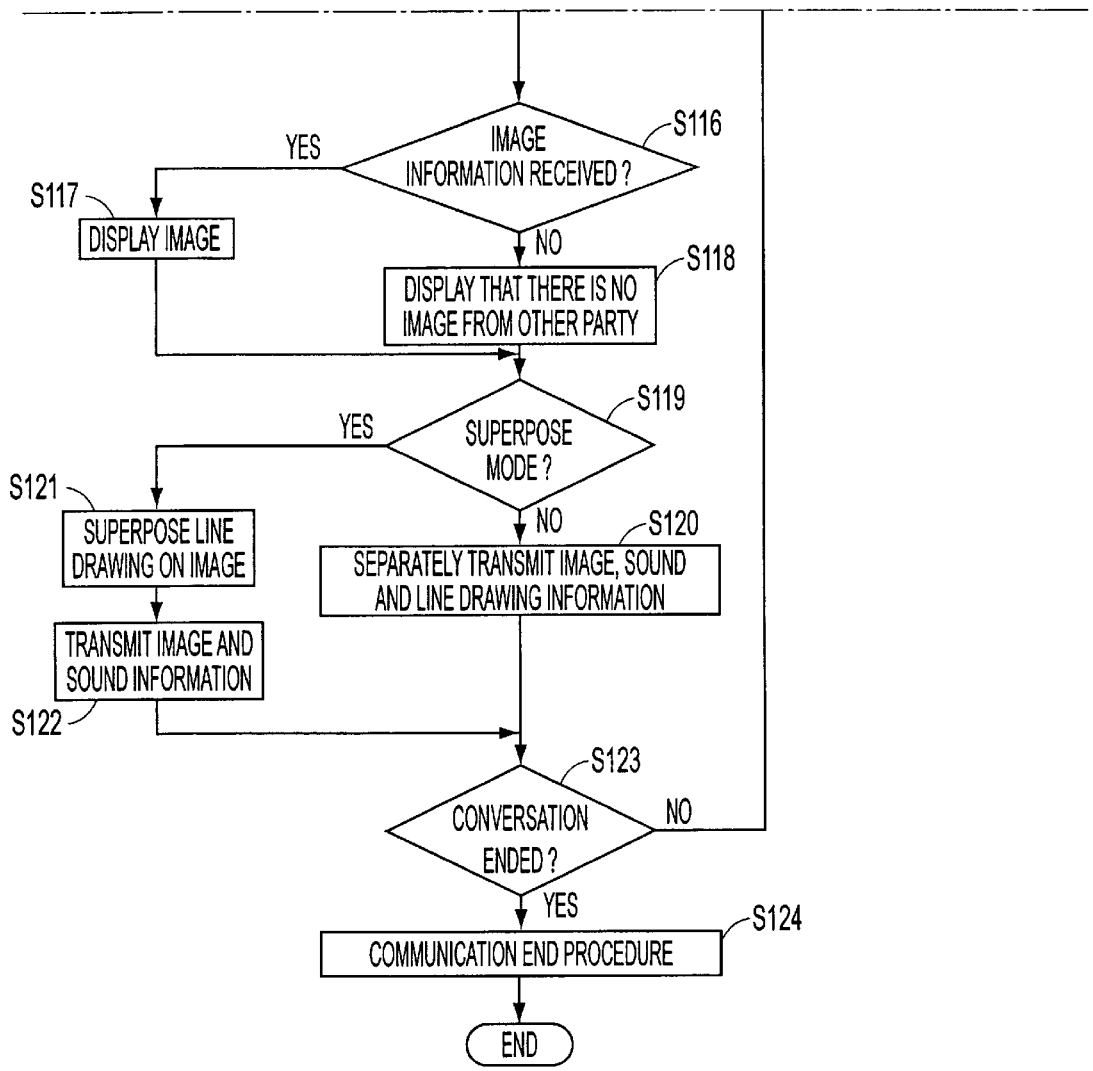
Figure 24:
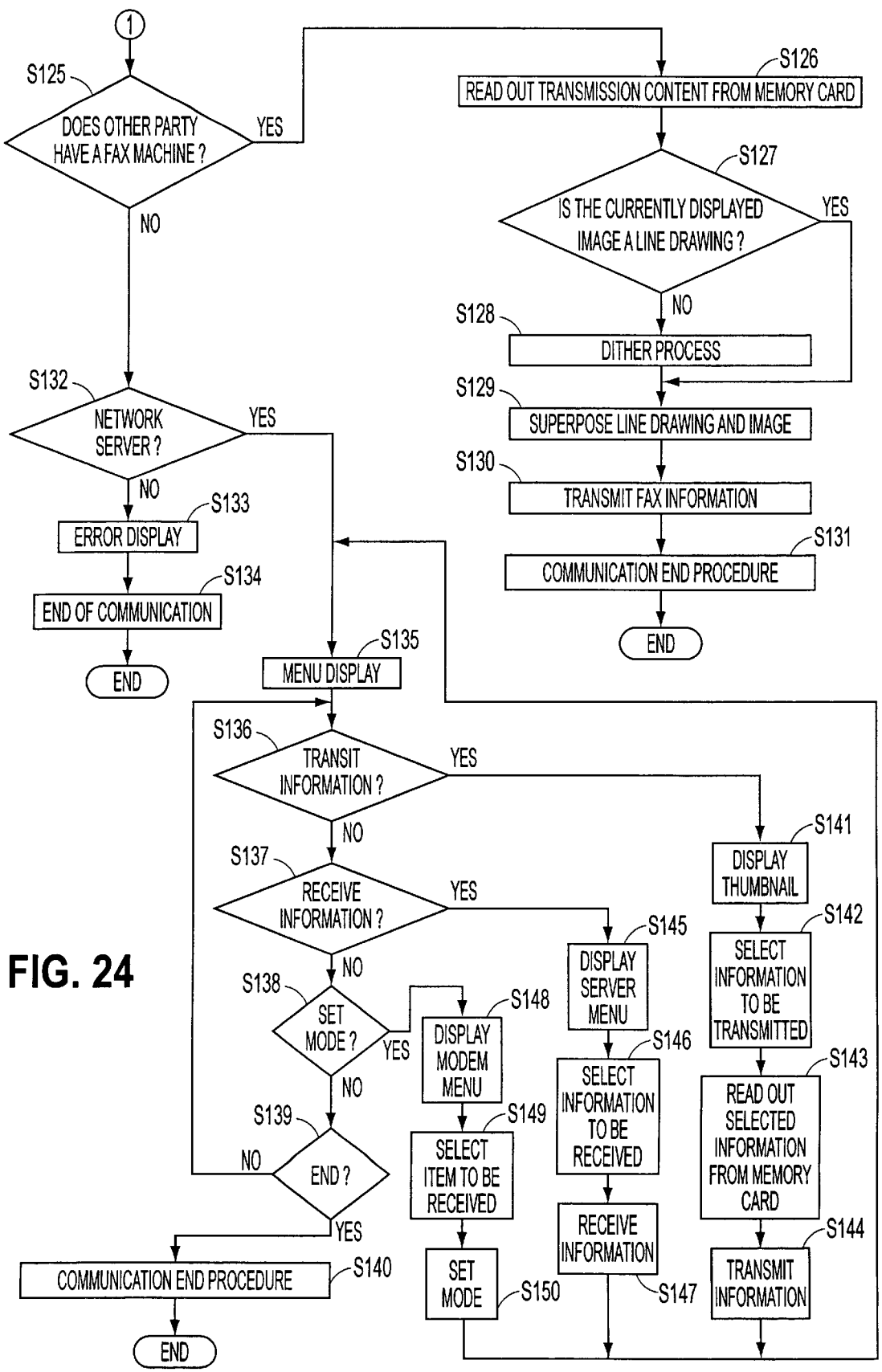
FIG. 24 is a flow chart that describes the processing of the electronic camera of FIG. 20.
Figure 25A:
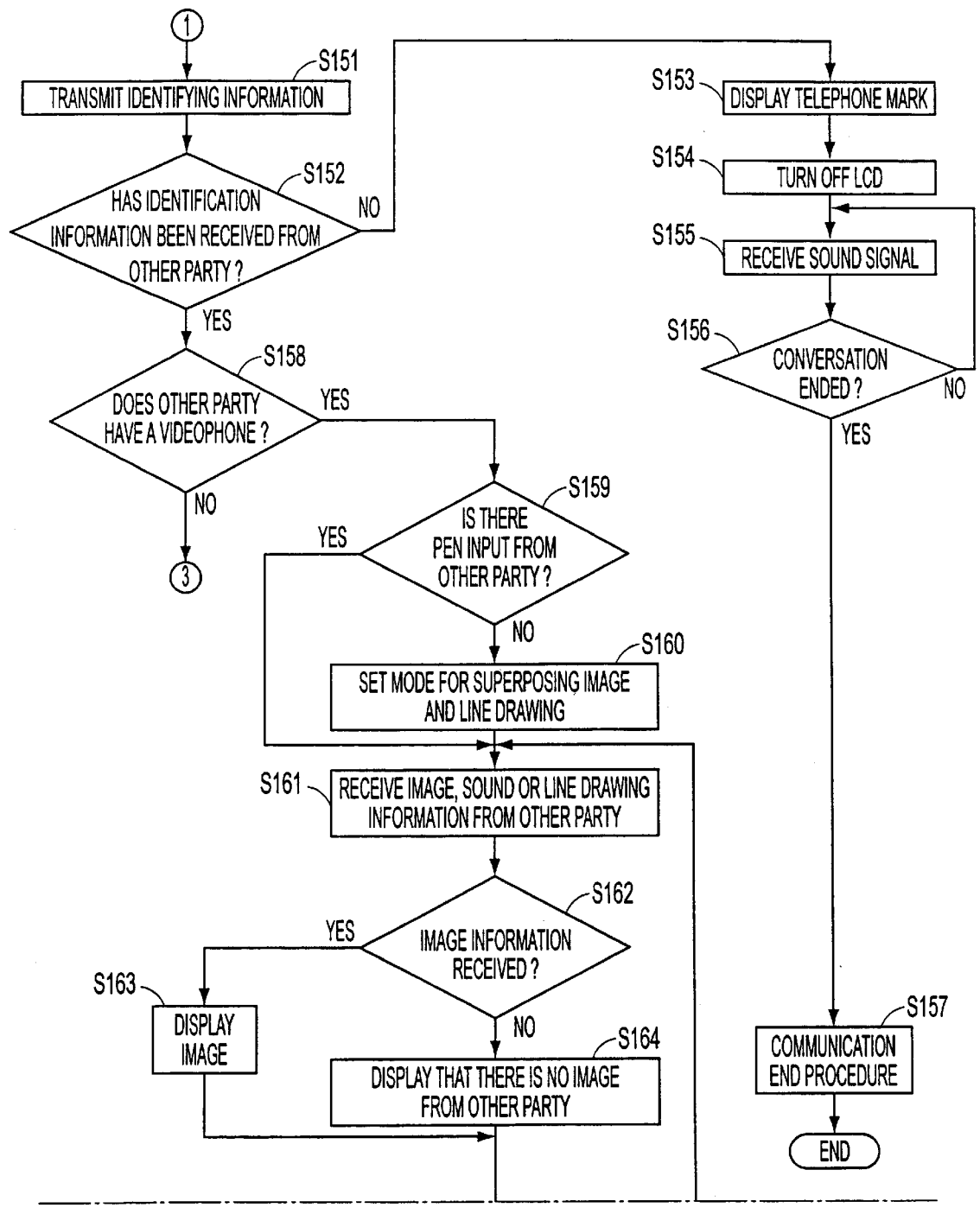
FIG. 25 is a flow chart that describes the processing of the electronic camera of FIG. 20.
Figure 25B:
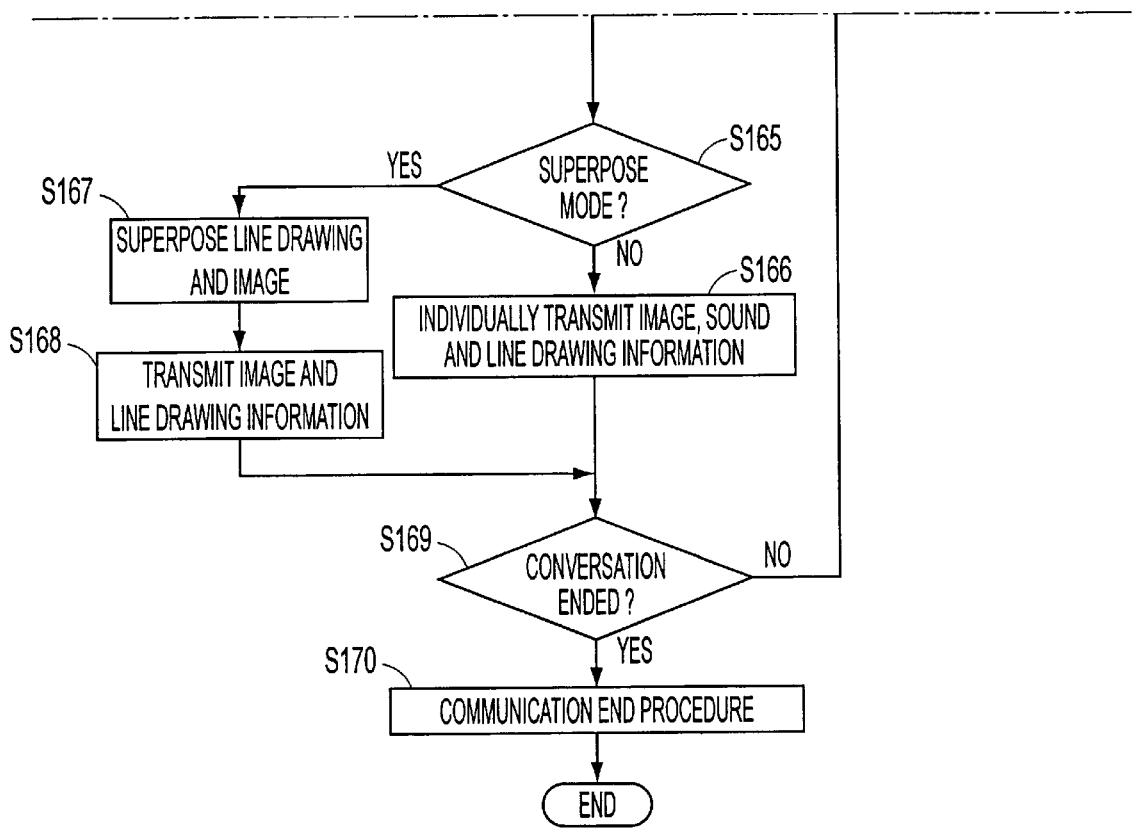
Figure 26:
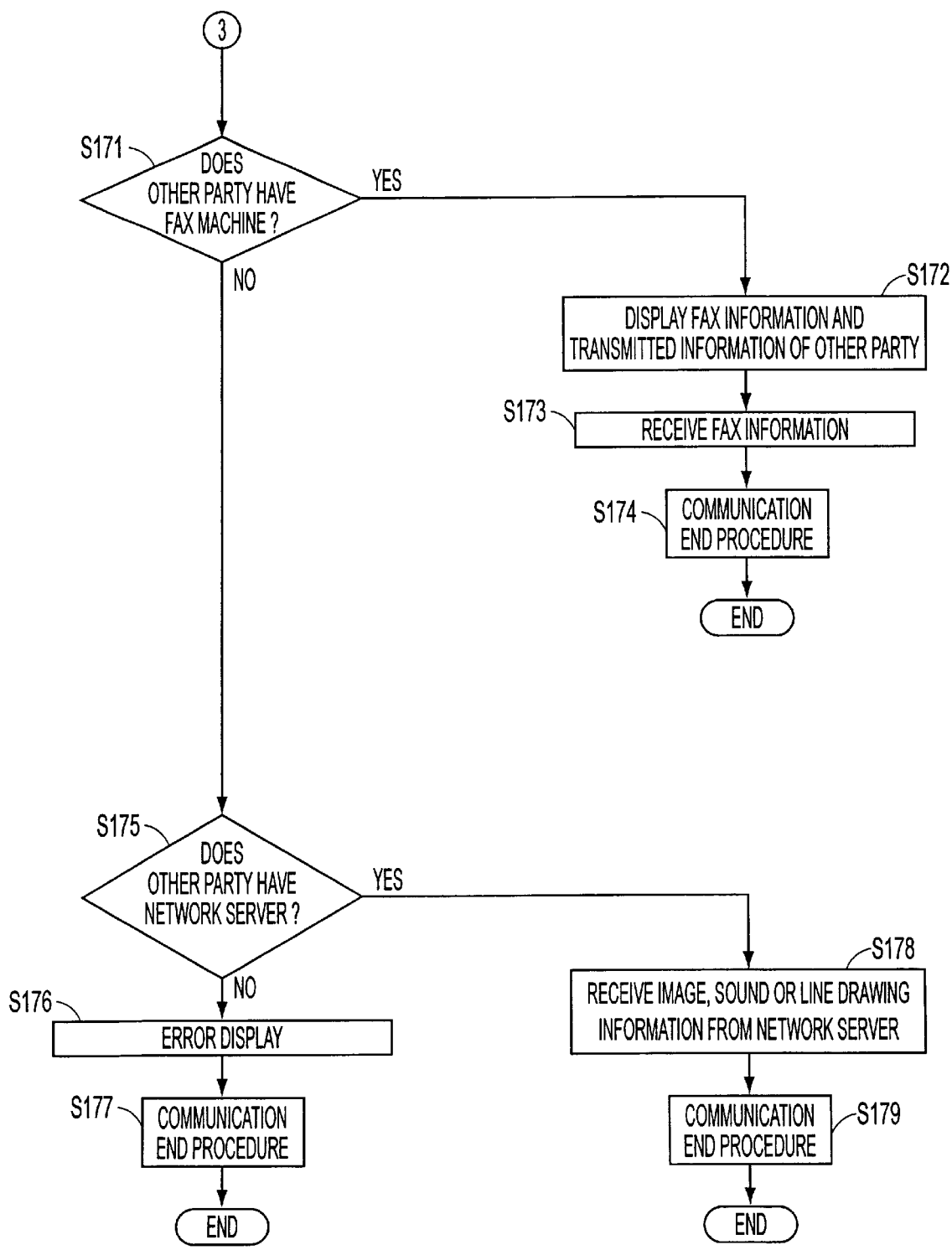
FIG. 26 is a flow chart that describes the processing of the electronic camera of FIG. 20.

On the other hand, if it is determined in step S101, that the receiving mode is set, the program proceeds to step S151, and the CPU 39 reads out the identifying information of the electronic camera 1 from a ROM, which is not shown, and transmits this identifying information. Next, in step S152, the CPU 39 determines whether identifying information has been received from the information processing device of the other party. If identifying information has not been received, the connected information processing device is an ordinary telephone 106. Therefore, the program proceeds to step S153 and performs a telephone mark display processing. In other words, as described above, an image such as that shown in FIG. 27 is displayed on the LCD 6. Thereafter, the same processing as in step S107–S110 of FIG. 23 is carried out in step S154 through step S155. In other words, the LCD 6 is turned off, a sound signal is transmitted until it is determined that the conversation has ended, and when the conversation has ended, a communication end procedure is carried out.

In step S152, if it is determined that identifying information has been received from the information processing device of the other party, in step S158, it is determined whether the information processing device of the other party is a video telephone 108. If the information processing device of the other party is the video telephone 108, the processing of step S159 through step S170 is executed. This processing is the same processing as the processing of step S113 through step S124 in FIG. 23. Therefore, the description thereof is omitted, but image information and voice information is sent to/received from the video telephone 108. If the video telephone 108 has a function that records line drawing information, then image information, line drawing information and sound information are separately transmitted, but if the video telephone 108 does not have this function, the line drawing information is superimposed on the image information and then transmitted.

In step S158, if it is determined that the information processing device of the other party is not a video telephone 108, the program proceeds to step S171, where it is determined whether the information processing device of the other party is the facsimile machine 107. If the information processing device of the other party is a facsimile machine, the program proceeds to step S172, and the telephone number of the facsimile machine 107 of the other party and a message showing that image information is being received from the facsimile machine 107, such as "a facsimile is being received", it is displayed on the LCD 6. Therefore, the user can distinguish the facsimile machine 107 of the other party, and can know that information is being received from the facsimile machine. Then, in step S173, the CPU 39 receives the information that is being transmitted from the facsimile 107, causes it to be displayed on the LCD 6, and, as necessary, stores it on the memory card 24. Then, when the transmission has ended, in step S174, the communication end procedure is carried out.

In step S171, if it is determined that the information processing device of the other party is not a facsimile machine, the program proceeds to step S175, where it is determined whether the information processing device of the other party is a network server. If the information processing device of the other party is not a network server, error display processing is carried out in step S176, and in step S177 the communication end processing is carried out. This processing is the same processing as that of step S133 through step S134 in FIG. 24.

In step S175, when it is determined that the information processing device of the other party is a network server, the program proceeds to step S178, and image information, line drawing information and sound information is received from the network server 105. Then, when the transmission is completed, in step S179, the communication end procedure is carried out.

Figure 32:
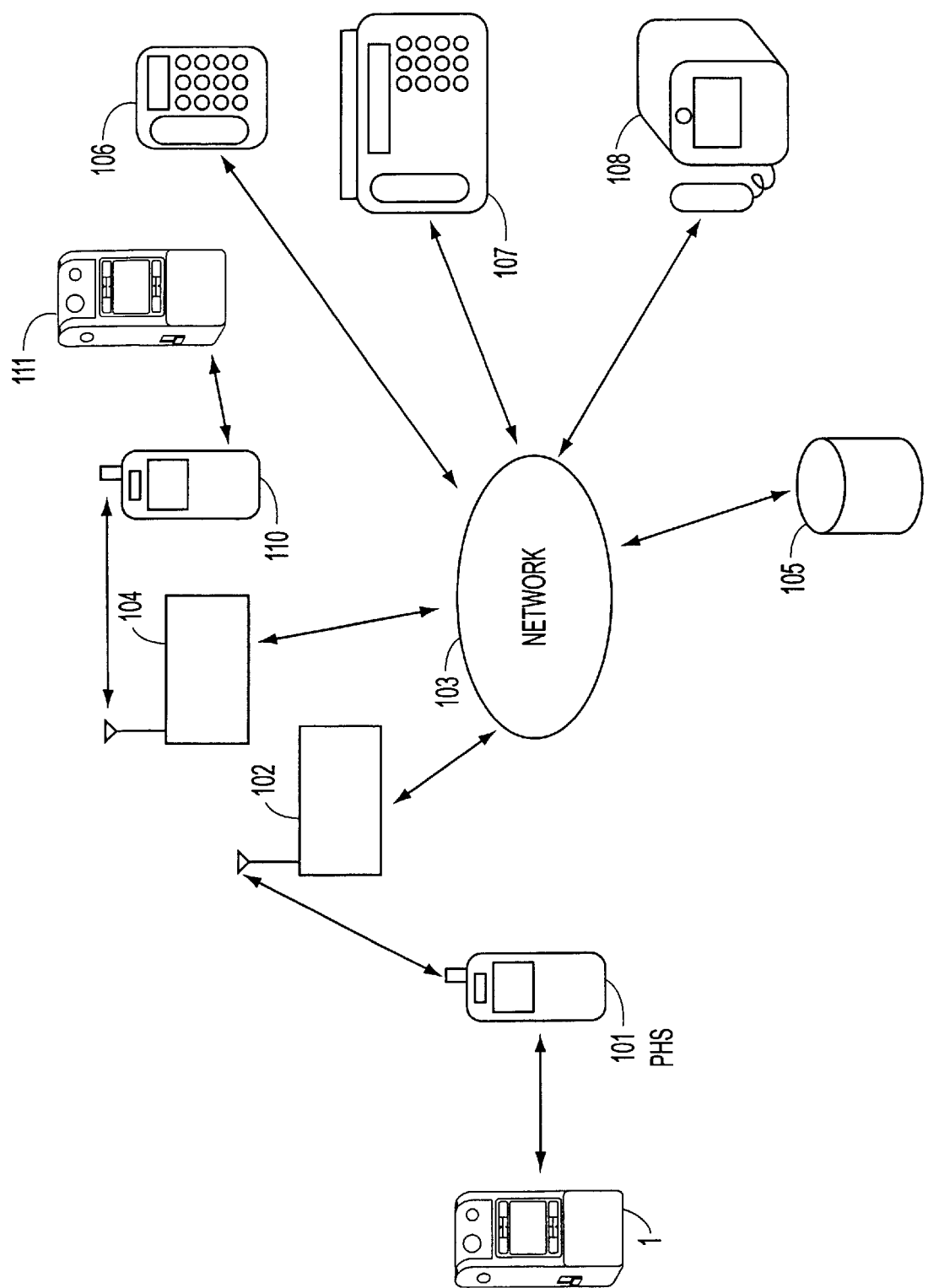
FIG. 32 is a diagram that shows the electronic camera of FIG. 1 connected via a network to other devices.

In the above, the electronic camera 1 was directly connected to the network server 103. However, as shown in FIG. 32, a PHS 101 can be connected to the electronic camera 1, and the connection may be made to the network 103 via the nearest local office 102. In this case, as in the cases described above, it is possible to connect to the server 105, the telephone 106, the facsimile machine 107, or the video telephone 108 via the network 103, but it is also possible to connect to another PHS 110, and to an electronic camera 111 connected thereto, via another local office 104.

Further, the PHS 101 may be integral with the electronic camera 1.

Figure 33:
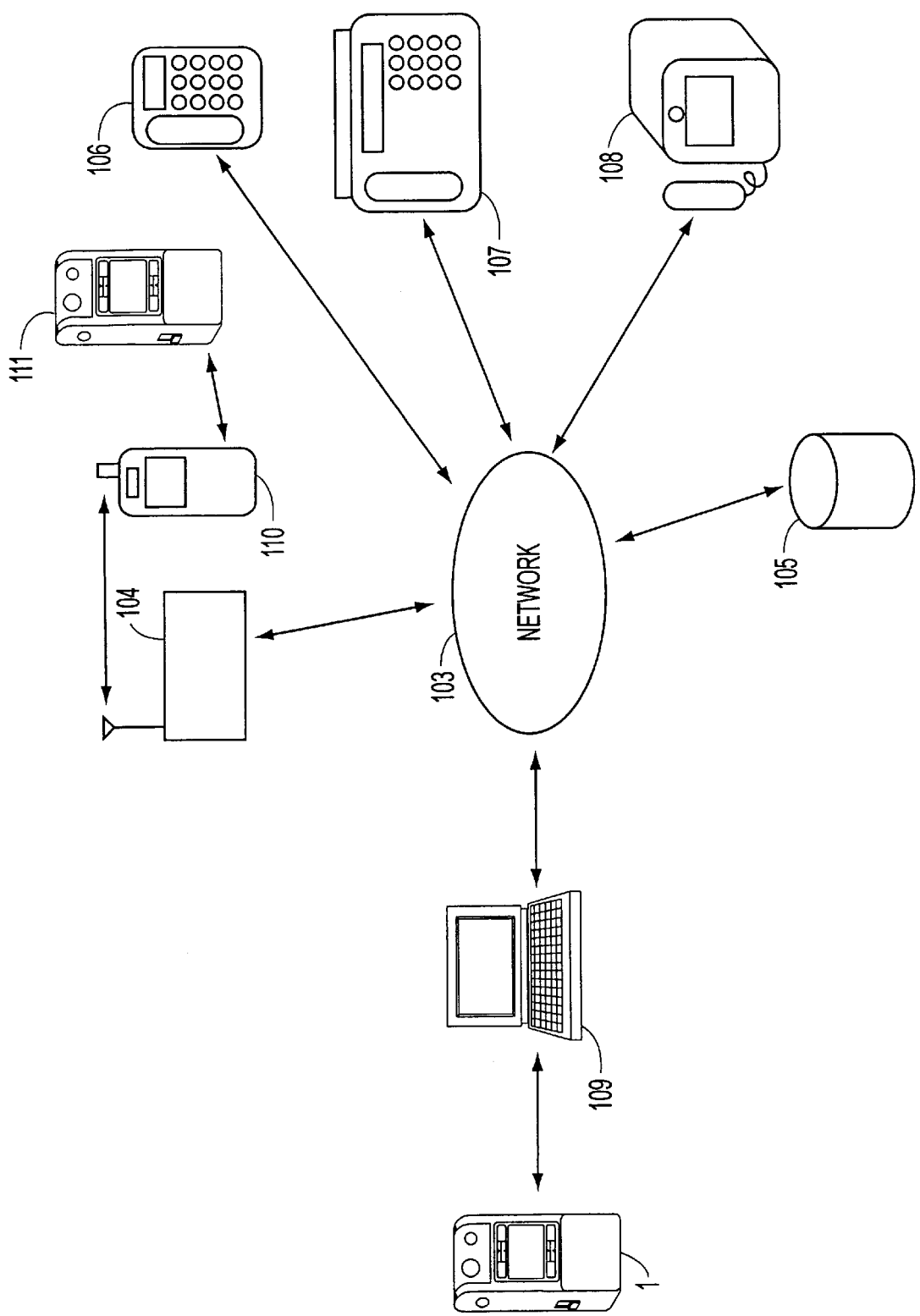
FIG. 33 is a diagram that shows the electronic camera of FIG. 1 connected via a network to still other devices.

Furthermore, as shown in FIG. 33, the electronic camera 1 may also be connected to the network 103 via a personal computer 109.

In the above-described embodiments, the image input by the CCD 20 was compressed based on JPEG standards and transmitted via a network (communication line) but it is obvious that it is also acceptable to compress based on MPEG standards, for example, and transmit, and to perform a corresponding decompression process on the receiving side.

Furthermore, it is obvious that the present invention is not limited to an electronic camera, but is also applicable to, for example, portable telephones and the like.

Furthermore, a program that performs the above-described processing may be provided to the user recorded on a recording medium such as a magnetic disk, CD ROM, solid state memory or the like, or transmitted via a communication medium such as a network, satellite or the like and recorded on a recording medium.

Figure 34A:
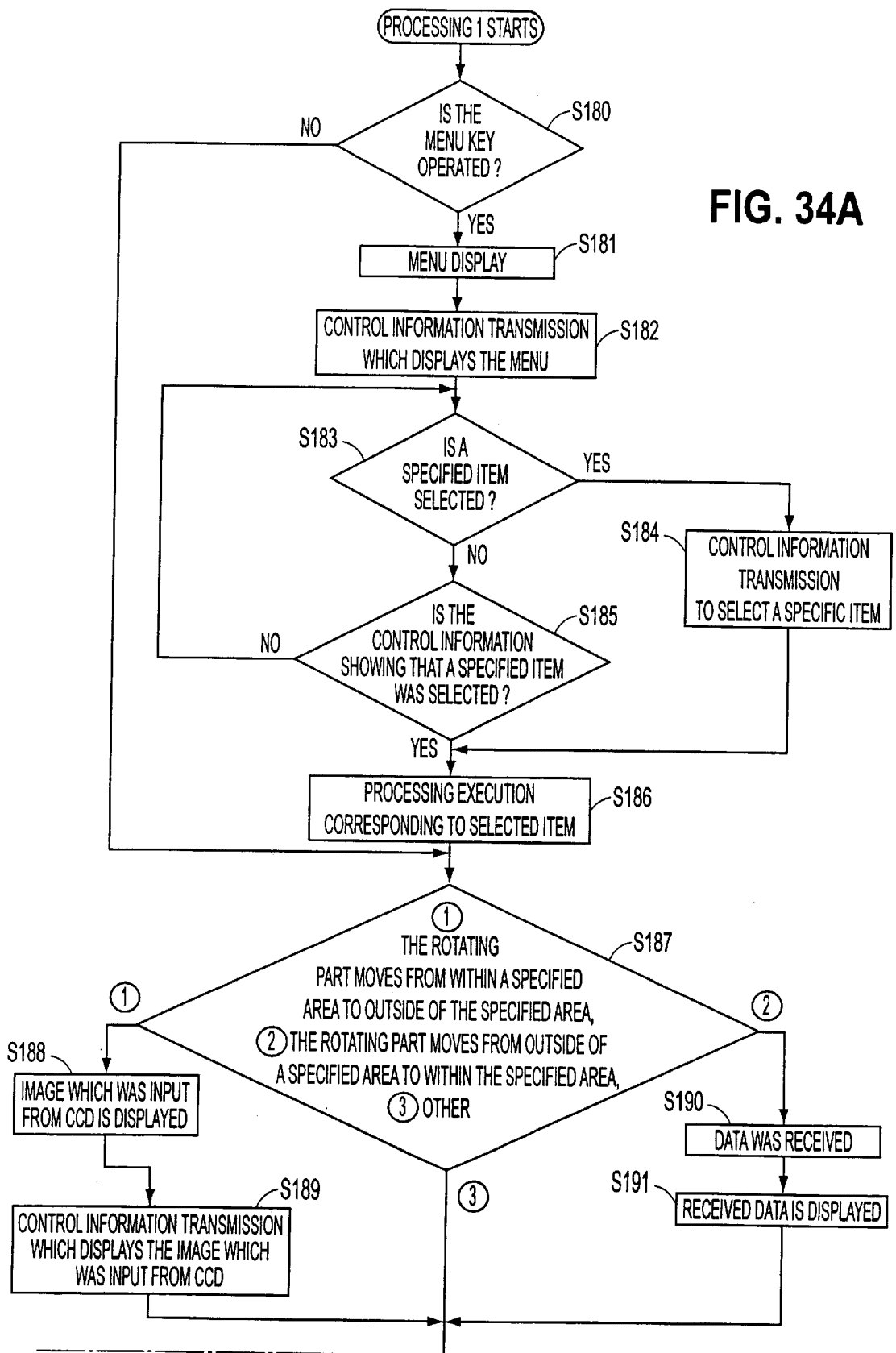
FIG. 34 is a flow chart explaining the processing which is shown in step S9 of FIG. 12.
Figure 34B:
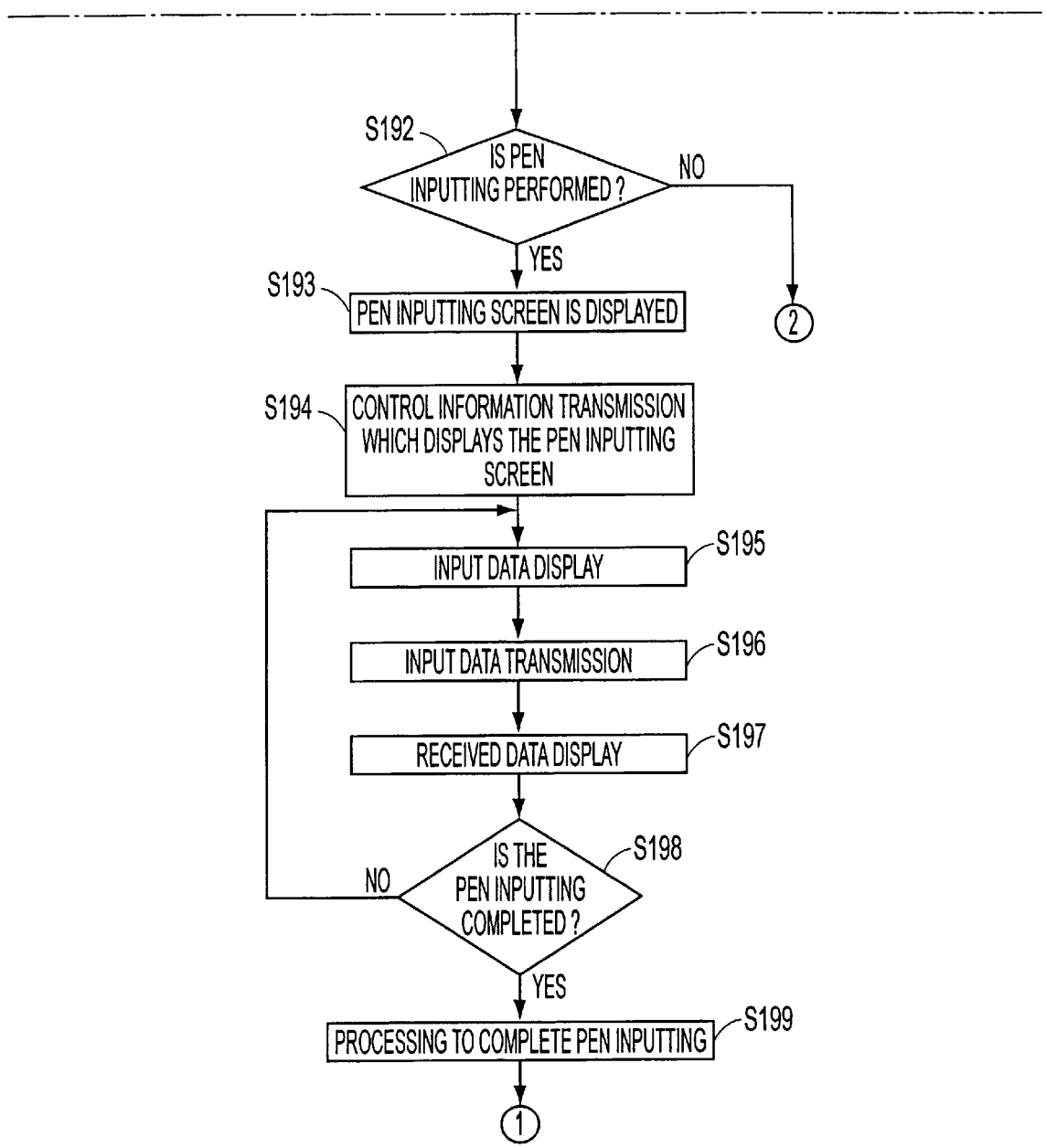

Referring to a flow chart as shown in FIG. 34, details of the processing 1 shown in FIG. 12 are explained. When the processing is executed (called), in step S180, CPU 39 determines whether the menu key 7A is operated. As a result, when it is determined that the menu key 7A is not operated (NO), the program proceeds to step S187. Furthermore, when it is determined that the menu key 7A is operated (YES), the program proceeds to step S181.

Figure 36:
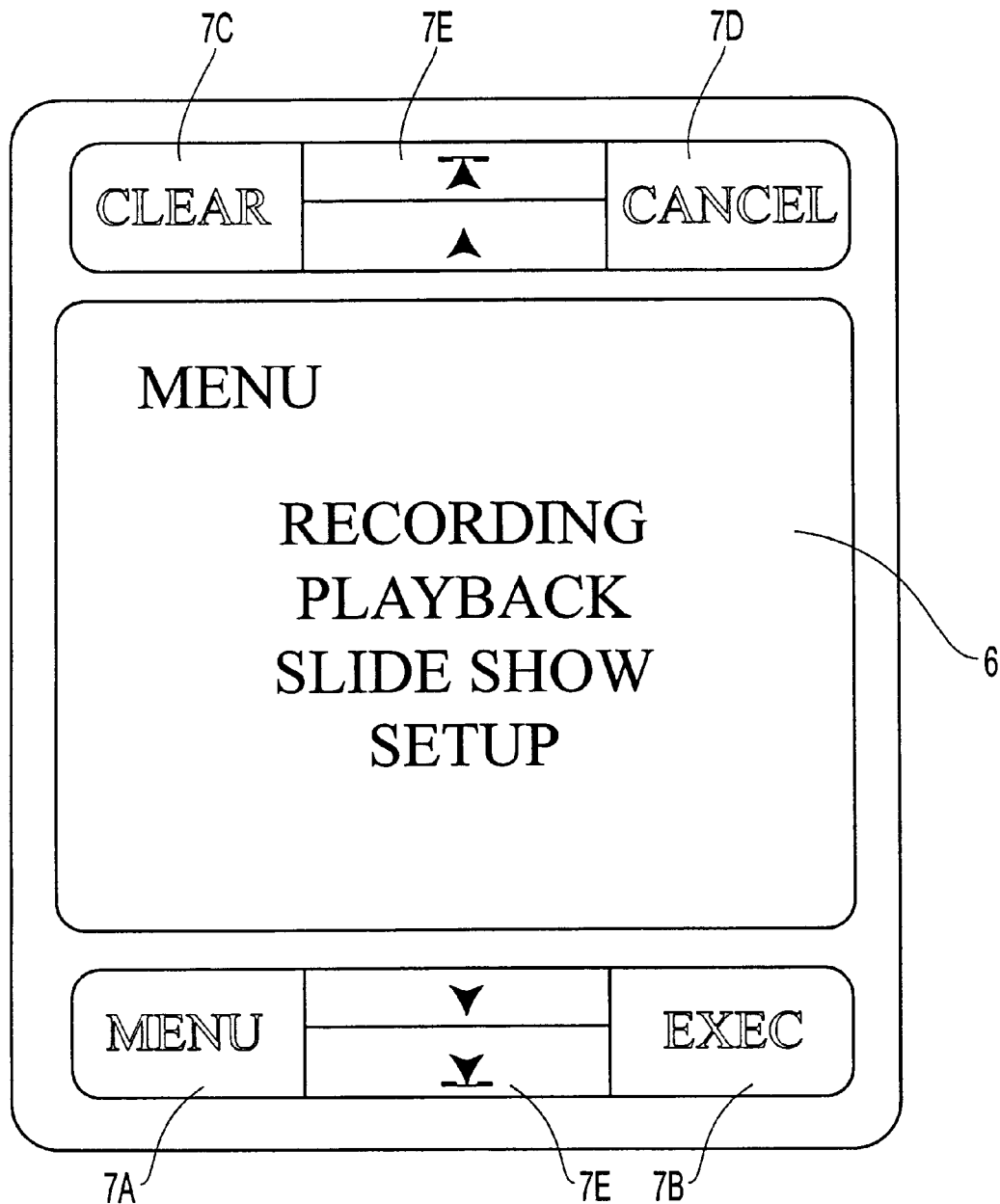
FIG. 36 is a drawing that shows an example of a menu display in step S211 of FIG. 34.

In step S181, CPU 39 displays the menu screen which has the selection items of, for example, "RECORDING MODE", "PLAY BACK MODE", "SLIDE SHOW MODE" and "SET UP MODE". In step S182, CPU 39 transmits control information that causes the menu screen to be displayed to the receiver through the modem 57. As a result, the same menu screen is displayed on the LCD 6 of the receiver as is shown in FIG. 36.

In the following step S183, CPU 39 determines whether or not a specified item is selected on the menu screen. As a result, when it is determined that a specified item is selected (YES), the program proceeds to step S184. Furthermore, when it is determined that a specified item is not selected (NO), the program proceeds to step S185.

In step S184, CPU 39 transmits control information showing that a specified item is selected to the receiver through the modem 57. In addition, in step S185, it is determined whether the modem 57 receives the control information showing that a specified item is selected by the receiver. As a result, when it is determined that specified control information is not received (NO), the program returns to step S183, and the same processing is repeated as described earlier. Furthermore, when it is determined that specified control information is received (YES), the program proceeds to step S186.

In step S186, processing corresponding to the selected item (or the item which the received control information indicates) is performed. For example, when the "reproduction mode" is selected by the sender, not only the electronic camera 1-A but also 1-B moves to the reproduction mode. Moreover, the same operation is performed when the "reproduction mode" is selected by the receiver.

Further, during the execution of the reproduction mode, when the clear key 7C is operated and the reproduced information is recorded in the electronic camera 1 which performed the operation, the image being reproduced is deleted from the memory card 24. Moreover, when the information being reproduced is recorded in the electronic camera of the other side, it is also acceptable not to delete the information (ignore the operation for the cancel key 7C). According to this structure, it is possible to prevent the other side from accidentally deleting important information.

In the following step S187, CPU 39 determines whether the rotating part 19 is rotated from within a specified area (within the area where an optical axis of the shooting lens 3 is ±30° to the subnormal direction of the surface X2) to outside of the specified area, from outside of the specified area to within the specified area, or other than the above cases (for example, when the rotating part is not rotated). As a result, if it is determined that the rotating part 19 is rotated from within the specified area to outside of the specified area (1), the program proceeds to step S188. Furthermore, when it is determined that the rotating part 19 is moved from outside of the specified area to inside of the specified area (2), the program proceeds to step S190. Furthermore, if it is determined that this is other than the above case (3), the program proceeds to step S192.

In step S187, when it is determined that the rotating part 19 was rotated from within the specified area to outside of the specified area, the program proceeds to step S188, and CPU 39 displays the image which was input from the CCD 20 on LCD 6. Furthermore, the program proceeds to step S189, and CPU 39 transmits the image information which was input from CCD 20 of the electronic camera 1-A of the sender and control information which causes the image information to be displayed on the electronic camera 1-B, which is the receiver, through the modem 57.

Moreover, instep S187, when it is determined that the rotating part 19 was rotated from outside of the specified area to within the specified area (2), the program proceeds to step S190, and CPU 39 makes the modem 57 receive the image which was transmitted after being input in the CCD 20 of the receiver. Furthermore, the program proceeds to step S191, and the received image is displayed on LCD 6.

Moreover, in step S187, if it is determined that this is other than the above cases (for example, when the rotating part 19 is not rotated), the program proceeds to step S182.

In step S182, CPU 39 determines whether or not pen inputting was performed by referring to the output of the touch tablet 6A. As a result, if it is determined that the pen input was not performed (NO), the program proceeds to step S200 of FIG. 35, and if it is determined that the pen input was performed (YES), the program proceeds to step S193.

In step S193, CPU 39 displays the pen inputting screen (for example, a screen with blue background) on LCD 6. Then, the program proceeds to step S194, and CPU 39 transmits control information which causes the pen inputting screen to be displayed on the receiver. As a result, the same pen inputting screen can be displayed by the receiver.

Figure 37:
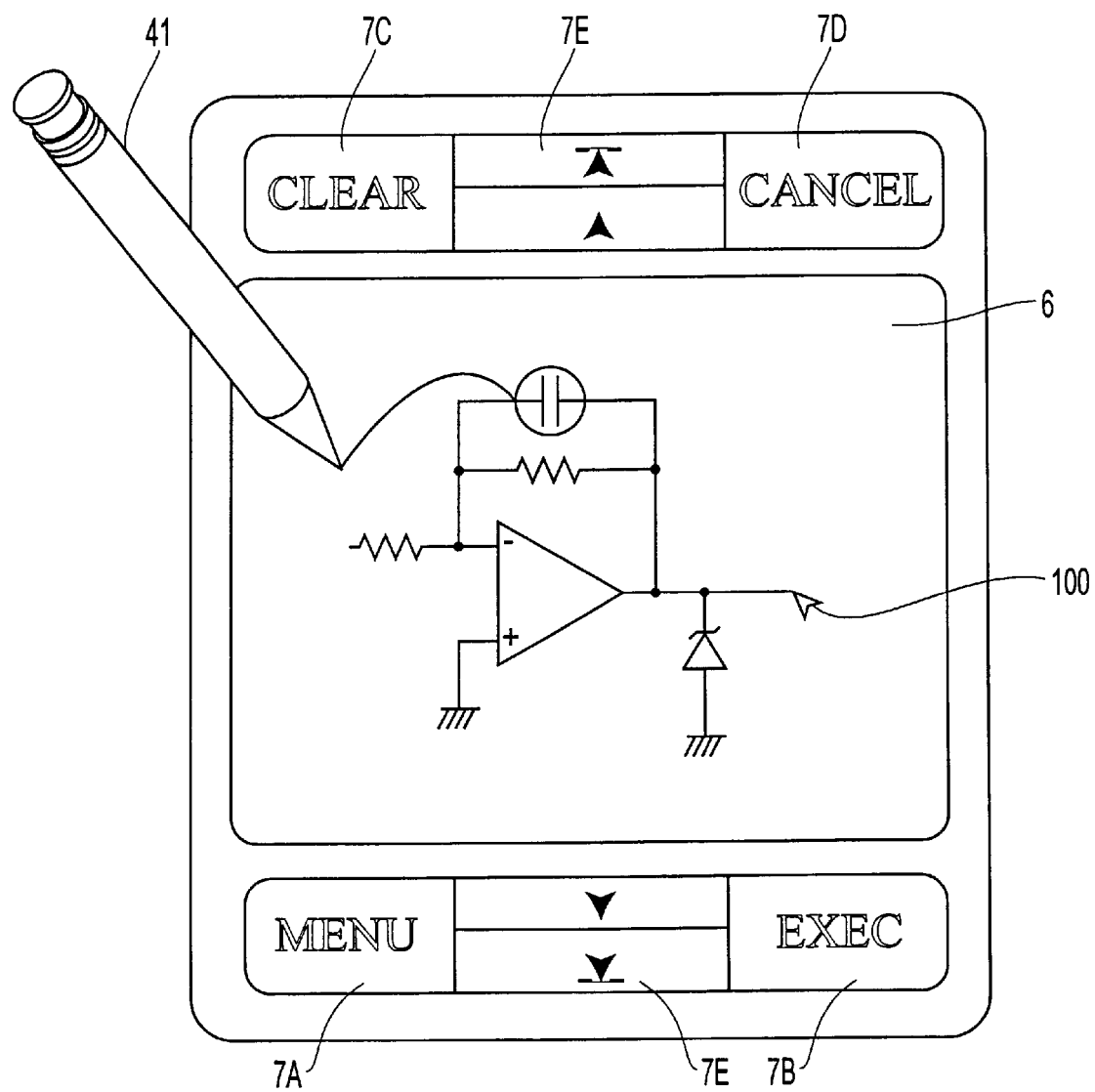
FIG. 37 is a drawing that shows an example of a memo display.

In step S195, memo information which was input by the pen 41 by the sender is displayed on the LCD 6. In FIG. 37, as a result of the processing of step S195 (or the processing of step S197), the memo image (line drawing) which was input by the pen 41 is displayed on LCD 6. In this display example, a circuit with a calculation amplifier was input as a drawing, and when the pen 41 is moved on the touch tablet 6A, a corresponding line or curve is displayed on the LCD 6. When the processing of step S195 is completed, the program proceeds to step S196, and CPU 39 transmits the memo image which was input to the receiver through the modem 57.

In step S197, CPU 39 causes the memo information which was input by the pen 41 by the receiver to be received by the modem 57, and the received image is superposed by the data which is stored in the frame memory 35 and is written. As a result, the memo image which was input by the sender and the memo image which was input by the receiver are superposed and displayed on LCD 6. That is, as shown in FIG. 37, when the input was performed by the pen 41 on the touch tablet 6A of the receiver, a cursor 100 is displayed at the corresponding position on the LCD 6 of the sender, and a locus of the cursor 100 is displayed as a line or curve. In addition, the position of the pen 41 by the sender is shown by the cursor 100 on the receiver, and a line or curve corresponding to the locus of the pen 41 of the receiver is drawn. Therefore, the same image is displayed on the sender and the receiver.

In step S198, CPU 39 determines whether a specified operation which completes pen inputting mode was performed (for example, the operation of pressing the cancel key 7D). As a result, if it is determined that the specified operation which completes the pen inputting is not performed (NO), return to step S195, and the same processing is repeated as described earlier. In addition, when it is determined that the operation to complete the pen inputting was performed (YES), the program proceeds to step S199.

In step S199, processing to complete the pen inputting is performed. That is, CPU 39 returns the display screen to the original screen (for example, the image which was input in CCD 20 of the receiver is displayed), and control information to complete the pen inputting is transmitted to the other side. Furthermore, the program proceeds to step S200 of FIG. 35.

Figure 35:
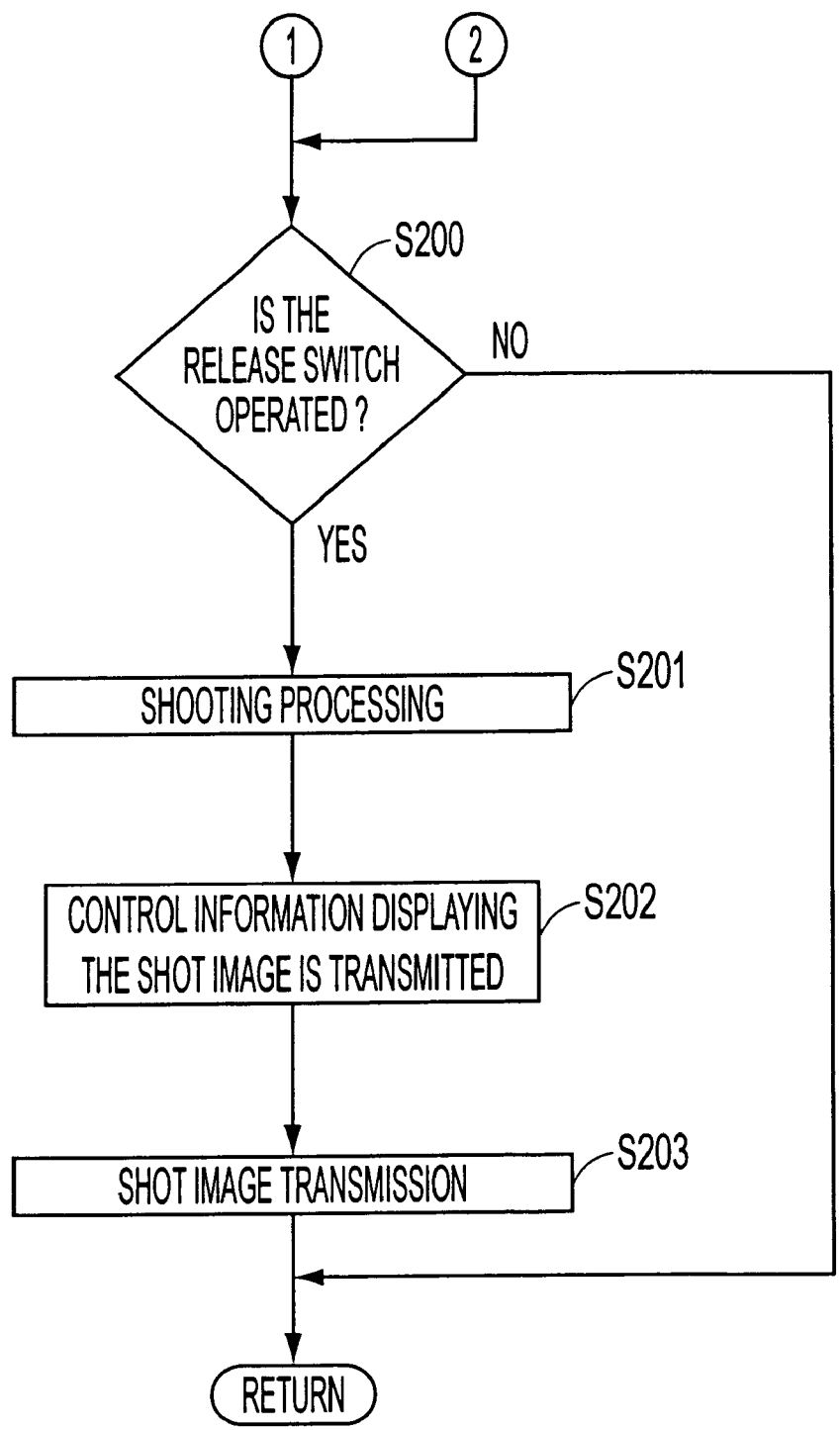
FIG. 35 is a flow chart explaining the processing which is shown in steps S49 and S41 of FIG. 34.

In step S200 of FIG. 35, CPU 39 determines whether the release switch 10 was operated. As a result, when it is determined that the release switch is not operated (NO), the program returns to the original processing (the processing of step S10 of FIG. 12) (RETURN). Moreover, when it is determined that the release switch 10 was operated (YES), the program proceeds to step S201.

In step S201, the shooting processing is performed, that is, the image signal of the object which was output by CCD 20 is sampled by the image processor 31, is digitized by the AD converting circuit 32 and is output to DSP 33. DSP 33 compresses the digitized image based upon the JPEG method and it is recorded to the shot image recording area of the memory card 24. Then, the program proceeds to step S202.

In step S202, CPU 39 transmits control information, which causes the shot image data to be displayed, to the other side through the modem 57.

In the following step S203, CPU 39 reads the shot image (the image which was shot in step S201) data from the memory card 24 and transmits it to the other side through the modem side 57. Then, the program returns to the original processing (the processing of step S10 of FIG. 12) (RETURN).

According to the above processing, when the menu key 7A is operated by either the sender or receiver, the menu screen is displayed on both LCDs 6 and it is possible for both to select an arbitrary item from the menu screen.

For example, when the menu key 7A is operated by the sender, the menu screen is displayed by both the sender and the receiver. Furthermore, for example, when the reproduction mode is selected by the receiver, the image which was shot is reproduced by the sender (the side on which the menu is displayed). In addition, when the menu key 7A is pressed by the receiver, if the reproduction mode is selected, the image which was shot by the receiver is reproduced.

Furthermore, when the rotating part 19 of the sender is rotated from within a specified area to outside of the specified area (when the shooting lens 3 faces toward the opposite direction of the user), the image which was input from the CCD 20 of the sender is displayed on the LCDs 6 of both the sender and the receiver. When the rotating part 19 of the receiver is operated the same, the image which was input from CCD 20 of the receiver is displayed on both LCDs 6. That is, when the rotating part 19 faces a different direction from the user, it is assumed that the user does not intend to transmit his/her image to the other side, and that another image should be transmitted, so the image which was input from CCD 20 can be transmitted to the other side, the same image can be displayed on his/her LCD 6, and the display content can be confirmed.

Furthermore, in the above state, when either of the rotating parts 19 is fixed outside of the specified area, when the rotating part 19 is returned to within the specified area, the image which was input from the CCD 20 of the other side is received and displayed. That is, when the rotating part 19 is returned to the original position, it is assumed that the user no longer wants to transmit an image other than himself/herself (for example, a human image other than the user), and the image of the user is transmitted to the other side and the image of the user of the other side is displayed on the LCD 6 (return to the video telephone mode).

Furthermore, if the release switch 10 is operated by either the sender or the receiver, the shooting processing is performed, the image which was shot as a result is transmitted to the electronic camera 1 of the other side, and the shot image is displayed on the LCD 6 of the other side in addition to the side which performed the shooting.

In other words, if the operation in which a self image is displayed (for example, when the rotating part 19 is rotated from within the specified area to outside of the specified area or when the release switch 10 is operated) by either the sender or the receiver, a self image can be displayed on both sides. By using this type of structure, when either of the users transmits an image other than himself/herself to the other side, it is possible to confirm the image which is being transmitted to the other side.

Figure 38:
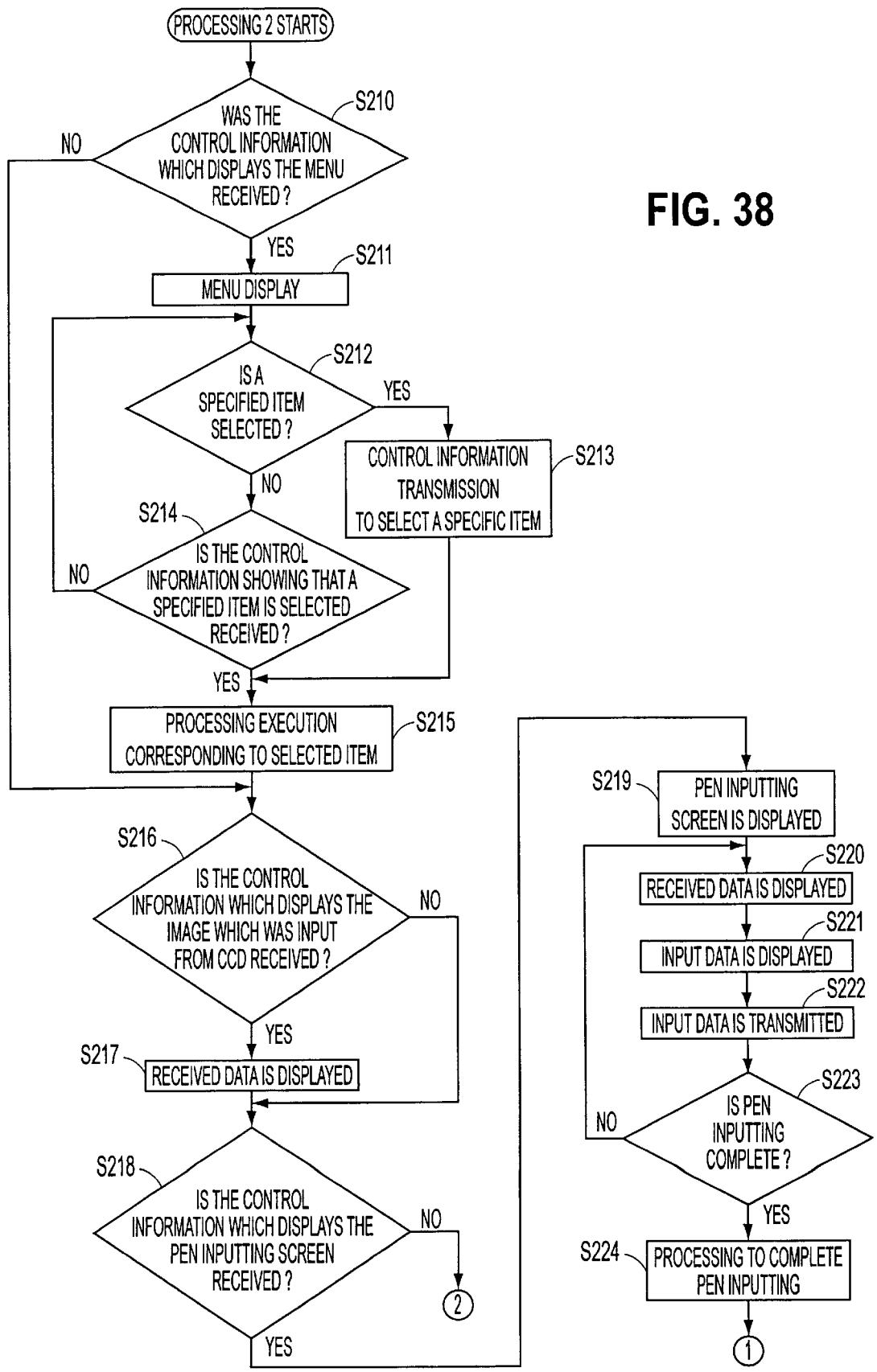
FIG. 38 is a flow chart explaining the processing which is shown in step S12 of FIG. 12.
Figure 39:
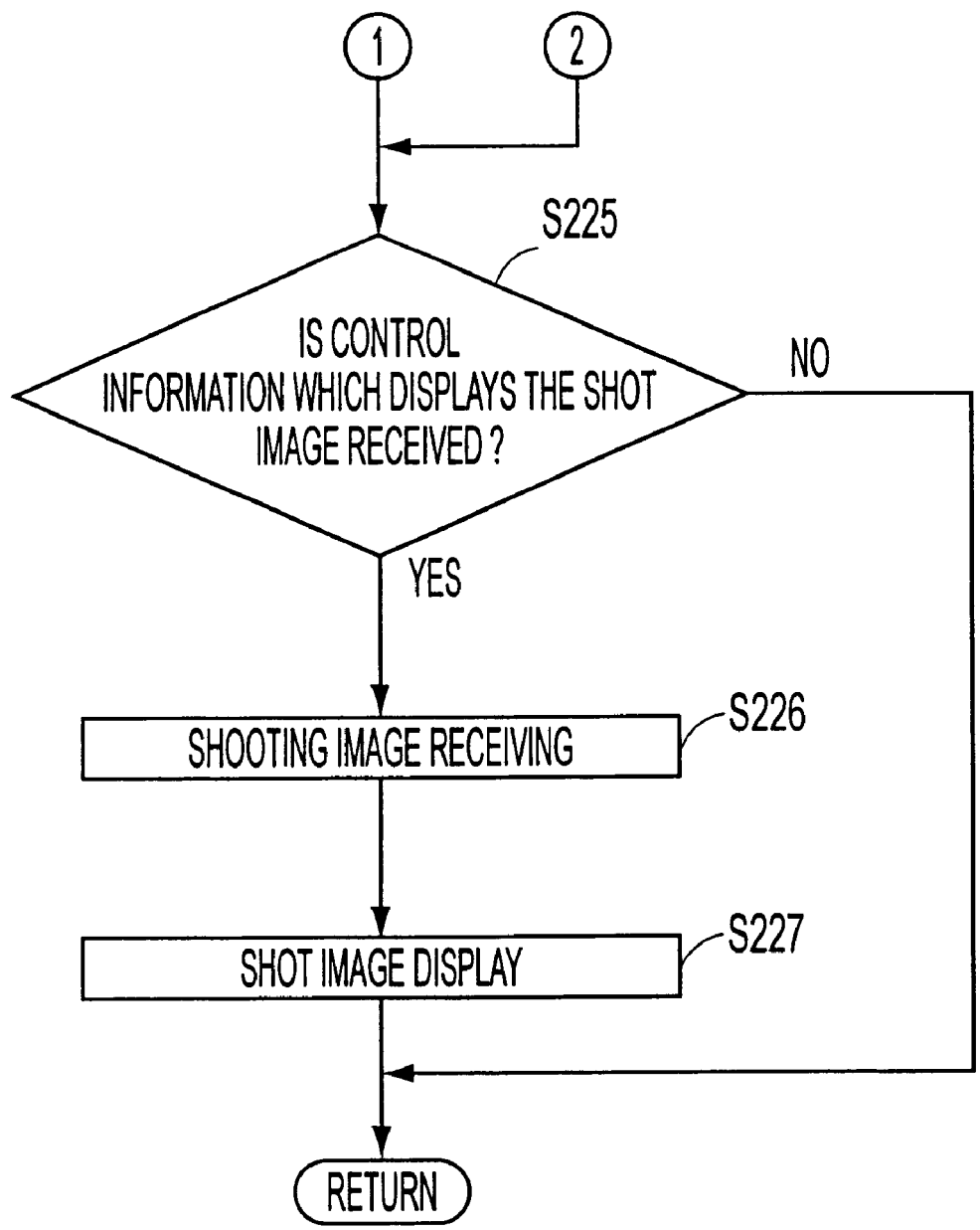
FIG. 39 is a flow chart explaining the processing which is shown in steps S68 and S74 of FIG. 38.

Next, by referring to FIGS. 38 and 39, details of the processing 2 are explained. When this processing is performed, in step S210, CPU 39 determines whether control information which causes the menu screen to be displayed is received. That is, when the menu key 7A is pressed by the receiver, as a result, CPU 39 determines whether control information that causes the menu screen to be displayed is transmitted through the public line 61. As a result, if it is determined that the control information that causes the menu screen to be displayed is not transmitted (NO), the program proceeds to step S216, and when CPU 39 determines that the control information which causes the menu screen to be displayed is received (YES), the program proceeds to step S211.

In step S211, CPU 39 displays the menu screen (see FIG. 36), on LCD 6. Then, the program proceeds to step S212 and CPU 39 determines whether a specified item is selected. As a result, if it is determined that a specified item is selected (YES), the program proceeds to step S213, and if it is determined that a specified item is not selected (NO), the program proceeds to step S214.

In step S214, CPU 39 determines whether the modem 57 receives control information showing that a specified item was selected. As a result, if it is determined that the control information showing that a specified item was selected was not received (NO), return to step S212, and the same processing is repeated as described earlier. Furthermore, when it is determined that the control information showing that a specified item was selected was received (YES), the program proceeds to step S215.

Meanwhile, in step S213, CPU 39 transmits control information which selects the specified item that was obtained in step S212 to the receiver. Then, the program proceeds to step S215.

In step S215, processing corresponding to the selected item is performed. That is, CPU 39 performs processing corresponding to the item selected by the sender or the item selected by the receiver. For example, when the reproduction mode is selected by either side, the image which was shot by the sender (the side on which the operation displaying the menu screen was performed) is reproduced.

In the following step S216, CPU 39 determines whether the control information (the information which was transmitted in step S39 of FIG. 16) which causes the image which was input from CCD 20 to be displayed is received. As a result, if it is determined that the control information which was described earlier is not received (NO), the program proceeds to step S218, and when it is determined that the control information which was described earlier is received (YES), the program proceeds to step S217.

In step S217, CPU 39 displays the image data which was received from the modem 57 on LCD 6. As a result, the image which was input from the CCD 20 of the receiver can be displayed on LCD 6.

In the following step S218, CPU 39 determines whether the control information (the information which was transmitted in the processing of step S44 of FIG. 16) that causes the pen inputting screen to be displayed has been received. As a result, if it is determined that the control information that causes the pen inputting screen to be displayed is not received (NO), the program proceeds to step S225 of FIG. 39. Furthermore, if it is determined that the control information that causes the pen inputting screen to be displayed is received (YES), the program proceeds to step S219.

In step S219, CPU 39 displays the pen inputting screen (for example, a screen with a blue background) on LCD 6, and the program proceeds to step S220. In step S220, the line drawing (memo image) that was received by the modem 57 is displayed on LCD 6 after being input and transmitted from the touch tablet 6A of the receiver.

In step S221, CPU 39 superposes and writes the memo image which was input from the touch table 6A of the sender over the image which is displayed on LCD 6. As a result, the memo image that was input from the touch tablet 6A of the sender and the memo image that was input from the touch tablet 6A of the receiver and is transmitted are superposed and displayed.

In step S222, CPU 39 transmits the memo image which was input from the touch tablet 6A of the sender to the receiver through modem 57. As a result, the memo image which was input from the touch tablet 6A of the sender is also displayed on the LCD 6 of the receiver.

In the following step S223, it is determined whether the pen inputting is completed. That is, CPU 39 determines whether the operation to complete the pen inputting was performed. As a result, when it is determined that the operation to complete the pen inputting is not performed (NO), the program returns to step S220 and the same processing is repeated as described earlier. Furthermore, if it is determined that the operation to complete the pen inputting was performed (YES), the program proceeds to step S224.

In step S224, the processing to complete the pen inputting is performed. That is, CPU 39 returns the display to the original (for example, the image which was input from CCD 20 of the other side is displayed on LCD 6), and the control information to complete the pen inputting is transmitted to the other side. Then, the program proceeds to step S225 of FIG. 39.

In step S225, CPU 39 determines whether the control information that causes a shot image to be displayed is received by referring to the output from the modem 57. As a result, if it is determined that the control information that causes the shot image to be displayed is not received (NO), the program returns to the original processing (the processing of step S13 of FIG. 12) (RETURN). Furthermore, if it is determined that the control information that causes the shot image to be displayed is received (YES), the program proceeds to step S226. That is, when the release switch 10 is operated by the other side, and the control information (the control information causing the shot image to be displayed) which is transmitted as a result is received, the program proceeds to step S226.

In step S226, CPU 39 receives the shot image data which was transmitted from the other side through the modem 57. Then, the program proceeds to step S227.

In step S227, after the decompression processing is performed on the shot image data which was received in step S226, CPU 39 displays it on LCD 6. Then, the program returns to the original processing (processing of step S13 of FIG. 12) (RETURN).

According to the information processing device and information processing method, if it is detected that a communication line is connected between another information processing device, when an image recording operation is performed, the image which is transmitted by the other information processing device is recorded. If the connection of a communication line cannot be detected when the image recording operation is performed, the image which was input by the information processing device is recorded. Thus, it is possible to automatically select the image which is shot in response to the connected and disconnected state of the line.

According to the above processing, in response to control information transmitted by the receiver, for example, it is possible to display the menu screen, perform the pen inputting, and display the shot image which was shot by the other side.

An example of the processing which is performed in the electronic camera 1-B, which is the receiver, is the same as described in FIG. 19.

Additionally, as noted with respect to the seventh embodiment, the recording medium can be, for example, a CD-ROM or a carrier wave.

In the illustrated embodiments, the controller (CPU 39) is implemented using a suitably programmed general purpose computer, e.g., a microprocessor, microcontroller or other processor device (CPU or MPU). It will be appreciated by those skilled in the art, that the controller can also be implemented as a single special purpose integrated circuit (e.g., ASIC) having a main or central processor section for overall, system-level control, and separate sections dedicated to performing various different specific computations, functions and other processes under control of the central processor section. The controller can also be implemented using a plurality of separate dedicated or programmable integrated or other electronic circuits or devices (e.g., hardwired electronic or logic circuits such as discrete element circuits, or programmable logic devices such as PLDs, PLAs, PALs or the like). The controller can also be implemented using a suitably programmed general purpose computer in conjunction with one or more peripheral (e.g., integrated circuit) data and signal processing devices. In general, any device or assembly of devices on which a finite state machine capable of implementing the flow charts shown in the figures can be used as the controller.

While the present invention has been described with reference to preferred embodiments thereof, it is to be understood that the invention is not limited to the disclosed embodiments or constructions. To the contrary, the invention is intended to cover various modifications and equivalent arrangements. In addition, while the various elements of the disclosed invention are shown in various combinations and configurations, which are exemplary, other combinations and configurations, including more, less or only a single element, are also within the spirit and scope of the invention.

What is claimed is:

1. An information processing device that transmits information to another information processing device, comprising:
    an input device that inputs image information and added information added to the image information;
    a recorder that records the information input by the input device;
    a transmitter that transmits select information to the other information processing device, the selected information including at least one of sound information, line drawing information, and image information;
    superimposing means for superimposing the line drawing information and the image information; and
    a controller that evaluates the other information processing d device to determine whether the image information and the added information of the image processing device are useable by the other information processing device,
    wherein if the controller determines that the image information and the added information can be used, the image information and the added information are combined to form the select information to be transmitted to the other information processing device and when the other information processing device has an image information recording function but does not have a function that records the image information and the line drawing information independently, the transmitter transmits the line drawing information and image formation that has been superimposed by the superimposing means.

2. The information processing apparatus of claim 1, further comprising a switch that switches between a first mode in which the information input from the input device is transmitted without being recorded in the recorder, and a second mode in which information that is recorded in the recorder is transmitted.

3. The information processing device of claim 1, wherein the information processing device is an electronic camera.

4. The information processing device of claim 1 wherein, when the other information processing device does not have an image information receiving function, the controller selects only sound information to be transmitted.

5. The image processing device of claim 1, further comprising processing means for dither processing the image,
    wherein when the other information processing device is a facsimile machine, the transmitter superimposes dither processed image information over the line drawing information and transmits the superimposed information.

6. The information processing device of claim 1, wherein the information processing device is an image processing device and the controller controls the display in response to evaluation of the other information processing device.

7. The information processing device of claim 6, wherein when image information is not transmitted from the other information processing device when that device has a function that allows transmission of image information, the controller controls the display to indicate to a user that the image information is not being transmitted.

8. The information processing device of claim 6, wherein when information is received from a facsimile machine serving as the other information processing device, the controller causes the display to display that information is being received from the facsimile machine.

9. The information processing device of claim 6, wherein when the other information processing device is a server, the controller causes the display to display a menu.

10. An image information processing method for an information processing device that transmits information to another information processing device, comprising:
    inputting image information and added information added to the image information to the information processing device;
    recording the inputted information;
    evaluating the other information processing device to determine whether the image information and the added information are useable by the other information processing device;
    selecting information to be transmitted, based on the result of the evaluating step, to only select information that can be useable by the other information processing device, the selected information including at least one of sound information, line drawing information and image information; and transmitting the selected information to the other information processing device, wherein the step of selecting information selects superimposed line drawing information and image information when the evaluating step finds that the other information processing device has an image information recording function but does not include a function that records line drawing information independently.

11. The information processing method of claim 10, wherein the selected information includes at least one of sound information, line drawing information and image information, and the step of selecting information selects only sound information when the other information processing device is evaluated and found not to have an image information receiving function.

12. The information processing method of claim 10, wherein when the other information processing device is evaluated and determined to be a facsimile, the selecting step selects transmission of dither processing image information superimposed over line drawing information.

13. The information processing method of claim 12, further comprising the steps of:

displaying information relating to the selected information; and controlling the display step in response to the result of the evaluating step.

14. A recording medium on which is recorded a computer program used in an information processing device that transmits information to another information processing device, wherein the control program:

inputs image information and added information to the information processing device;

records the inputted information;

evaluates the other information processing device to determine whether the image information and the added information are useable by the other information processing device;

selects information to be transmitted, based on the result of the evaluation step, the selected information including at least one of sound information, line drawing information and image information; and transmits the selected information to the other information processing device, wherein the step of selecting information selects superimposed line drawing information and image information when the evaluating step finds that the other information processing device has an image information recording function but does not include a function that records line drawing information independently.

15. The recording medium of claim 14 on which is stored a computer program used in an information processing device that transmits information to another information processing device, wherein the computer program further:

displays information relating to the selected information; and controls the display in response to the evaluation.

* * * * *